(12) United States Patent
Ortins et al.

(10) Patent No.: US 11,337,785 B2
(45) Date of Patent: May 24, 2022

(54) PERSONAL CARE SYSTEMS, PRODUCTS, AND METHODS

(75) Inventors: Marc Philip Ortins, Reading, MA (US); Alexander Timothy Chenvainu, Sudbury, MA (US); Mark Edward Farrell, Medfield, MA (US); Elizabeth Jane Wenzel, West Newton, MA (US); Jose Tadeo Vergara Decastro, Newton Center, MA (US)

(73) Assignee: Braun GmbH, Kronberg (DE)

( * ) Notice: Subject to any disclaimer, the term of this patent is extended or adjusted under 35 U.S.C. 154(b) by 438 days.

(21) Appl. No.: 13/414,936

(22) Filed: Mar. 8, 2012

(65) Prior Publication Data

US 2012/0171657 A1     Jul. 5, 2012

Related U.S. Application Data

(62) Division of application No. 12/775,709, filed on May 7, 2010, now abandoned.

(Continued)

(51) Int. Cl.
*A61C 17/22* (2006.01)
*A46B 9/04* (2006.01)
(Continued)

(52) U.S. Cl.
CPC ............... *A61C 17/221* (2013.01); *A46B 9/04* (2013.01); *A46B 9/10* (2013.01); *A46B 15/001* (2013.01);
(Continued)

(58) Field of Classification Search
CPC ................................ G09B 23/283; G09B 5/06
(Continued)

(56) References Cited

U.S. PATENT DOCUMENTS 3,998,234 A   12/1976  Stubbmann
4,146,924 A   3/1979   Birk et al.
(Continued)

FOREIGN PATENT DOCUMENTS

DE       10045067 A1    4/2002
EP        0634151 B1    7/1999
(Continued)

OTHER PUBLICATIONS

Walter et al., "Novel Oscillating-Rotating Power Toothbrush", Journal of Contemporary Dental Practice, vol. 8, No. 4, May 1, 2007.*
(Continued)

*Primary Examiner* — Thomas J Hong
*Assistant Examiner* — Sadaruz Zaman
(74) *Attorney, Agent, or Firm* — Vladimir Vitenberg

(57) ABSTRACT

A personal care system having personal hygiene products and a display for assisting the user is described. The personal care system can include a personal care product (e.g., an electric toothbrush), an interactive display in data communication with the personal care product. The display provides information associated with a plurality of characteristics of a personal care regimen to the user. The display is in data communication with a network and operable to receive information from the network, and the display is operable to run one or more applications to display the information received from the network.

11 Claims, 32 Drawing Sheets

Related U.S. Application Data

(60) Provisional application No. 61/180,617, filed on May 22, 2009, provisional application No. 61/176,618, filed on May 8, 2009.

(51) Int. Cl.
    *A46B 15/00*          (2006.01)
    *A46B 9/10*           (2006.01)

(52) U.S. Cl.
    CPC ...... *A46B 15/0006* (2013.01); *A46B 15/0008* (2013.01); *A46B 15/0012* (2013.01); *A46B 15/0042* (2013.01); *A61C 2204/005* (2013.01)

(58) Field of Classification Search
    USPC .................................................. 434/238, 263
    See application file for complete search history.

(56) References Cited

U.S. PATENT DOCUMENTS

| | | | |
|---|---|---|---|
| 4,253,212 A | 3/1981 | Fujita | |
| 4,435,163 A | 3/1984 | Schmitt et al. | |
| 4,907,973 A * | 3/1990 | Hon ..................... | G09B 23/285 434/262 |
| 4,935,635 A | 6/1990 | O'Harra | |
| 5,086,401 A | 2/1992 | Glassman et al. | |
| 5,224,049 A | 6/1993 | Mushabac | |
| 5,230,623 A | 7/1993 | Gutherie et al. | |
| 5,278,756 A | 1/1994 | Lemchen et al. | |
| 5,320,462 A | 6/1994 | Johansson et al. | |
| 5,383,454 A | 1/1995 | Bucholz | |
| 5,561,881 A * | 10/1996 | Klinger .............. | A46B 15/0002 15/105 |
| 5,630,431 A | 5/1997 | Taylor | |
| 5,662,111 A | 9/1997 | Cosman | |
| 5,755,577 A | 5/1998 | Gillis | |
| 5,810,601 A | 9/1998 | Williams | |
| 5,829,444 A | 11/1998 | Ferre et al. | |
| 5,864,288 A * | 1/1999 | Hogan ........................ | 340/568.1 |
| 5,954,673 A | 9/1999 | Staehlin et al. | |
| 6,006,126 A | 12/1999 | Cosman | |
| 6,152,733 A * | 11/2000 | Hegemann ............. | A61C 17/22 433/216 |
| 6,283,763 B1 | 9/2001 | Matsuzaki et al. | |
| 6,434,507 B1 | 8/2002 | Clayton et al. | |
| 6,488,638 B2 | 12/2002 | Mushabac | |
| 6,491,699 B1 | 12/2002 | Henderson et al. | |
| 6,536,068 B1 * | 3/2003 | Yang ................... | A46B 15/0002 15/105 |
| 6,731,988 B1 | 5/2004 | Green | |
| 6,741,883 B2 | 5/2004 | Gildenberg | |
| 6,754,928 B1 * | 6/2004 | Rosen ................. | A46B 15/0002 15/105 |
| 6,786,732 B2 * | 9/2004 | Savill .................. | A46B 15/0002 434/263 |
| 6,990,368 B2 | 1/2006 | Simon et al. | |
| 7,030,861 B1 * | 4/2006 | Westerman ......... | G06F 3/04883 345/173 |
| 7,097,357 B2 | 8/2006 | Johnson et al. | |
| 7,249,952 B2 | 7/2007 | Ranta et al. | |
| 7,346,417 B2 | 3/2008 | Luth et al. | |
| 7,407,484 B2 * | 8/2008 | Korman ................... | A61B 5/00 600/300 |
| 7,698,014 B2 | 4/2010 | Dunne et al. | |
| 8,137,109 B2 * | 3/2012 | Gatzemeyer ........ | A46B 15/0002 15/105 |
| 8,296,686 B1 * | 10/2012 | Tedesco .............. | G06F 19/3406 434/112 |
| 8,544,131 B2 * | 10/2013 | Braun .................. | A46B 15/0002 15/105 |
| 9,586,135 B1 * | 3/2017 | Capper ................... | A63F 13/06 |
| 2003/0063011 A1 * | 4/2003 | Rosen ................. | A46B 15/0006 340/687 |
| 2003/0064758 A1 * | 4/2003 | Mizuta ................ | H04M 1/0212 455/566 |
| 2003/0109837 A1 | 6/2003 | McBride-Sakal | |
| 2005/0136384 A1 * | 6/2005 | Jarvis .................. | G09B 19/0084 434/263 |
| 2006/0019228 A1 | 1/2006 | Riener et al. | |
| 2006/0267940 A1 * | 11/2006 | Groom .................. | G06F 3/0317 345/163 |
| 2006/0281042 A1 * | 12/2006 | Rizoiu .................... | A61C 17/22 433/29 |
| 2007/0172101 A1 | 7/2007 | Kriveshko et al. | |
| 2007/0172112 A1 | 7/2007 | Paley et al. | |
| 2008/0060148 A1 * | 3/2008 | Pinyayev ............... | A61B 5/415 15/22.1 |
| 2008/0102953 A1 | 5/2008 | Schultz | |
| 2008/0109973 A1 * | 5/2008 | Farrell ...................... | A46B 7/04 15/4 |
| 2008/0122796 A1 * | 5/2008 | Jobs ...................... | G06F 3/0488 345/173 |
| 2008/0141478 A1 * | 6/2008 | Gatzemeyer ........ | A46B 15/0004 15/167.1 |
| 2008/0196185 A1 * | 8/2008 | Gatzemeyer ........ | A61C 17/3481 15/23 |
| 2008/0199829 A1 | 8/2008 | Paley et al. | |
| 2008/0294490 A1 * | 11/2008 | Nuhaan .......... | G06Q 10/063114 705/7.15 |
| 2009/0070949 A1 * | 3/2009 | Sagel .................. | A46B 11/0058 15/28 |
| 2009/0092955 A1 * | 4/2009 | Hwang ............... | A46B 15/0002 434/263 |
| 2009/0215015 A1 * | 8/2009 | Chu .................... | G09B 19/0084 434/238 |
| 2009/0241278 A1 * | 10/2009 | Lemchen ............ | A46B 15/0002 15/105 |
| 2009/0293211 A1 * | 12/2009 | Spungin ............................ | 15/3 |
| 2009/0298017 A1 | 12/2009 | Boerjes et al. | |
| 2009/0307859 A1 * | 12/2009 | Mottram ............... | A61C 17/221 15/105 |
| 2009/0320227 A1 * | 12/2009 | Cohen .................... | G04F 1/005 15/167.1 |
| 2010/0281636 A1 | 11/2010 | Ortins et al. | |
| 2010/0323337 A1 * | 12/2010 | Ikkink et al. ................. | 434/263 |
| 2011/0010876 A1 * | 1/2011 | Iwahori .............. | A46B 15/0012 15/22.1 |
| 2012/0171657 A1 * | 7/2012 | Ortins .................... | A46B 9/04 434/365 |

FOREIGN PATENT DOCUMENTS

| | | | |
|---|---|---|---|
| WO | | 2006046543 A1 | 5/2006 |
| WO | | 2006098719 A1 | 9/2006 |
| WO | | 2006137648 A1 | 12/2006 |
| WO | WO 2007/084647 | A2 | 7/2007 |
| WO | WO 2007/084727 | A1 | 7/2007 |
| WO | WO 2007/084768 | A1 | 7/2007 |
| WO | WO 2007/084647 | A3 | 9/2007 |
| WO | WO 2007/084647 | A8 | 12/2007 |
| WO | | 2008060482 A2 | 5/2008 |
| WO | WO 2011079164 | A1 * | 6/2011 |

OTHER PUBLICATIONS

Morita M, Nishi K and Watanabe T, "Comparison of 2 toothbrushing methods for efficacy in supragingival plaque removal the Toothpick method and the Bass method", Journal of Clinical Periodontology, vol. 25, Issue 10, pp. 829-831, Oct. 1998.* http://www.youtube.com/watch7v-Db1_6V5W1.dg screen shot, Jun. 2, 2007, Argentina, posted on Jun. 4, 2007.

http://gizmodo.com/376356/oral-hygiene-game-maps-mouth-makes-kids-brush-better Screen shot, Gizmodo.com, posted Apr. 4, 2008, New Scientist.

Barras, Colin, "Computerised Toothbrush makes Oral Hygiene a Game", Retrieved from: https://www.newscientist.com/article/dn13598-computerised-toothbrush-makes-oral-hygiene-a-game/, Apr. 4, 2008, 3 Pages.

(56) References Cited

OTHER PUBLICATIONS

International Search Report and Written Opinion; Application Ser. No PCT/US2010/033849; dated Sep. 17, 2010; 11 pages.
"All Office Actions, U.S. Appl. No. 12/775,709".

\* cited by examiner

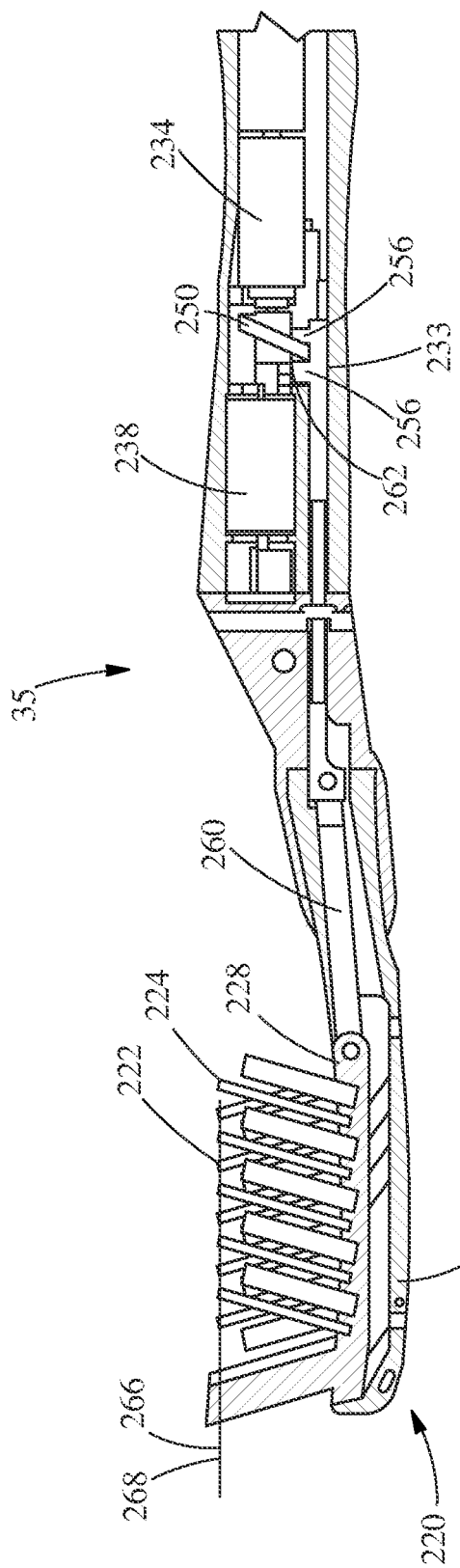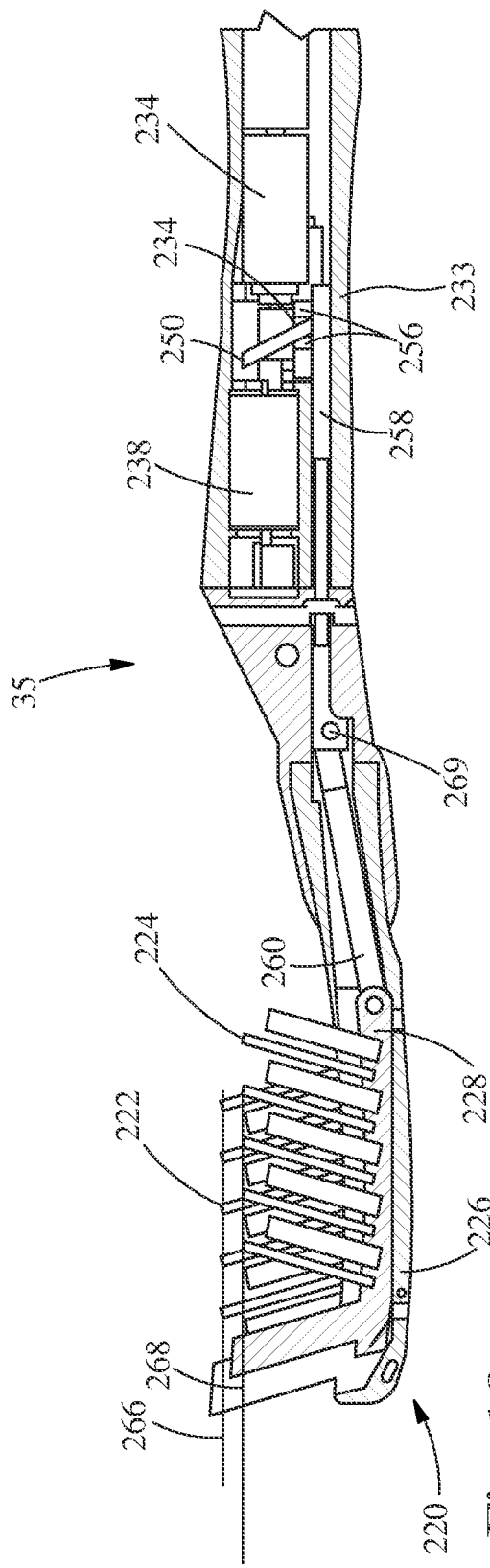

Good Morning, Jamie

*Dentists recommend brushing 2 or more minutes!*

| Su | M | T | W | Th | F | Sa |
|------|------|------|------|------|------|------|
| 2:00 | X | 1:36 | X | 2:00 | 1:36 | 2:00 |
| 2:00 | X | 2:00 | 2:00 | .48 | X | 2:00 |
| X | 2:00 | 1:48 | | | | |
| 2:00 | .48 | | | | | |

35 of 180 uses optimal performance

Fig. 22

Good Morning, Jamie
*Dentists recommend brushing 2 or more minutes!*
| Su | M | T | W | Th | F | Sa |
|---|---|---|---|---|---|---|
| 2.00 | X | 1.36 | X | 2.00 | 1.36 | 2.00 |
| 2.00 | X | 2.00 | 2.00 | .48 | X | 2.00 |
| X | 2.00 | 1.48 | | | | |
| 2.00 | .48 | | | | | |
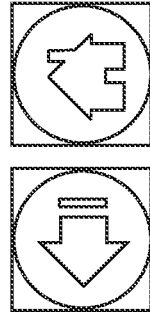
113 / of 180 uses
inspect brush head
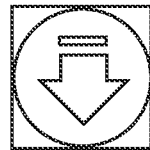
Fig. 23

Good Morning, Jamie

*Dentists recommend brushing 2 or more minutes!*

| Su | M | T | W | Th | F | Sa |
|---|---|---|---|---|---|---|
| 2:00 | X | 1.36 | X | 2.00 | 1.36 | 2:00 |
| 2:00 | X | 2:00 | 2:00 | .48 | X | 2:00 |
| X | 2:00 | 1.48 | | | | |
| 2:00 | .48 | | | | | |

182 of 180 uses replace brush head

Fig. 24A

It's time for a new brush head, Jamie

The ADA recommends that consumers replace toothbrushes approximately every three months to maintain optimal brushing.

View special offer

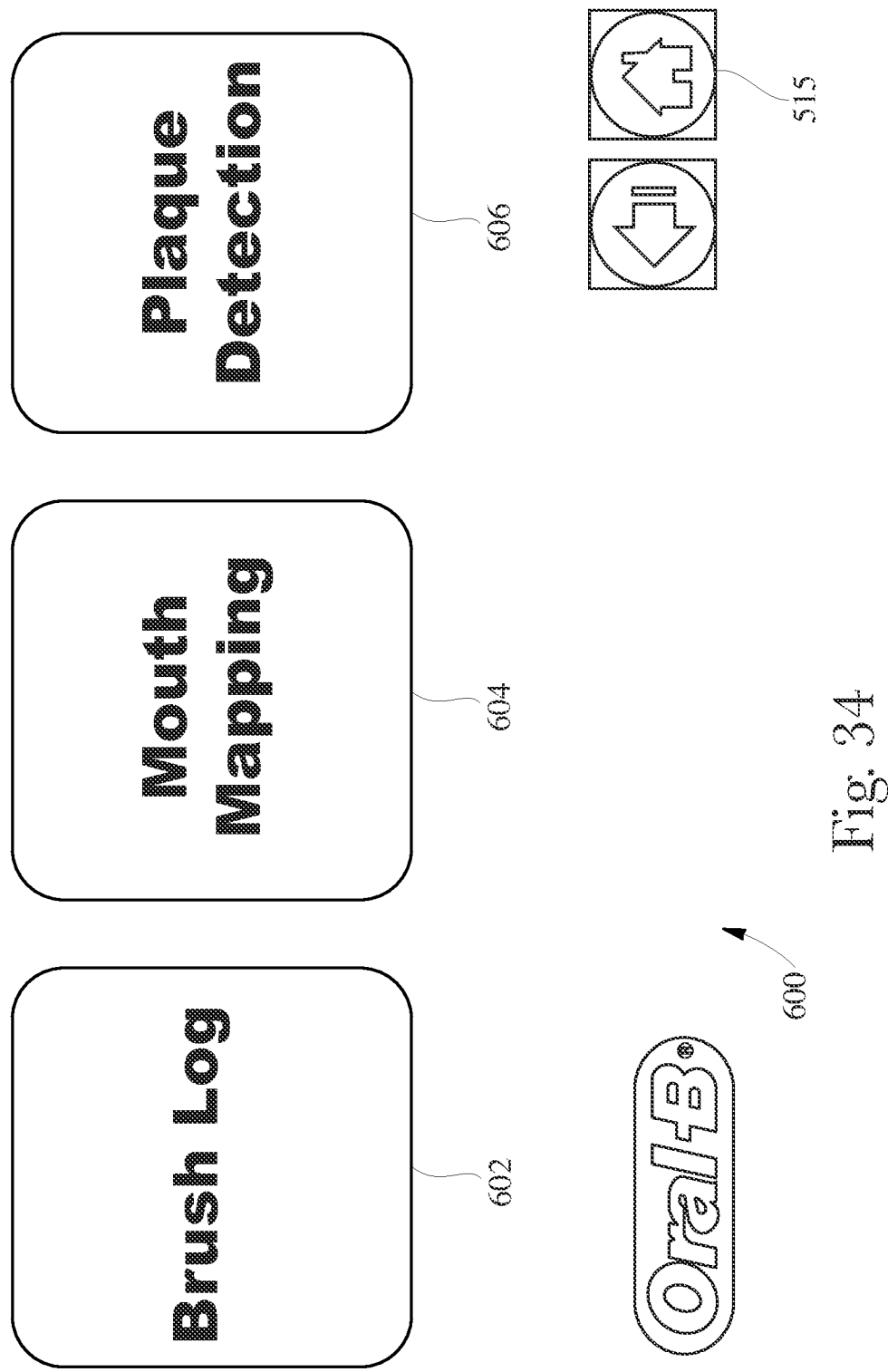

Step 1: Place the probe in your mouth.

Step 2: Press the Scan button on the brush.

Step 3: Slowly scan all surfaces of your teeth.

630

PERSONAL CARE SYSTEMS, PRODUCTS, AND METHODS

CROSS REFERENCE

This application is a divisional of U.S. application Ser. No. 12/775,709, filed on May 7, 2010, which claims the benefit of provisional application Ser. No. 61/176,618, filed on May 8, 2009, and of provisional application Ser. No. 61/180,617, filed on May 22, 2009, each of which is incorporated by reference in its entirety herein.

FIELD OF THE INVENTION

This patent relates to personal care systems, products, and methods, and, in one embodiment, to oral care systems, products, and methods for use in a consumer's home.

BACKGROUND OF THE INVENTION

Consumers use numerous personal care products in their bathrooms, where space can be very limited. There is a desire to provide products and methods for delivering useful personal care (or other) information to consumers before, during, or after use of one or more personal care products.

BRIEF DESCRIPTION OF THE DRAWINGS

FIG. 17 is a cross-sectional side view of the toothbrush of FIG. 15, wherein a bristle field is shown in a first configuration;

FIG. 18 is a cross-sectional side view of the toothbrush of FIG. 15, wherein a bristle field is shown in a second configuration;

FIG. 22 is a representative view of a screen shot of an exemplary personal brushing log screen on the system of FIG. 19;

FIG. 23 is a representative view of a screen shot of an exemplary personal brushing log screen on the system of FIG. 19;

FIG. 24A is a representative view of a screen shot of an exemplary personal brushing log screen on the system of FIG. 19;

FIG. 34 is a representative view of a screen shot of an exemplary personal care selection screen on the system of FIG. 19;

DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. § 112, sixth paragraph.

As used herein, the term "personal care" refers to personal cleanliness, personal hygiene, personal appearance, and/or personal health or well-being of an individual being such as a person.

As used herein, the term "personal care products" refers to any implement, device, tool, applicator, product package, and/or product composition which can be utilized for improving and/or altering personal cleanliness, personal hygiene, personal appearance, and/or personal health or well-being. Non-limiting suitable examples include manual toothbrushes, powered toothbrushes, men's razors, women's razors, men's shavers, women's shavers, trimmers, luffas, sponges, washcloths, self-tanning applicators and cosmetics brushes and applicators.

Figure 1:
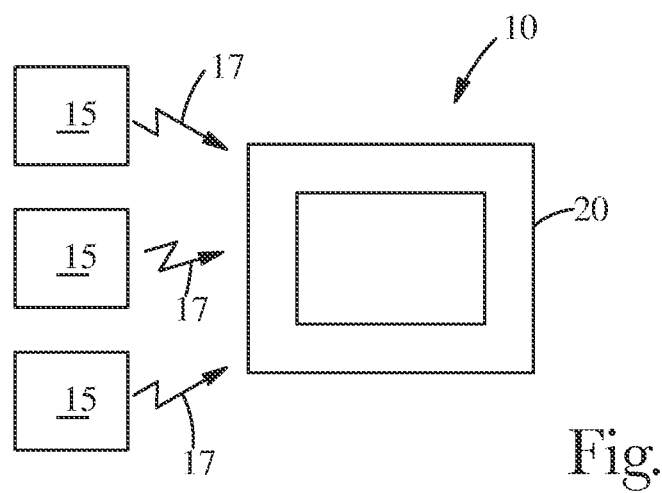
FIG. 1 is a schematic view of an embodiment of the present invention comprising a plurality of personal care systems associated with a display.

Referring to FIG. 1, in one embodiment of the present invention, a personal care system 10 comprises one or more personal care products 15 connected by one or more data links 17 with a display 20 for providing a variety of information, including but not limited to displaying visual information and/or transmitting (i.e., playing via speakers) audio information relating to personal care information, personal care information related to the one or more personal care products 15, personal hygiene information, entertainment, multimedia (e.g., music, videos, television programs, video clips, etc.), data, statistics, Internet content (e.g., web cams, social networks, auctions, media programs and information, etc.), alarms, time, date, calendar information, news, weather, market and/or stock data, and/or any other information or content.

The display 20 can be provided as a stand-alone display that can be mounted or placed upon on a variety surfaces, including hard surfaces such as a mirror or other glass surface, a countertop, a wall, shelf, or it may be mounted on, in, or placed within cabinetry or some other structure. In another embodiment, the display 20 can be provided with a projector that can project visual information onto a surface, e.g. mirror, wall, or the like. The display 20 may comprise audio equipment such as one or more speakers to play audio files separately or in conjunction with video files.

The display 20 can be provided in a portable size and shape so that it can be taken with a user outside of the bathroom. For example, the display 20 can be provided with a belt clip so that it can be attached to a belt of a user, or the display 20 can be taken outside of the home to other locations, such as a dentist office where data stored in the display can be downloaded to a computer or other device for review by the dentist. In one embodiment the display 20 is mounted to a mirror that is adjacent one or more sinks in a bathroom. Alternatively, the display 20 can be provided as part of the personal care product. Multiple displays can also be provided, perhaps as part of both the personal care product and/or as a stand-alone display. While the display 20 can be provided as a small portable display for displaying information, in some embodiments, the display 20 can be multi-function display that may have multiple uses and receive input from sources other than the personal care system 10. Other sources can include any type of sensor, such as temperature sensors, weather or atmospheric sensors, pressure sensors, force sensors, cameras, salivary sensors or other sensors that can analyze biological materials. Other sensors which may be utilized in the present invention are described in U.S. Patent Application No. 2008/0060148 and in U.S. patent application Ser. No. 61/116,327, filed on Nov. 20, 2008 and entitled "Personal Hygiene Devices, Systems and Methods".

In some embodiments, the display might receive a television or radio signal from third party service provider (e.g., a cable company, phone company, wireless phone service provider, combinations thereof, etc.). The display 20 may also be connected to the Internet using either hard-wired or wireless data communications as will be described below herein. The display 20 can be provided in a wide variety of shapes and sizes, although in one embodiment the display 20 is generally rectangular and has a length less than about 30 mm and a width less than about 15 mm. In one form, the display 20 is provided as an LCD (Liquid Crystal Display). The display may comprise any suitable device such as any portable device with a screen that has the capability of connecting to the internet. For example, in some embodiments, the display may be an I-Phone®. Some examples of suitable displays are also discussed in U.S. Patent Application Publication No. 2008/0109973A1.

The one or more personal care products 15 can be any kind of personal care product, including, but not limited to, products selected from the following product categories: oral care products, personal grooming products (e.g., shavers or epilators), personal diagnostic products (e.g., thermometers), hair care products (e.g., shampoos, conditioners, colorants, etc.) and appliances (e.g., hair dryers, curling irons, etc.), cosmetics, toiletries, and any other personal care product. A personal care product can be any product suitable for personal use.

In one embodiment, the invention is used with one or more oral care products. The oral care products can be selected from a variety of oral care product sub-categories, including, but not limited to: manual toothbrushes, electric toothbrushes, rinses, dentifrices, denture care products, floss products, tooth whitening products, and any other product for use in the oral cavity. The oral care products can be one or more products within the same sub-category and/or one or more products from a plurality of sub-categories. For example, the present invention might be used with a manual toothbrush, an electric toothbrush, a dentifrice and a rinse. In other embodiments, the invention can also be used with one or more products from other personal care product categories and/or their sub-categories. For example, the display 20 might be used with a plurality of oral care products and a plurality of shaving products. In addition, more than one user might use the display. For example, the same display, or a plurality of displays might be used by more than one family member who uses one or more personal care products.

The information that can be displayed is quite varied, including personal care information or other information. Personal care information can be related in any manner to the one or more personal care products, their use (including usage history or regimen information such as time of use), or information concerning the user of the personal care product. Some examples of personal care information that can be displayed includes, but is not limited to, identifying information of the personal care products (e.g., name, brand, model, logo, etc); user information; usage instructions; information associated with the features, functions, operational parameters or status of the personal care product (collectively referred to as "functional characteristics" of the product); product usage or regimen information, and product or component replacement information. As an example, the display 20 may show information regarding a comparison of personal hygiene routines between/among family members, between/among multiple families, and/or between/among multiple users (e.g. users of a brushing network).

In addition, other information can be displayed, including but not limited to entertainment, entertainment information, multimedia (e.g., music, videos, television programs, video clips, etc.), data, statistics, Internet content, time, date, calendar information, news, weather, stock updates, web cams, auction information, and/or any other information or content. For example, television broadcasts, still pictures, HTML and other Internet content (e.g., internet widgets), calendars, time and date, multimedia, and Intranet information from a home network may also be displayed. The form of the visual information that can be displayed is quite varied also and can include images, graphics, icons, text, numeric data, alpha-numeric data, graphs, charts, tables, calendars, video, etc. Some examples of suitable internet widgets and internet content are offered by CHUMBY®, Yahoo®, and Frame Channel®.

The displayed information may be associated with one or more characteristics of an electric toothbrush 35, including, but not limited to, the speed, amplitude, or frequency of movement of a bristle holder (or toothbrush head); the force exerted by the toothbrush on a tooth, the status of a feature or function of the toothbrush (e.g., the toothbrush is energized or a feature of the toothbrush is activated or deactivated); the status of a power source (e.g., a battery that is fully charged, 50% charged, or needs to be recharged or replaced); the type of brush head or cleaning elements (e.g., massaging elements, polishing elements, etc.) that are coupled to the electric toothbrush, and/or the configuration of the bristle field, etc. A characteristic of a toothbrush (or any personal care product) may be any aspect concerning the features of the toothbrush, the performance of the toothbrush, or the status of the toothbrush or any of its components.

Embodiments are contemplated where the display 20 provides the user with information regarding the speed; amplitude; frequency of movement of a bristle holder and/or force exerted by the toothbrush on a tooth. The display 20 may also instruct the user to apply less force, apply more force, move the brush slower, move the brush faster, the like, and/or combinations thereof. Depending on the function, e.g. cleaning, polishing, gum massage, tartar reduction, anti-bacterial, whitening, combinations thereof, that the user wishes to perform, the display 20 may instruct the user on ways to perform the function in order to achieve an increased benefit from the function and/or from the combination of multiple functions. For example, for polishing, the display 20 may instruct the user to select a polishing mode on the toothbrush 35 in order to increase the polishing benefit. As another example, for the whitening function, the display 20 may instruct the user to utilize a peroxide dentifrice and/or recommend the utilization of an oral care device, e.g. brush, which can provide a whitening and/or stain removal benefit. The display 20 may further recommend a regimen to the user in order to maximize the whitening benefit, e.g. recommend whitening paste, whitening brush, whitening rinse, etc. The display 20 may be configured such that the user inputs the desired function into the display 20, or, alternatively, the display 20 may be configured to determine the desired function by the type of dentifrice used, the type of rinse used, the toothbrush used, the brush head used, the operation of the toothbrush, etc. and/or the like.

In yet other embodiments, the display 20 may be configured to provide input to the toothbrush 35. For example, where a user chooses to utilize a whitening dentifrice and/or rinse, the display 20 may communicate with the toothbrush 35 and choose the appropriate function for the oral care device, e.g. whitening and/or polishing.

In some embodiments, the toothbrush 35 may further comprise malodor sensors that can detect the presence of certain chemical compounds or agents. The malodor sensor may be disposed in any suitable location. For example, a malodor sensor might be located in the handle of the toothbrush 35 due to its size. The toothbrush 35 can be used to detect oral malodor in the oral cavity in addition to or independently from the functions mentioned herein or combinations thereof. In some embodiments, the toothbrush 35 can be an AM/PM brush (which may be programmable) which can sense or perform certain treatments depending on the time of day, as selected by a user or programmed by the manufacturer. A user may program the toothbrush 35 via display 20.

In some embodiments, the malodor sensor may be included in the display 20. For example, the display 20 may prompt a user to breathe into the malodor sensor on the display 20. Based upon input from the malodor sensor, the display 20 may provide a recommendation to the user regarding an oral hygiene regimen, e.g. the use of a mouthwash. Additionally, the display 20 may communicate with the toothbrush 35 and select a mode of operation based upon the input from the malodor sensor. For example, the display 20 may recommend a tongue cleaning mode for the toothbrush 35 or the display 20 may automatically choose the tongue cleaning mode for the toothbrush 35.

The display 20 can inform the user as to whether or not the user is utilizing the correct parameters for the desired function. For example, if the desired function is cleaning, the display 20 may inform the user to change operational modes on the toothbrush 35; may instruct the user to modify the force being applied to the toothbrush 35 and thereby to the teeth; and/or may instruct the user to utilize a particular dentifrice, rinse, toothbrush, and/or brush head. In another embodiment, the display 20 may automatically choose and/or modify the operational mode of the toothbrush 35 so that the toothbrush 35 performs the desired function. As yet another example, the display 20 may instruct the user to modify their oral hygiene routine. In this example, the display 20 may instruct the user to utilize a particular toothbrush or a particular head on a toothbrush; utilize a particular chemistry in conjunction with the toothbrush or head on the toothbrush; utilize a particular chemistry after brushing; utilize a particular chemistry before brushing; and/or utilize additional oral hygiene steps, e.g. flossing.

In some embodiments, the display 20 may be configured to store regimen data for a user or multiple users. From the stored data, the display 20 may recommend specific functions to be performed, specific chemistries to be utilized; specific oral hygiene steps; specific oral hygiene products; and/or the like. For example, if a user has not flossed in a predetermined time period, e.g. 1 week, the display 20 may signal the user to floss. As another example, if the user has not performed a whitening function within a predetermined time period, e.g. 2 weeks, the display 20 may signal the user to utilize a whitening dentifrice, a whitening rinse, a whitening strip, and/or a whitening/polishing function on the toothbrush 35.

The display 20 may be configured such that the user is provided a signal which corresponds to one of the following conditions: (1) too little force is being applied; (2) too much force is being applied; or (3) a sufficient force is being applied. As yet another example, the output signaling element 30 may be configured such that the user is provided with signals which are selected from the following conditions: (1) too little force is being applied; (2) too much force is being applied; and/or (3) a sufficient force is being applied. In such embodiments, the output signaling element 30 may be configured to provide to the user a signal for each of the following conditions: (1) too little force is being applied; (2) too much force is being applied; and/or (3) a sufficient force is being applied. Other contemplated conditions for which signals can be provided to the user include limits for the sufficient force. For example, high and low ends of a range of the sufficient force can be signaled to the user. In such examples, a lower end of the range of the sufficient force and/or an upper end of the range of the sufficient force can be signaled to the user. In this regard, a sufficient force range can be developed to allow some flexibility to the user.

Several considerations can be taken into account when trying to evaluate the above conditions. For example, mouth feel, cleaning efficacy, etc. With regard to mouth feel, for example, oral care implements comprising cleaning elements which are very soft can generally provide a comfortable mouth feel to a user at forces which are higher than those oral care implements having more stiff cleaning elements. As another example, cleaning elements which comprise elastomeric materials may be more comfortable for a user and therefore may allow a higher force to be applied during brushing while still being within the user's comfort level. With regard to efficacy, cleaning elements having surface features, as described in U.S. Pat. Nos. 5,722,106; 5,836,769; 6,058,541; 6,018,840; U.S. Patent Application Publication Nos. 2006/0080794; 2006/0272112; and 2007/0251040, may require a lower force during brushing to provide sufficient cleaning/plaque removal when compared to cleaning elements having smooth surface features.

Another consideration which can be taken into account includes clinical safety. For example, a force which provides good mouth feel to consumer may cause gum irritation, gum recession, and/or tooth enamel abrasion.

Several variables can affect the considerations above, e.g. mouth feel, cleaning efficacy, clinical safety. For example, users may apply a specific brushing force while utilizing a powered toothbrush and a different force while utilizing a manual toothbrush. As another example, length of the cleaning elements, cross sectional shape of the cleaning elements, e.g. diameter, bending properties, etc. Because of the numerous variables which can impact the above considerations, consumer testing, clinical testing, and/or robot testing may be utilized to empirically determine values for: (1) too little force being applied; (2) too much force being applied; and/or (3) sufficient force being applied; (4) a low end of the sufficient force range being applied; and/or (5) a high end of the sufficient force range being applied, which can still provide comfortable mouth feel, cleaning efficacy, and clinical safety.

Consumer testing and/or clinical testing may provide some insight as to an appropriate value for the upper end of the tolerance of a sufficient force for a particular brush and/or an appropriate value for the lower end of the tolerance of the sufficient force for the particular brush. In general, consumers would try a particular toothbrush and can apply a prescribed force while brushing. After brushing, the consumers may be asked to provide feedback with regard to the feel of the brush in the oral cavity. Additionally, plaque scans can be taken of the oral cavities of consumers prior to brushing and then post brushing. Comparison can be made of the before and after in order to determine efficacy at a particular force. Moreover, clinical testing can be performed on the upper end of the range of the sufficient force to determine whether gum irritation, gum recession, and/or tooth enamel abrasion occurs at this value.

Similarly, robot testing may be utilized to determine efficacy of a particular brush at a given force. In robot testing, generally, a toothbrush is operated by a robot arm which moves the toothbrush in a brushing motion across teeth of a model of an oral cavity. Generally, the teeth of the model are covered by a synthetic plaque which is well known in the art. The robot arm can apply a predetermined force to the toothbrush during the simulation. After the simulation, plaque analysis of the before brushing and after brushing can be compared. From the before and after plaque analysis, a cleaning/efficacy determination can be made. Through iteration, the lower level of sufficient force range may be determined for any cleaning element/massaging element configuration.

Each of consumer testing, clinical testing, and robot testing can provide useful information on the values of force associated with the conditions: (1) too little force being applied; (2) too much force being applied; and/or (3) a sufficient force being applied; (4) a lower end of the sufficient force range being applied; and/or (5) an upper end of the sufficient force range being applied, which can still provide comfortable mouth feel as well as cleaning efficacy.

The same considerations apply for each function, e.g. cleaning, polishing, gum massage, tartar reduction, anti-bacterial, whitening, combinations thereof. The determination of efficacy for each function may vary; however, the results may be analyzed to empirically determine appropriate values for each of the above conditions regardless of the function.

In some embodiments, a value of too much force may be greater than or equal to about 1 Newton, 1.25 Newtons, 1.5 Newtons, 1.75 Newtons, 2.00 Newtons, 2.10 Newtons, 2.20 Newtons, 2.30 Newtons, 2.40 Newtons, 2.50 Newtons, 2.60 Newtons, 2.75 Newtons, 2.85 Newtons, greater than or equal to about 3.00 Newtons, greater than or equal to about 3.50 Newtons, greater than or equal to about 3.75 Newtons, greater than or equal to about 4.00 Newtons, greater than or equal to about 4.25 Newtons, greater than or equal to about 4.50 Newtons, greater than or equal to about 4.75 Newtons, greater than or equal to about 5.00 Newtons, greater than or equal to about 5.25 Newtons, greater than or equal to about 5.50 Newtons, greater than or equal to about 5.75 Newtons, or greater than or equal to about 6.00 Newtons. In some embodiments, a value of too little force being applied may be less than or equal to about 5.00 Newtons, about 4.75 Newtons, about 4.5 Newtons, about 4.25 Newtons, about 4.00 Newtons, about 3.75 Newtons, about 3.5 Newtons, about 3.25 Newtons, about 3.00 Newtons, about 2.75 Newtons, about 2.50 Newtons, about 2.25 Newtons, about 2.00 Newtons, about 1.75 Newtons, about 1.50 Newtons, about 1.25 Newtons, about 1.00 Newtons, about 0.75 Newtons, or about 0.50 Newtons. In some embodiments, values for a low end of a sufficient force range, an upper end of the sufficient force range, and/or the sufficient force range may be selected from any of the values provided above with regard to the too much force and/or too little force conditions.

The display 20 may be utilized with other oral care products. For example, the display 20 could similarly be used with a manual toothbrush and provide similar information to the user with regard to the desired function. Additionally, the display 20 may be utilized with other personal hygiene products. For example, the display 20 may provide information to the user with regard to the utilization of particular skin care products or combinations of skin care products. As another example, the display 20 may provide information to the user with regard to the utilization of particular hair care products or combinations of hair care products, including shampoos, conditioners, colorants, and/or the like. As yet another example, the display 20 may provide information to the user with regard to the utilization of body washes, soaps, lotions, antiperspirants, deodorants, and/or combinations thereof. As yet another example, the display 20 may provide information with regard to the utilization of shaving products, e.g. razors, shavers, shave gels, shave lotions, aftershaves, and/or combinations thereof.

The display may also display information associated with one or more characteristics of an oral care regimen (e.g., tooth brushing cycle), such as, but not limited to, brushing time, brushing time per tooth, recommended brushing location, usage or regimen instructions, or a reward upon completion of the brushing regimen, the amount of time of the tooth brushing cycle spent in the sufficient force range, and/or a daily oral care product reminder (e.g., a reminder to floss or use a rinse). As an example, for tooth brushing cycles which are two minutes, the display 20 may provide the user with the percentage of time in which the user applied sufficient force during the tooth brushing cycle. The display 20 can provide this information regardless of the function chosen, e.g. cleaning, polishing, gum massage, tartar reduction, anti-bacterial, whitening, combinations thereof.

A reward may be provided for amount of time of the tooth brushing cycle spend in the sufficient force range. For example, the reward may be provided to the user if the user applies a force during the tooth brushing cycle which is in the sufficient force range for more than 50 percent of the total brushing cycle. In some embodiments, the reward may be offered to the user, if the user applies a force within the sufficient force range for greater than or equal to about 55 percent, 60 percent, 65 percent, 70 percent, 75 percent, 80 percent, 85 percent, 90 percent, 95 percent, and/or 100 percent of the total time of the tooth brushing cycle.

In some embodiments, the display 20 may be configured to monitor the oral care habits of a particular user or a plurality of users over a predetermined period of time. The predetermined period of time may include more than one oral care routine. For example, the display 20 may monitor the particular user and/or a plurality of users for a week. At the end of the week, the display 20 may process the data gathered from the plurality or oral care routines and provide feedback to the particular user and/or plurality of users based upon their performance of their oral care routines during the past week. For those users utilizing good oral care routines, a reward may be provided by the display. For example, if the user or plurality of users exercise good oral care routines during the predetermined period of time or over a plurality of predetermined periods of time, e.g. a plurality of weeks, a month, a plurality of months, etc., such data may be provided to an insurance carrier either via the display 20 or via a removable memory device. Such demonstration of good oral care routines may allow the user or plurality of users to be eligible for a discount on their dental insurance. Alternatively, or in conjunction with the discount on insurance, a reward may include a coupon and/or options to donate money and/or personal hygiene devices to Red Cross® or any other charitable organization.

As discussed previously, the display 20 may provide information with regard to a comparison between/among family members and/or between/among multiples families, and/or between/among multiple users, e.g. users of a brush network). This may cause particular family members/users to compete in order to gain a reward. The rewards may be as described herein.

Additional information may be displayed on the display. Some examples of such information are provided in U.S. patent application Ser. No. 61/116,327, filed on Nov. 20, 2008 and entitled "Personal Hygiene Devices, Systems and Methods". A characteristic of an oral care regimen may be any aspect concerning who performs the regimen, how the regimen is performed, what products are used with the regimen, when the regimen is performed, why the regimen is performed, the efficacy of the regimen, a user's perception of or satisfaction with the regimen, rewards, or other information concerning the regimen or products used with the regimen.

The display 20 may also display information that is unrelated to the characteristics of the electric toothbrush or the tooth brushing cycle/regimen, such as date/time; calendar; weather information; a joke (e.g., a new joke each day); sports information; news headlines; traffic information; stock quotes; music information where the display contains a speaker for producing music (e.g., broadcast music as well as stored music, such as an MP3 file); and marketing information, such as coupons for the purchase of oral care products associated with the manufacturer of the electric toothbrush or recommendations concerning other oral care products. One example of other information may include information offered through CHUMBY®, Yahoo®, and/or Frame Channel® services and products. In one embodiment, the display 20 can display information associated with a plurality of functional characteristics of the electric toothbrush 35 and information associated with a plurality of characteristics associated with the oral care or toothbrushing regimen, although it will be appreciated that the text, graphics, images, video, icons, and audio described herein can be displayed in any combination, in whole or part, by the display 20. Other visual or audio information may be substituted or provided in any combination.

Further, in addition to images, audio can also be produced or otherwise transmitted from the display, alone or in combination with visual information, including alarms, music, sounds, audio signals, and audio associated with any video or images that are displayed. Thus, the display 20 may include one or more speakers integral to the display or separate from the display. A display need not be provided with the present invention, and in some embodiments the display can be replaced by a device having only a speaker and no display. This audio device can, however, be mounted in the any of the same manners described herein for the display. This device can be connected by a data link to one or more personal care products in the same manner as described herein with respect to the display 20.

While a variety of personal care products can be used with the present invention, for ease of discussion, the invention will now be generally described hereafter with respect to one or more oral care products, although it will be appreciated that the description and various features of the invention can be used with any personal care product or plurality of products such as, for example, razors and/or toothbrushes.

Figure 2A:
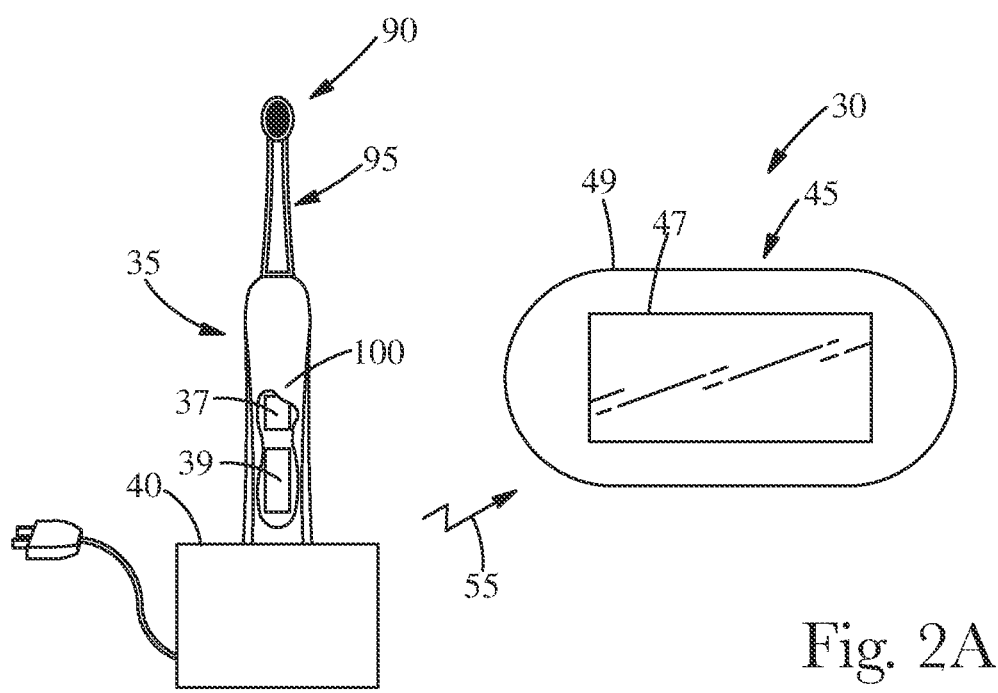
FIG. 2A is a perspective view of another embodiment of the present invention of an oral care system associated with a display.

Referring to FIG. 2, an oral care system 30 comprising an electric toothbrush 35, a base 40 for receiving the electric toothbrush 35, and a visual and/or audio display 45 that is in continuous and/or intermittent data communication with the electric toothbrush 35 and/or the base 40 before, during, and/or after use by a consumer of the electric toothbrush 35. A wide variety of electric toothbrushes can be used with the present invention. The electric toothbrush illustrated in FIG. 2 comprises a motor 37 and an energy source 39 that is in electrical communication with the motor 37. The motor is operatively coupled to one or more movable bristle holders 92 disposed on the head 90 to move one or more of the bristle holders. The bristles holders can rotate, oscillate, translate, vibrate, or undergo a movement that is a combination thereof. The head 90 can be provided as a removable head so that it can be removed and replaced when the bristles (or other component) of the bristle holder have deteriorated. Some examples of electric toothbrushes that may be used with the present invention, including examples of drive systems for operatively coupling the motor to the bristle holders (or otherwise moving the one or more bristle holders or the head), types of cleaning elements for use on a bristle holder, structures suitable for use with removable heads, bristle holder movements, other structural components and features, and operational or functional features or characteristics of electric toothbrushes are disclosed in U.S. Pat. Nos. 4,802,255; 5,577,285; 5,311,633; 5,289,604; 5,722,106; 5,742,972; 5,974,615; 5,836,769; 5,313,909; 5,906,834; 5,926,897; 5,930,858; 5,943,723; 6,648,641; and 6,058,541; 6,018,840; 6,151,745; 6,453,497; 6,475,553; 6,993,804; 7,086,111; 7,207,080; 7,024,717; or in U.S. Pat. Application Publication Nos. 2002/0129454; 2002/0138926; 2005/0000044; 2003/0101526; 2003/0154567; 2003/0163881; 2005/0235439; 2005/0050658; 2005/0050659; 2005/0053895; 2005/0066459; 2004/0154112; 2004/0231078; 2006/0137118; 2006/0288505; 2006/0254006; 2006/0048315; 2006/0191085; 2006/0185105; 2005/0060822; 2005/0155167; 2005/0000043; 2006/0080794; 2006/0272112; 2005/008050; or WO 1994/09677 which are all hereby incorporated by reference herein in their entirety.

Manual toothbrushes may similarly be used in the present invention. The cleaning element configurations as well as components described incorporated by reference above, may be utilized in the manual toothbrush.

The base 40 can be used to recharge the power source, such as a battery, within the electric toothbrush 35. The base 40 can be configured to receive a plurality of electric toothbrushes, or other oral care products such as manual toothbrushes, accessories for the electric toothbrush 35 (such as a plurality of heads or other attachments), and/or other personal care products. The base 40 can be coupled by a power cord to an external source of power, such as an AC outlet (not shown).

The display 45 comprises a screen 47 disposed within a housing 49. The screen 47 can be provided as a liquid crystal (LC) screen. Any suitable screen may be utilized.

Figure 2B:
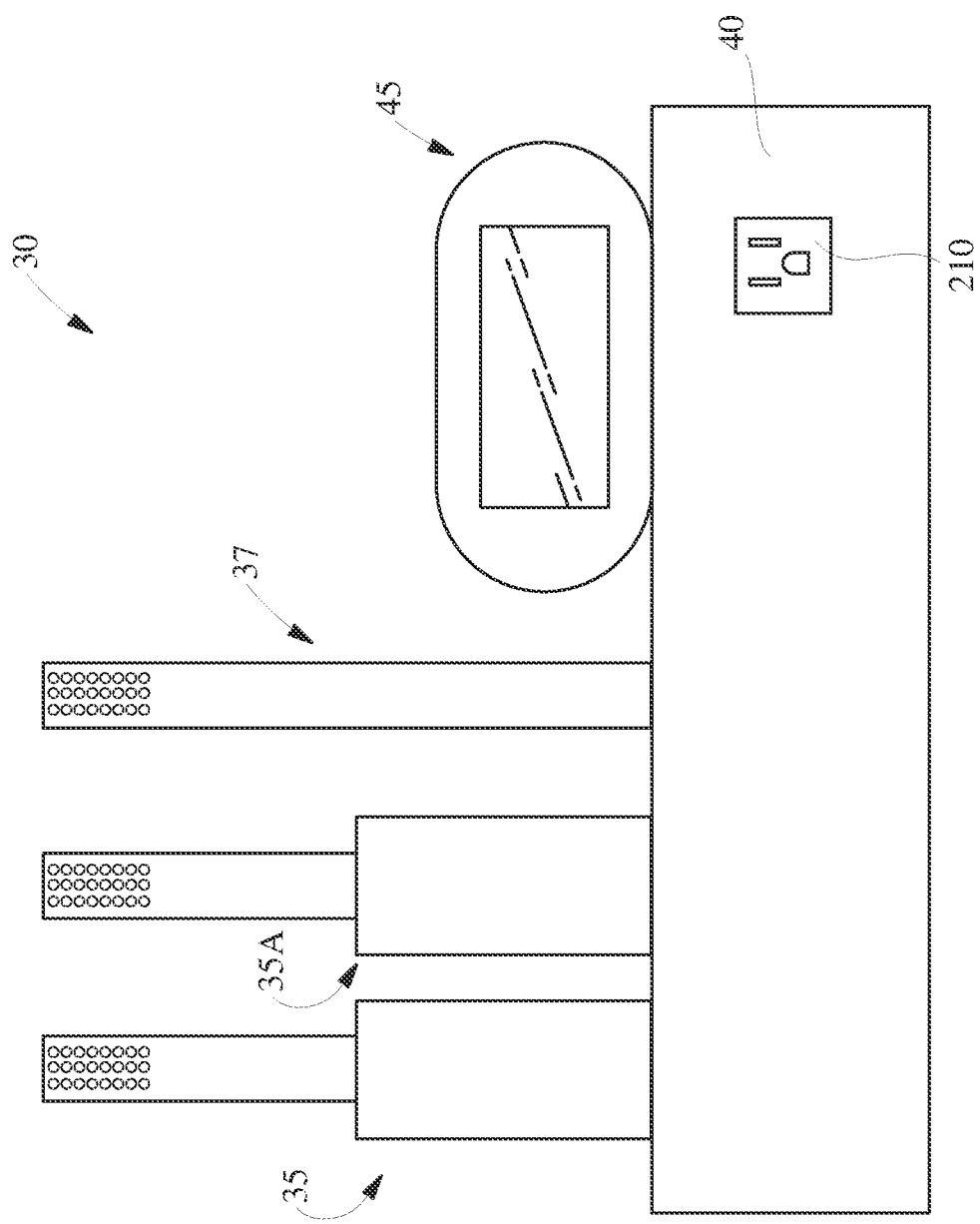
FIG. 2B is a perspective view of another embodiment of the present invention of an oral care system associated with the display of FIG. 2A.

Embodiments are contemplated where the base 40 and the display 45 are integral with one another, as shown in FIG. 2B. For example, the base 40 may include the display 45. The display 45 can be provided on the base 40 in any suitable location. For example for convenience, the display 45 can be attached to the top of the base 40. Embodiments are contemplated where the display 45 is pivotably connected to the base 40 such that a user may adjust the angle of view of the display 45. Still other embodiments are contemplated where the display 45 is otherwise detachable from the base 40. In such embodiments, the base 40 may be configured to recharge the display 45 when the display 45 is placed on and/or near the base 40.

The base 40 may have recharging capabilities such that the toothbrush 35, once placed in the base 40 is supplied with energy to recharge the toothbrush 35. In some embodiments, the base 40 is sized such that a plurality of electric toothbrushes 35 and 35A and/or manual toothbrushes 37 can be deposited in the base 40. In the case where there are a plurality of electric toothbrushes, the recharging capability of the base 40 can be appropriately designed to accommodate for the plurality of electric toothbrushes. Additional embodiments are contemplated where a combination of electric toothbrushes and/or electric shavers, electric razors, or other electronic devices, can be recharged in the base 40. In some embodiments, the base 40 may comprise an electric outlet 210 or a plurality of electric outlets such that other devices may similarly be recharged. For example, a user may connect their mobile phone to the recharging station or some other personal communication device. By sizing the recharging station to accommodate several electronic devices, the bathroom countertop real estate needed to accommodate the recharging station may be reduced as compared to the bathroom countertop real estate required by several charging devices for each of the plurality of devices.

In some embodiments, the base 40 may recharge an electric device via transmission. For example, the base 40 may broadcast specific frequencies, while the devices may be configured to collect such frequencies and/or ambient frequencies and convert such frequencies into power. Such transmission, collection, and conversion systems are described in U.S. patent application Ser. No. 12/102,881, entitled, "Personal Care Products and Methods", filed on Apr. 15, 2008.

Embodiments are contemplated where the base 40 includes a plurality of charging areas. For example, the base 40 may include a first area which can be utilized for recharging or personal hygiene instruments, e.g. toothbrushes, razors, and/or the like, while a second area which can be utilized for recharging of other electric items, for example personal communication devices. Each of the different areas may utilize a different charging mechanism. For example, the first area may utilize inductive charging while the second area utilizes contact charging or vice versa. Alternatively, each of the first area and the second area may utilize any suitable charging mechanism or combination thereof. The base 40 may recharge any of the devices in any suitable manner. For example, by inductive charging, by contact, by broadcast, e.g. radio frequency, or a combination of inductive contact charging, and broadcast charging. The base 40, may be constructed as described above without regard to whether the base 40 includes the display 45.

The oral care system 30 can use a variety of arrangements, singly or in combination, to implement data communication between the display 45 and the electric toothbrush 35 and/or base 40. In one embodiment, the toothbrush 35 and/or the base 40 are in wireless communication with the display 45 via wireless data link 55. The wireless data link 55 may be based upon a suitable short range radio frequency communication technology, such as Bluetooth, WiFi (802.11 based or the like) or another type of radio frequency link, such as wireless USB at 2.4 GHz. For radio transmissions, an antenna can be mounted on a printed circuit board (PCB) disposed in the electric toothbrush 35, base 40, sleeve 60 (see FIG. 3), and/or the display 45.

For infrared (IR) transmissions, one or more IR transmitter diodes can be mounted in the electrical toothbrush 35, the base 40, the sleeve 60, and/or the display 45. An IR wavelength suitable for use with the present invention is 950 nm modulated at 36 KHz. Other wireless data communication technologies may be used such as, for example, radio frequency transmission or cellular transmission. In some embodiments, a plurality of oral care products may be in data communication with the electric toothbrush 35, the base 40 and/or the display 45, as previously described. The data transfer can be one-way and/or two-way, continuous and/or intermittent, modulated, or any combination of the foregoing, between the display 45, the base 40, electric toothbrush 35, and/or any other personal care product. As previously described, the display 45 can be configured to communicate using one or more types (e.g., IP wireless radio, hard-wired, etc.) of data communication methods, and the same display 45 can employ different types of data communication methods with different personal care products.

Figure 3:
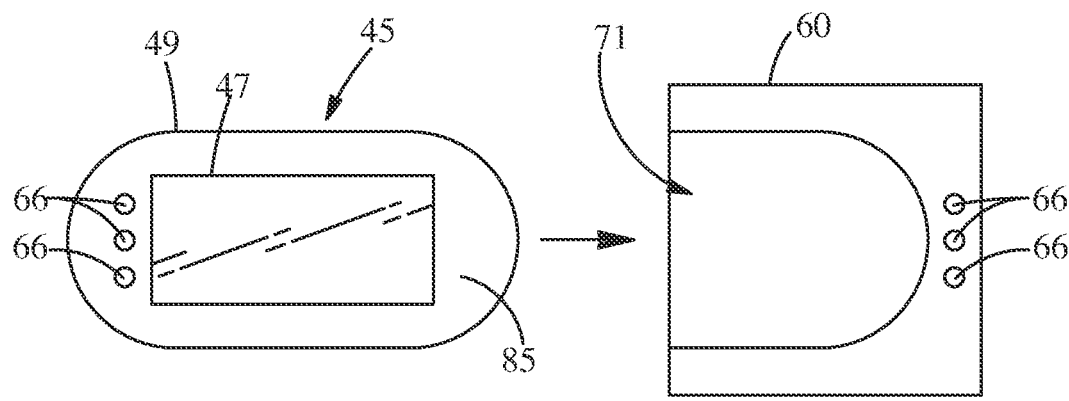
FIG. 3 is a front view the display of FIG. 2A and a mounting structure for slideably receiving the display.

As discussed previously, the display 45 (item 20 in FIG. 1) can be mounted in any suitable manner. For example, as seen in FIG. 3, the display 45 can be slideably received within a mounting structure, such as sleeve 60, for attachment to a surface. Other means of attachment are possible, including but not limited to adhesives, snap-fits, hook and loop fasteners like Velcro, etc.

As set forth above, the display 45 may be operable to provide a variety of information, including but not limited to displaying visual information and/or transmitting (i.e., playing via speakers) audio information data relating to personal care information, personal care information related to the one or more personal care products 15, personal hygiene information, entertainment, multimedia (e.g., music, videos, television programs, video clips, etc.), data, statistics, Internet content (e.g., web cams, social networks, auctions, media programs and information, etc.), alarms, time, date, calendar information, news, weather, market and/or stock data, and/or any other information or content. It should be understood that the display 45 may also be operable to receive and/or transmit the information and/or data to and from other devices.

The display 45 may also include audio equipment such as one or more speakers for transmitting audio alone or in conjunction with visual information. While the display 45 will be described hereafter as containing a screen 47 for displaying visual information such as images, icons, text, graphics, or video, it is contemplated that an audio device that does not have a screen for displaying visual information can be substituted as previously described.

Figure 4:
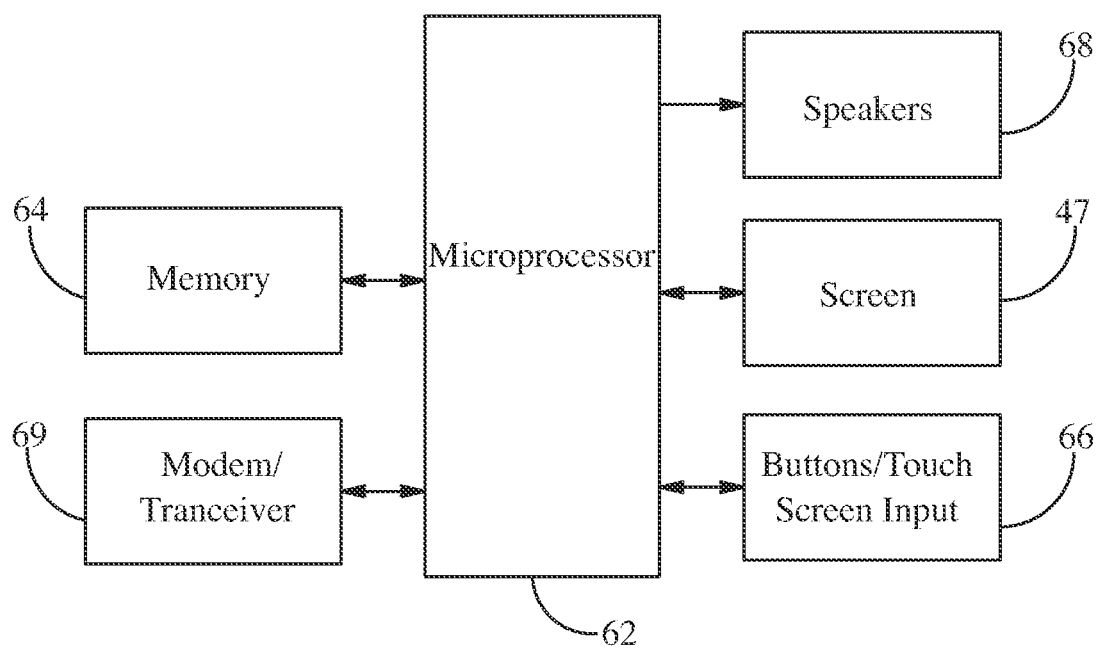
FIG. 4 is a block diagram of electrical and electronic components that can be used with the present invention.

As depicted in FIG. 4, the electric toothbrush 35, display 45, and/or base 40, can include a processor 62 or multiple processors in data communication with memory 64 (or multiple memory devices). The processor 62 may be a general purpose processor, an application specific processor or circuit chip, a microprocessor, or combinations of one or more of the foregoing. The memory 64 may store a variety of information, including any personal care information, entertainment information, or any other useful information, including data associated with oral care analyses (discussed further below). The memory 64 may also contain program code or instructions that affect operation of the processing device 62. The memory may additionally contain stored or cached entertainment information, such as MP3 files, video/graphics and the like. The memory 64 may be erasable/writable non-volatile memory, such as flash memory, dynamic volatile memory, or other suitable memory including replaceable memory media, and/or combinations thereof. The processor 62 can be coupled to various user interface devices including the screen 47, buttons 66 (shown in FIG. 3) associated with the screen 47 and/or the sleeve 60 (shown in FIG. 3), and/or a speaker 68 associated with screen 47. A modem, transceiver or other suitable communication device 69 can couple the processor 62 to networks, broadcast sources and the like.

Referring back to FIG. 3, the various components described above can be distributed between the sleeve 60, display 45, base 40, and/or electric toothbrush 35. Alternatively, the one or more components can be combined on a single circuit board that is disposed in one of the sleeve 60, display 45, base 40, or electric toothbrush 35. The processor 62 (shown in FIG. 4) may initiate an activity automatically as a result of use of the electric toothbrush 35. For example, removal of the toothbrush 35 from its base 40 may initiate a communication between the base 40 and the display 45 to begin displaying, transmitting, receiving, and/or tracking information and data associated with an oral care activity. Alternatively, energization of the toothbrush 35, or activation of a feature thereof, may cause the display, transmission, receipt, and/or tracking of information and data on the display 45. A still further alternative permits a user to select and initiate an activity or display of information via a user interface, e.g., buttons 66 or screen 47 if the screen 47 is configured as a touch screen. The oral care system 30 may also be configured to be responsive to voice commands to select and initiate the display of information. Various combinations of the above are also contemplated. For example, combinations of buttons 66, touch screen, and/or voice command capability may be implemented. As yet another example, a stylus may be utilized interact with the display 45. As yet another example, the brush may be configured to act as a stylus to interact with the display 45. As yet another example, the brush may be configured as a remote for controlling/interacting with the display 45.

The processor 62 (shown in FIG. 4) may be configured to execute a set of instructions and/or a setup application. The setup application can be used to, for example, set a clock or calendar, to couple the oral care system 30 (shown in FIGS. 2A and 2B) to a network or other source of data and the like. The setup application may furthermore allow a user to select graphic themes and images, colors, sounds, messages and the like and to define multiple different users who might interact with the oral care system 30 (shown in FIGS. 2A and 2B) or the display 45, each possibly having a unique graphic theme or images, colors, sounds, etc.

The processor 62 may also be configured to execute a set of instructions associated with one or more analyses of personal care information that is input from sensors, the users, or the personal care products. For instance, analyses of brushing times, oral care regimens and/or habits might be performed (e.g., determining average brushing length, day or evening brushing habits, etc).

Figure 5:
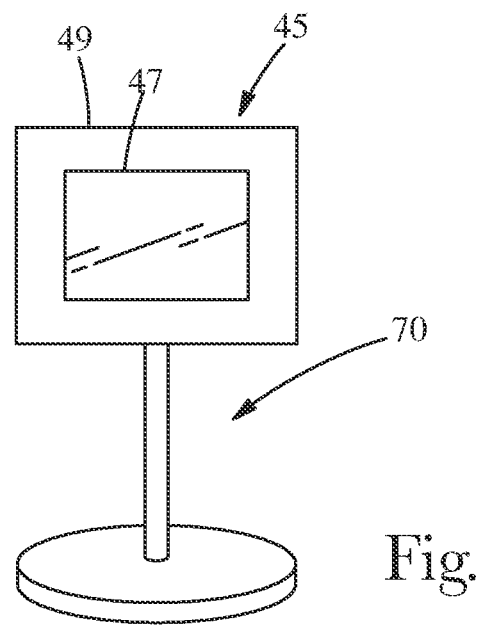
FIG. 5 is a perspective view of another embodiment of the present invention, wherein the display of FIG. 2A is provided with a stand.

Still with reference to FIG. 3, as previously discussed, the display 45 can be used with any suitable mounting structure to allow it to be mounted to a surface, such as a wall or mirror, or placed on a surface, such as a countertop. The surface may be horizontal, vertical or angled from vertical. In one embodiment, the sleeve 60 can be provided for slideably receiving the display 45, as shown for example in FIG. 3. The sleeve 60 can be mounted to the surface using adhesive, screws or any other suitable fastener. Additionally, the sleeve 60 might include a swiveling structure that is articulated to allow the display 45 and/or sleeve 60 to rotate, angle or extend toward a user. A ball and socket structure is one means that could be used to provide a swiveling motion. An alternative mounting arrangement illustrated in FIG. 5 includes an upstanding stand 70 upon which the display 45 is positioned. The display 45 may be secured to the stand 70 or may rest upon the stand without securing attachment. The stand 70 may provide for pivoting, rotating, articulating or other positioning motion to allow adjustment of the position and/or angle of the display 45 relative to the user.

Figure 6:
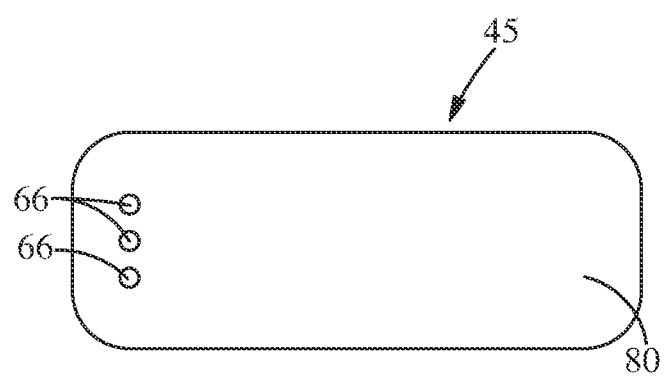
FIG. 6 is a rear view of the display of FIG. 2A.

Referring again to FIG. 3, the sleeve 60 has an opening 71 through which screen 47 of the display 45 can be viewed or accessed when the display 45 is received within, or attached to, the sleeve 60. The display 45 can be removed when necessary to replace one or more batteries (not shown) which can be used to power the display 45. The power source for the display 45 can be disposed within the housing 49 of a display 45. Buttons and/or switches 66 can be located on a rear surface 80 (shown in FIG. 6) of the display 45 to control or enable one or more functions of the display 45 or to otherwise provide data input to the display 45. Alternatively, the buttons can be located on a front surface 85 (shown in FIG. 3) of the display 45, on the sleeve 60 (which can be in electrical communication with the display 45), or the display 45 can incorporate a touch screen so that that data can be input directly using the screen. If the screen 47 is provided with touch sensitive capability, the screen 47 may display virtual buttons and selection features allowing user manipulation, control and option selection to be affected directly through the display 45. In some embodiments, data input to the display 45 or the sleeve 60 might control functions or operations of the electric toothbrush 35 (or another personal care product). For instance, a user might provide an input to the display 45 and/or the sleeve 60 that is transmitted to the base 40 and/or the electric toothbrush 35 to change the operation of the electric toothbrush 35. In other embodiments, buttons or switches 75 can be used to initially set parameters displayed by the display, such as the time and/or date for a clock or calendar that is displayed by the display 45.

In another example, a button or switch 66 might enable a night light function, wherein the screen 47, or a portion thereof, produces a low level light in the evening or overnight. The night light function might be governed by a clock or timer that is associated with the display 45, the base 40, or the electric toothbrush 35. The night light function might also be activated by detection of motion in the bathroom by a motion sensor located in the toothbrush 35, the base 40, the sleeve 60, or the display 45.

Figure 7:
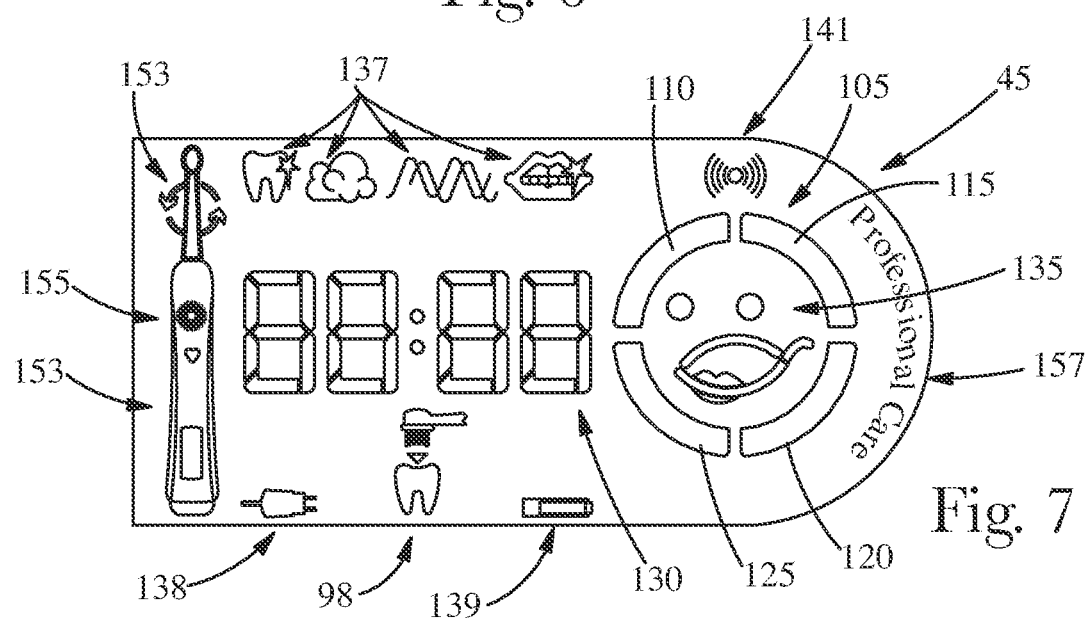
FIG. 7 is a front view of the display of FIG. 2A, illustrating a variety of visual information that can be displayed by the display.

Referring to FIG. 7, in one embodiment, displayable information associated with one or more characteristics of the electric toothbrush 35 will now be described. An example of a pressure image 98 that can be displayed to signal high brushing pressure is shown in FIG. 7. A pressure sensor and/or a force sensor can be incorporated in the head 90 (shown in FIG. 2), neck 95, and/or handle 100 of the electric toothbrush 35. An example of a pressure sensor suitable for use with the present invention is described in U.S. Pat. No. 7,120,960, which is hereby incorporated by reference herein in its entirety. The electric toothbrush 35 or the base 40 can transmit pressure data to the display 45. The display 45 can display the pressure data (or other oral care or personal care information) as numeric, alpha-numeric, textual, images, or graphical information. Alternatively or in combination with the visual information, an audio signal might also be generated. For instance, an audible signal might alert a user that a certain brushing pressure has been exceeded. A suitable example of a force sensor is provided in U.S. patent application Ser. No. 61/220,623, entitled, "Pressure Indicator for An Oral Care Implement", filed on Jun. 26, 2009.

Information associated with one or more brushing modes can also be displayed. For example, images 137 might indicate a basic cleaning mode; a soft brushing mode; a massaging mode; and a polishing mode. The operative brushing mode can be selected by user providing an input to the electric toothbrush 35, the base 40, the display 45, or the sleeve 60 via any user input device. Alternatively, the display 45 may be configured to determine the appropriate mode of the toothbrush 35 (shown in FIG. 2) based upon the type of head used. For example, the head 90 and/or neck 95 may include an identification element, e.g. RFID tag. The display 45 may be configured to determine the type of head 90 and/or neck 95 based upon the detection of the RFID tag. The handle may similarly be configured. Other suitable examples are discussed in U.S. Pat. Nos. 7,086,111; 7,207,080; and 7,024,717.

The electric charge of the electric toothbrush 35 and/or the display 45 can be represented by images 138 and 139, respectively, so that a user knows when a battery may need to be replaced or when the electric toothbrush 35 needs to be recharged. An image 141 can be also provided to indicate whether the display 45 is sending or receiving data. One or more images 153 might also be used to indicate when a component of the oral care system, such as a brush head, needs to be replaced. Data could also be displayed that indicates the amount of useful life left for a component. For instance, the display might display a percentage of the useful life that is left for a brush head (e.g., 25% or 50% might be displayed). Other images or audio that might be produced by the display 45 include indications that a particular function of the toothbrush 35 has either begun or has terminated. For example, if the toothbrush 35 (shown in FIGS. 2A and 2B)

includes an LED, such as described in U.S. Pat. Application Publication Nos. 2005/0053896; 2005/0053895; 2005/0053898; and 2005/00550659, all of which are hereby incorporated by reference herein in their entirety, the display might display an image that indicates the LED is either On or OFF, or the time remaining before it either turns On or turns Off. As another example, if the toothbrush dispenses a composition, such as described in U.S. Pat. No. 6,648,641, hereby incorporated by reference herein in its entirety, the display can display information about whether the toothbrush is dispensing or not dispensing a composition or an identification of what composition is being dispensed. An image 159 of the oral care product (in this case an electric toothbrush) can be provided and portions 155 of the image 159 can be animated (e.g., blink or illuminate) to indicate that a particular function of the electric toothbrush 35 (shown in FIGS. 2A and 2B) is active. In one embodiment, a logo 157 associated with the electric toothbrush 35 (shown in FIGS. 2A and 2B) can be displayed.

Information that can be displayed on the display 45 that is associated with one or more characteristics of the oral care regimen will now be described. Referring again to FIG. 7, the display 45 might display visual and/or audio signals to prompt a user to change the region of the mouth that the user is brushing. For example, the display 45 might display an image 105 representing one or more quadrants of the dentition. As seen in FIG. 7, quadrants 110, 115, 120, and 125 can be displayed which represent the four quadrants of the maxillary and mandibular arches of the dentition of the oral cavity. In one embodiment, each of the quadrants may successively blink and/or change color to indicate when it is time to move onto the next quadrant. A count-up or count-down timer 130 can also be included, wherein the display 45 displays the amount of time remaining in a brushing cycle. The brushing cycle time can either be pre-programmed or set by a user by inputting the time period to a component of the oral care system 30. Embodiments are contemplated where the images of the maxillary and/or mandibular arches are each represented by three or more images. For example, the representation of the maxillary arch may comprise three images representing the teeth on the left side of the mouth, the teeth on the right side of the mouth, and the front teeth. Similarly, the representation of the mandibular arch may comprise three or more images which are mirror images of the images of the maxillary arch. Further images may be included to represent the teeth of the maxillary and mandibular arches.

At the completion of a brushing cycle, which can be conveyed by either the expiration of a time period of the timer 130 and/or an indication that brushing of the last quadrant of the oral cavity is complete (e.g., by illumination, blinking, or a color change of the image associated with the 4$^{th}$ quadrant), a reward can be automatically displayed to the user to indicate successful completion of the brushing regimen. In one embodiment, a smiling face 135 can be displayed within the brushing quadrants to indicate completion of the brushing regimen. The reward can be helpful in promoting completion of the oral care regimen. A reward can comprise visual and/or audio information that is intended to stimulate a desire to complete a particular task or regimen, or visual and/or audio information which a user finds desirable or pleasurable to view and/or hear upon completion of a task. The reward can be used to signal the completion of a task, or the completion of a task can be signaled by other visual and/or audio information. In some embodiments, the user can select or input (e.g., via the display 45) the type of the reward (e.g., image) that is displayed or audio that might be played. The reward can be displayed in a variety of ways and may or may not be associated with the image 105. In some embodiments, the reward can be provided as data stored with a personal care product (e.g., as part of memory 64 or an RFID tag, discussed below) and may be unique between personal care products. One personal care product might store data associated with a first reward while a second personal care product stores data associated with a second, different reward. The reward could be associated with themes, slogans, colors, logos, icons, images, or other graphic or visuals that are uniquely associated with the personal care product, its packaging, or its marketing/advertising characteristics or messages. For instance, a child's toothbrush having a handle in the shape of a race care might contain data for a visual reward associated with car racing. Data for a plurality of rewards could be associated with a single personal care product so that different rewards could be displayed with each use of the toothbrush to refresh or maintain user interest or might be selectable by a user.

Figure 8:
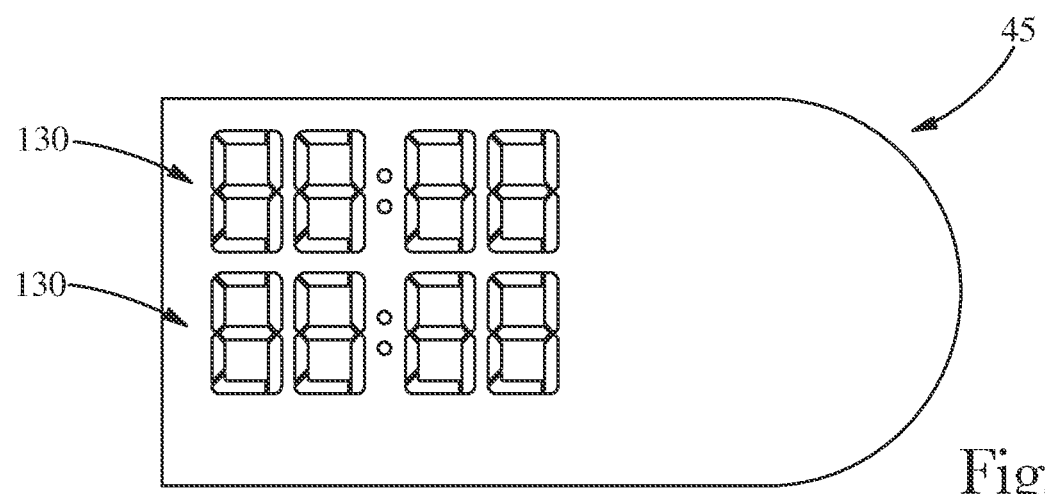
FIG. 8 is a front view of another embodiment of the display of FIG. 2A, wherein a plurality of timers is illustrated.

A plurality of either count-up and/or count-down timers might be displayed on the display 45. In some embodiments, 1, 2, 3, 4, or 5 timers might be provided. For instance, one timer might display the time associated with an overall oral care regimen (e.g., how much time out of 2 minutes remains) while a second timer might display the time associated with one or more sub-regimens or toothbrush functions within the oral care regimen (e.g., how much time remains for a light that illuminates the oral cavity to remain on during the regimen and/or how much time remains for the dispensing of a composition from the toothbrush). An example of such a display is shown in FIG. 8. One or more of the timers might be directly activated by a user of the display (e.g., as by a button on the display) rather than by data transmission between the display and the electric toothbrush.

In another embodiment, the display can interactively display questions and/or information associated with one or more characteristics of an oral care regimen. For instance, the display might display one or more questions and one or more answers that can be selected by a user via a touch screen or buttons. The questions might be displayed at the beginning, during, or at the end of one or more oral care or brushing regimens. The functional characteristics of the electric toothbrush 35 or information concerning the oral care regimen might be automatically changed or adjusted depending on the answers to the one or more questions. For instance, a question might ask if the brushing experience was too hard or soft. Depending on the answer, the speed, frequency, force sensor and/or pressure sensor limit value (i.e., the value at which a warning is displayed that too much force and/or pressure has been applied) of the electric toothbrush might be automatically adjusted, or the amount of time displayed for the timer might be adjusted. The processor 62 could implement these changes in response to the input from the user. In another instance, the display might display information concerning alternate products or instructions concerning the use of the electric toothbrush 35 (or its accessories) that might provide an improved brushing experience. In another instance, the answer to one question might lead to a second question. For example, a question might ask whether the user was pleased with the brushing experience. An answer of "no" might lead to one or more follow up questions, such as did the user experience any tooth sensitivity. If the answer were "yes", the processor 62 could implement one or more changes in the operation or characteristics of the electric toothbrush to reduce tooth sensitivity (e.g., altering the speed, frequency, amplitude of the brush head movements, recommending different brush heads and/or altering the bristle configuration). The memory 64 can store the instructions and data associated with the questions, answers, and algorithms for the sequence of questions. These instructions and data can be periodically updated if the oral care system is connected to a network.

Some information that can be displayed on the display 45 that is not related to the characteristics of the electric toothbrush 35, or characteristics of the oral care regimen, will now be described. A coupon code (or equivalent) that can be redeemed for a coupon or discount (either via the Internet or in store) can be provided at a variety of times during use of the electric toothbrush 35. For example, a coupon code might be displayed after a predetermined period of brushing or when a component, such as a toothbrush head, should be replaced. The coupon code can be displayed when multiple products from the same manufacturer are used or when certain characteristics of an oral care regimen have been fulfilled (e.g., completion of a predetermined number of brushing cycles that have lasted for a minimum period of time, such as 2 minutes). Other information, such as weather, music, news, sports scores, stock quotes, etc., can be streamed to the oral care system for display on the display 45

Figure 9:
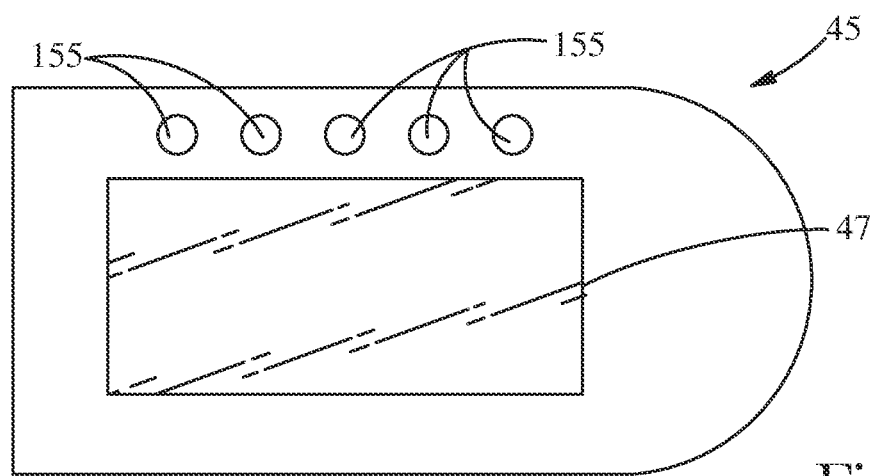
FIG. 9 is a front view of another embodiment of the display of FIG. 2A, wherein the display comprises a plurality of light sources.
Figure 11:
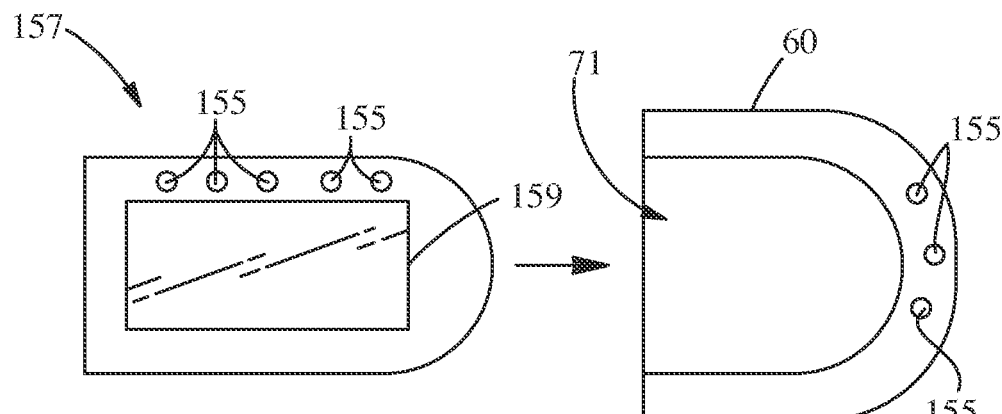
FIG. 11 is a front view of an alternate embodiment of the device of FIG. 10, wherein the mirror and light sources are sliding received within a mounting structure.

Referring to FIGS. 9 and 11, in another embodiment, the display 45 and/or the sleeve 60 can incorporate one or more light sources 155 to illuminate the oral cavity. Examples of light sources include light emitting diodes, laser diodes, flash lamps, and any other light or electromagnetic energy source. The light sources can be arranged in a variety of patterns on either the display 45 and/or the sleeve 60, including in a line, along an edge of the display 45, or any combination thereof. A diffuser or lens can be placed over the one or more light sources 155 to diffuse or focus the light as desired. The diffuser or lens can be adjustable so that the intensity and/or the size/shape of the light pattern can be varied depending on user preference. In another embodiment, the light intensity can be varied by altering the voltage and/or current to the one or more light sources 155, to increase or decrease the intensity. The voltage and/or current can be varied by a switch, button, or dial located on the display 45 and/or sleeve 60 that is in electrical communication with the one or more light sources 155.

Figure 10:
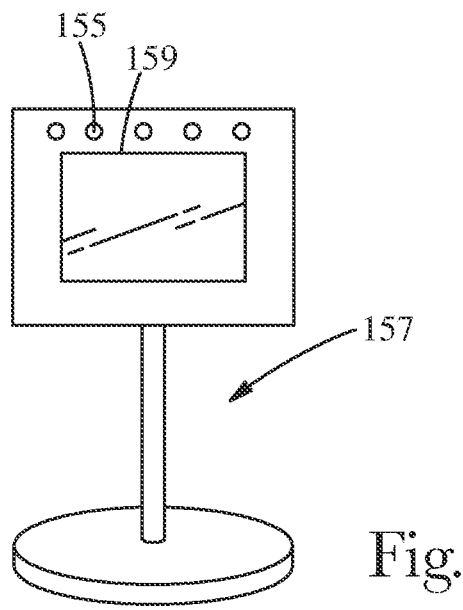
FIG. 10 is a perspective view of another embodiment of the present invention, illustrating a device comprising a mirror and a plurality of light sources.

In another embodiment, the one or more light sources 155 may be disposed on a device 157 having a stand 158 but which does not include the screen 47, as shown in FIG. 10. In this embodiment, the screen 47 might be replaced by a mirror 159 so that the light sources 155 illuminate the oral cavity and the mirror 159 of the device 157 can be used to view the oral cavity. Embodiments are contemplated where the mirror 159 is filtered. Some suitable examples of mirrors and light sources are described in U.S. patent application Ser. No. 61/049,904, entitled "Products and Methods For Disclosing Conditions in the Oral Cavity", filed on May 2, 2008.

The device 157 can be provided in a variety of shapes and sizes. The device 157 and/or or the one or more lights sources can be configured to rotate or swivel so that a user can direct the light from the light sources in a manner that best illuminates the oral cavity, including hard and soft tissue like the teeth and gums. In one embodiment, a plurality of mirrors can be provided, wherein one of the mirrors magnifies the reflections from the oral cavity to improve the detailed viewing thereof.

In one embodiment, the one or more light sources 155 of the display 45 or the device 157 can be used with an oral care composition, such as a dentifrice or rinse, that comprises a disclosing agent or a plurality of disclosing agents. The disclosing agent can be utilized to provide visual indication of one or more conditions of the oral cavity to an observer and/or user. As used herein, the phrase "conditions of the oral cavity" is used to refer to dental plaque, tartar, debris, tooth decay, bio films, soft tissue abnormalities, soft tissue lesions, etc. within the oral cavity. As used herein, the terms "plaque" and "dental plaque" are used to refer to a biofilm that builds up on teeth, on gingival tissue, oral hard tissue, and/or oral soft tissue. "Plaque bacteria" means bacteria that causes plaque to form.

The visual indication of oral conditions to the observer and/or user can assist the observer and/or user in removal of the conditions or in identifying conditions which should be treated by a professional, e.g. dentist, oral surgeon, etc. The disclosing agents may visually indicate a condition within the oral cavity by providing a visual contrast between the conditions of the oral cavity and other tissues and surfaces within the oral cavity. For example, a disclosing agent may be selected such that when the disclosing agent is subjected to energy from an energy source, such as the light sources 155 of the display 45, the disclosing agent fluoresces at locations of the oral conditions. Other examples of providing visual contrast are discussed hereafter. As a specific example, the disclosing agent may be applied to the oral cavity and visually highlight and/or indicate remaining plaque to a user and/or observer.

In some embodiments, any agents, materials, elements, compounds, or compositions, which will absorb light energy at a first range of wavelengths and, in response, emit light at second range of wavelengths can be a suitable disclosing agent, so long as it is safe for use in the manner intended here. In some embodiments, the first range of wavelengths may be different than the second range of wavelengths. For example, the disclosing agent may comprise a fluorophore.

Some examples of suitable disclosing agents include fluoroscein, dibromofluoroscein, tribromofluoroscein, tetrabromofluoroscein, other fluorescein derivatives (including salts thereof), xanthenes, pyrenes, e.g. pyranine, D&C Blue No. 1, D&C Blue No. 2, D&C Green No. 3, D&C Red No. 3, D&C Red No. 6, D&C Red No. 7, D&C Red No. 21, D&C Red No. 22, D&C Red No. 27, D&C Red No. 28, D&C Red No. 33, D&C Red No. 40, D&C Yellow No. 5, D&C Yellow No. 6, D&C Yellow No. 10, combinations thereof or any other dye approved for use in drugs and cosmetics by regulatory agencies such as, for example, The United States Food and Drug Administration. Other suitable disclosing agents may include dyes sold under the trade name Alexafluor™ by Invitrogen Corporation located in Carlsbad, Calif.

In embodiments where the disclosing agent comprises a fluorophore, the disclosing agent may be selected such that the disclosing agent fluoresces in response to electromagnetic energy from the light sources 155 having wavelengths which range from about 380 nm to about 780 nm, or any individual number within the range. In some embodiments, the disclosing agent may fluoresce in response to electromagnetic energy having wavelengths which are greater than about 380 nm, greater than about 390 nm, greater than about 400 nm, greater than about 410 nm, greater than about 420 nm, greater than about 430 nm, greater than about 440 nm, greater than about 450 nm, greater than about 460 nm, greater than about 470 nm, greater than about 480 nm, greater than about 490 nm, greater than about 500 nm, greater than about 510 nm, greater than about 520 nm, greater than about 530 nm, greater than about 540 nm, greater than about 550 nm, greater than about 560 nm, greater than about 570 nm, greater than about 580 nm, greater than about 590 nm, greater than about 600 nm, greater than about 610 nm, greater than about 620 nm, greater than about 630 nm, greater than about 640 nm, greater than about 650 nm, greater than about 660 nm, greater than about 670 nm, greater than about 680 nm, greater than about 690 nm, greater than about 700 nm, greater than about 710 nm, greater than about 720 nm, greater than about 730 nm, greater than about 740 nm, greater than about 750 nm, greater than about 760 nm and/or less than about 780 nm, less than about 770 nm, less than about 760 nm, less than about 750 nm, less than about 740 nm, less than about 730 nm, less than about 720 nm, less than about 710 nm, less than about 700 nm, less than about 690 nm, less than about 680 nm, less than about 670 nm, less than about 660 nm, less than about 650 nm, less than about 640 nm, less than about 630 nm, less than about 620 nm, less than about 610 nm, less than about 600 nm, less than about 590 nm, less than about 580 nm, less than about 570 nm, less than about 560 nm, less than about 550 nm, less than about 540 nm, less than about 530 nm, less than about 520 nm, less than about 510 nm, less than about 500 nm, less than about 490 nm, less than about 480 nm, less than about 470 nm, less than about 460 nm, less than about 450 nm, less than about 440 nm, less than about 430 nm, less than about 420 nm, less than about 410 nm, or less than about 400 nm.

In some embodiments, the disclosing agent may fluoresce in response to electromagnetic energy from the light sources 155 having wavelengths which are from about 400 nm to about 530 nm. For example, in one specific embodiment, the disclosing agent fluoresces in response to electromagnetic energy having a wavelength of about 470 nm. In other embodiments, the disclosing agent may fluoresce in response to electromagnetic energy having wavelengths between about 400 nm to about 440 nm. In other embodiments, the disclosing agent may fluoresce in response to electromagnetic energy having wavelengths between about 440 nm to about 530 nm. Additionally, embodiments are contemplated where the disclosing agent fluoresces in response to electromagnetic energy having wavelengths which are outside of the visible light spectrum, e.g. either higher or lower, combinations of higher and lower, and/or combinations of higher, lower, and visible spectrum. For example, embodiments are contemplated where the disclosing agent fluoresces in response to ultraviolet light, e.g. UVA about 315 nm to about 400 nm; UVB about 280 nm to about 315 nm; and/or UVC less than about 280 nm.

In some embodiments, the disclosing agent may emit electromagnetic energy having wavelengths of greater than about 400 nm. For example, disclosing agent useful in the present invention may emit electromagnetic energy having wavelengths which are greater than about 410 nm, greater than about 420 nm, greater than about 430 nm, greater than about 440 nm, greater than about 450 nm, greater than about 460 nm, greater than about 470 nm, greater than about 480 nm, greater than about 490 nm, greater than about 500 nm, greater than about 510 nm, greater than about 520 nm, greater than about 530 nm, greater than about 540 nm, greater than about 550 nm, greater than about 560 nm, greater than about 570 nm, greater than about 580 nm, greater than about 590 nm, greater than about 600 nm, greater than about 610 nm, greater than about 620 nm, greater than about 630 nm, greater than about 640 nm, greater than about 650 nm, greater than about 660 nm, greater than about 670 nm, greater than about 680 nm, greater than about 690 nm, greater than about 700 nm, greater than about 710 nm, greater than about 720 nm, greater than about 730 nm, greater than about 740 nm, greater than about 750 nm, greater than about 760 nm and/or less than about 800 nm, less than about 780 nm, less than about 770 nm, less than about 760 nm, less than about 750 nm, less than about 740 nm, less than about 730 nm, less than about 720 nm, less than about 710 nm, less than about 700 nm, less than about 690 nm, less than about 680 nm, less than about 670 nm, less than about 660 nm, less than about 650 nm, less than about 640 nm, less than about 630 nm, less than about 620 nm, less than about 610 nm, less than about 600 nm, less than about 590 nm, less than about 580 nm, less than about 570 nm, less than about 560 nm, less than about 550 nm, less than about 540 nm, less than about 530 nm, less than about 520 nm, less than about 510 nm, less than about 500 nm, less than about 490 nm, less than about 480 nm, less than about 470 nm, less than about 460 nm, less than about 450 nm, less than about 440 nm, less than about 430 nm, less than about 420 nm, or less than about 410 nm.

Figure 12:
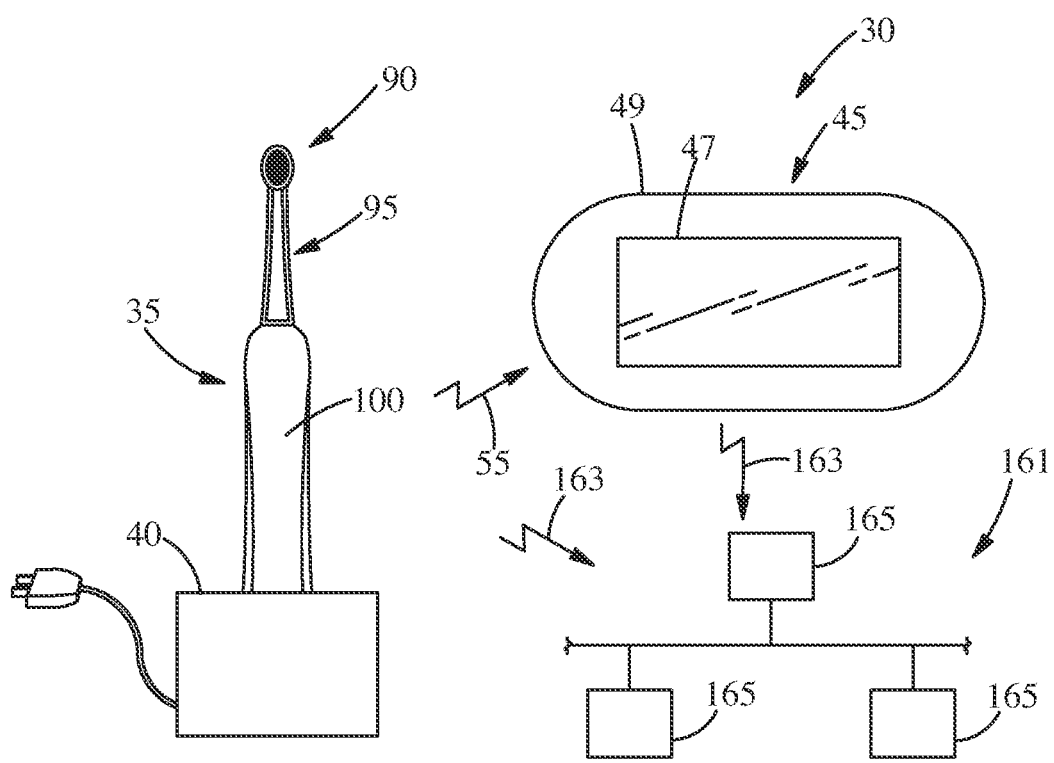
FIG. 12 is a schematic view of another embodiment of the present invention comprising an oral care system that is linked to a network.

Referring to FIG. 12, the oral care system 30 may further be adapted to communicate data between itself and a network 161, including local area networks (LANs), wide area networks (WANs), portions of the Internet such as a private Internet, a secure Internet, a value-added network, a virtual private network, or a cellular network. The oral care system 30 (including the toothbrush 35 and/or the display 45) can communicate with the network 161 by a data link 163, which can be a wireless or a signal line. Suitable network clients 165 may include personal computers, laptops, workstations, disconnectable mobile computers, mainframes, information appliances, personal digital assistants, and other handheld and/or embedded processing systems. The signal lines that support communications links to the network 161 and clients 165 may include twisted pair, coaxial, or optical fiber cables, telephone lines, satellites, microwave relays, modulated AC power lines, and other data transmission "wires" known to those of skill in the art. Further, signals may be transferred wirelessly through a wireless network or wireless LAN (WLAN) using any suitable wireless transmission protocol, such as the IEEE series of 802.11 standards. Although particular individual and network computer systems and components are shown, those of skill in the art will appreciate that the present invention also works with a variety of other networks and computers.

Figure 13:
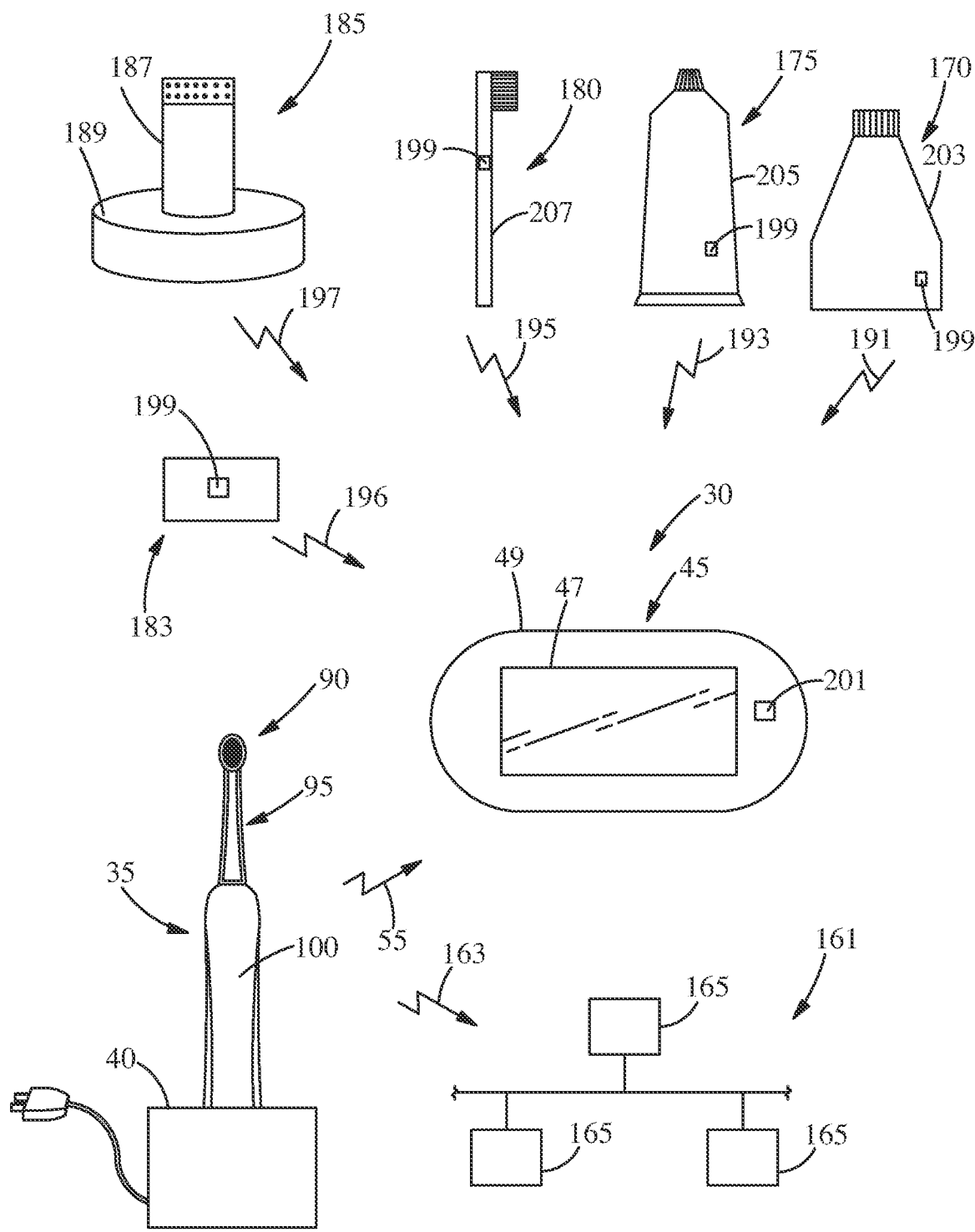
FIG. 13 is a schematic view of an alternate embodiment of the present invention comprising a plurality of personal care products.

Referring to FIG. 13, the oral care system 30, a plurality of oral care products 170, 175, 180, and 183, and a non-oral care personal care system 185 are illustrated. The oral care product 170 is illustrated as a packaged oral care rinse product; the oral care product 175 is illustrated as a packaged dentifrice product, the oral care product 180 is illustrated as a manual toothbrush product, the oral care product 183 is illustrated as a packaged tooth whitening product (e.g., as disclosed in U.S. Pat. No. 5,891,453, and hereby incorporated by reference herein in its entirety), and the personal care system 185 comprises an electric razor 187 that is received within a base 189. Examples of razors that are suitable for use with the present invention are disclosed in U.S. Pat. Nos. 6,594,904; 6,442,839; 6,298,559; 6,295,734; 6,237,232; 6,216,349; 6,212,777; 6,041,926; 5,787,586; 6,192,586; 6,185,822; 6,052,903; 6,889,438; 6,029,354; and 6,161,287; or U.S. Pat. Application Publication Nos. 2006/0200992; 2005/198842; 2006/0080837; 2006/0032054; 2006/0032055; 2006/0037107; and 2006/0032053, which are all hereby incorporated by reference herein in their entirety. The oral care products 170, 175, 180, and 183 can communicate using data links 191, 193, 195, and 196, respectively, with the display 45.

The personal care system 185 can communicate via data link 197 with the display 45. While certain products have been shown for ease of discussion, it will be understood that a variety of products and personal care systems can be substituted. The data links can be wireless or via signal lines as previously discussed. The personal care system 185 and products 170, 175, 180, 183 may also be connected to a network as previously described. As will be appreciated, the present invention is suitable for use with products that comprise an internal power supply as well as products that do not, such as a packaged rinse product.

As previously discussed, the products and systems of the present invention can use a variety of methods and devices to store, transmit and/or communicate data between the systems/products and the display. The term "data" is intended to refer to any digital or analog information in any form that is transferred or communicated between two devices or components. Data may include any data actively transmitted by a data transmitter and/or data that is passively detected by a data reader. Data may include ones and zeroes if the data that is communicated is digital. In another embodiment, data could be a series of digits, such as 12345678, wherein each digit could represent information about a characteristic of an oral care device (e.g., for a manual toothbrush, the first digit could represent the brushing time in minutes, the second digit could represent the number of months until the brush should be replaced, the third and fourth digits could represent a type unique reward, etc.). Data may include the arrangement of optical elements (e.g., a bar code) that represent information. Data may include the presence or absence of electromagnetic energy (e.g., such as a magnetic field) and the like. The data may be interpreted or decoded by the processor 62. For instance, where the data is a series of digits, such as 12345678, the processor 62 and/or associated memory could comprise a set of instructions that would be able to decode or interpret the data to determine what information is represented by the data.

A data transmitter is a device or component that actively transmits data to a data reader. An RFID tag is an example of a data transmitter. A data communicator is a device or component that may or may not actively transmit data but which has data that is capable of being detected. While a data transmitter, such as an RFID tag, is a type of date communicator, a data communicator need not necessarily actively transmit data. Examples of data communicators that contain data that that may be detected or read by a data reader but which do not actively transmit data include a bar code (wherein the bar code reader is the data reader), a spotcode, or a hall effect magnet (wherein the hall effect sensor is the data reader). Thus, as will be appreciated, the phrases "data communicators", "data transmitters" and "data readers" are intended to encompass a wide variety of devices and arrangements for the transmission, communication, and/or detection of a variety of analog or digital data, including the mere detection of the presence of a data communicator. The phrase "data communication" is intended to encompass all the methods and forms by which data may be transmitted, communicated, and/or detected by a devices of the present invention, including data readers, data transmitters, data communicators, as well as data communication between a two components such as a display and an electric toothbrush.

A data reader can be associated with an electric toothbrush in variety of ways. For example, the data reader can be provided in the toothbrush handle, a charging station, a detached display or other detached device, a toothbrush stand, etc. In one embodiment, a data transmitter can be provided as a radio frequency identification (RFID) tag that can be used to transmit data between the personal care product and the display 45. As known in the art, an RFID tag comprises an electronic chip that contains encoded information and an antenna that transmits and/or receives information or data (including information stored by the chip) using radio waves. A reader is used to decode the data transmitted from the RFID tag. The RFID tag may be provided without an internal power supply, and the minute electrical current induced in the antenna by the incoming radio frequency signal from the reader provides just enough power for the integrated circuit in the tag to power up and transmit a response to the reader. The RFID tag can be a read only tag or a read/write tag. The data stored by a read only tag is pre-programmed, typically by a manufacturer, in non-volatile memory and cannot be changed by a later user of the personal care product or system. The data stored by a read/write tag can be later rewritten to the tag during later use, typically by the reader.

The data stored by the RFID tag or other data transmitters/communicators can be quite varied, including any personal care information. Some of the categories of data includes product identification data (e.g., the brand name or product name) and product usage or regimen data (e.g., usage time, such as 1 minute regimen for a rinse, text or graphical instructions concerning product usage), one or more rewards, and component or product replacement data (e.g., number of times or length of time that a component or product can be used before it should be replaced). Instructional images, text, or data can be particularly useful for children in establishing appropriate brushing regimens. Data can be directly displayed on the display 45 or can be used as an input to the processor 62 (FIG. 4) for a function or feature of the display 45. For example, an RFID tag 199 for the rinse product 170 could store usage data that states the recommended usage time for the product is 1 minute. The RFID tag can transmit the usage data to a reader 201 associated with the display 45. The usage data can be used as an input for a count-up or count-down timer (e.g., 130 in FIG. 7) that is then set to one minute. To initiate the data transmission from the RFID tag 199 to the reader 201, the product containing the RFID tag 199 need only be placed in sufficient proximity to the reader 201 to power-up the RFID tag.

The RFID tag can be embedded within or attached to the packaging of a personal care product, such as the rinse bottle 203 or the dentifrice tube 205. The RFID tag 199 might also be attached to or embedded within the product itself where possible. For instance, the RFID tag might be embedded or attached to the handle 207 of the manual toothbrush 180.

The data communication between a data communicator and a data reader can occur at a variety time before, during, or after an oral care regimen and can be sequential or modulated. For instance, each of a plurality of oral care products having an RFID tag might be moved in proximity of the display 45 so that the RFID tag can transmit its data to a reader 201 that is part of the display 45, the sleeve 60, or another component of one of the personal care systems. The data transmission can occur prior to each usage of the oral care product or may only need to occur once, such as the first time the product is used, and the data is thereafter stored by the reader 201 (or the memory 64) or a component associated with the reader 201. A counter can be implemented that stores the number of times that data is transmitted from the RFID tag to the reader 201 for each personal care product.

In one method of the present invention, the manual toothbrush 180 having an RFID tag 199 can be moved near the display 45 having the reader 201 to transmit identification, usage information, and replacement information to the reader 201. The identification data can comprise the name of the product, and the usage data can comprise the recommended usage time (e.g., 2 minutes per brushing cycle). The replacement data can comprise the number of times that the manual toothbrush can be used before it should be replaced and/or the amount of time, e.g. minutes and seconds, that the toothbrush has been used. Replacement may be desirable if the bristles have degraded sufficiently to affect the cleaning performance of the toothbrush.

The reader 201 reads the transmitted data and the display 45 displays the name of the product and initiates a 2 minute timer for a brushing regimen. Each time the manual toothbrush 180 transmits data to the reader 201, a counter implemented by the processor 62 increments by one. Once the counter reaches the value of the replacement data, the display 45 can display an image, text, or other signal that the manual toothbrush 180 (or any replaceable component of other products) should be replaced. If the display is in data communication with a computer network, a replacement product could automatically be ordered for the user.

In some embodiments, the manual toothbrush 180 might also be moved in reading proximity of the reader 201 at the end of the brushing cycle, wherein the second data transmission to the reader within a predetermined period of time (e.g., 5 minutes) can be used to indicate the termination of the brushing cycle by the user. In these embodiments, replacement data may include the cumulative usage time of the brush adding the time periods from each brushing experience.

The reader 201, or components associated therewith, can be programmed to analyze the start and stop points of a plurality of brushing cycles and to display helpful feedback to the user of the personal care products and/or systems. For instance, average brushing times/dates might be displayed. The analytical data might be displayed at predetermined times according to a calendar function associated with display 45 (e.g., once a week). Based upon the data shown, the display may provide input to the user. For example, the display 45 may indicate that the user tends to brush a shorter time period in the evenings as opposed to the morning or vice versa.

Next, the user might move the rinse package 203 near the display 45 to transmit its data to the reader 201 after which the display 45 could display the product identification data and initiate a timer for use of the rinse by the user. Likewise, the packaged tooth whitening product 183 can be moved near the display 45 to transmit its data to the reader 201 after which the display 45 could display the product identification date and initiate a timer for the length of use of the tooth whitening product by the user (e.g., 5, 10, 15, 20, 25, or 30 minutes). Reminders for future use of the packaged tooth whitening product 183, or other product, could also be displayed based upon a calendar function or analysis of the oral care regimen data.

One or more of the personal care products, displays, devices, and/or system components described herein can be bundled together for distribution to a user as a kit. For example, a packaged dentifrice product, a manual toothbrush product, and a packaged rinse product in combination with a display capable of communicating with each of these products can be provided as a kit.

Figure 14:
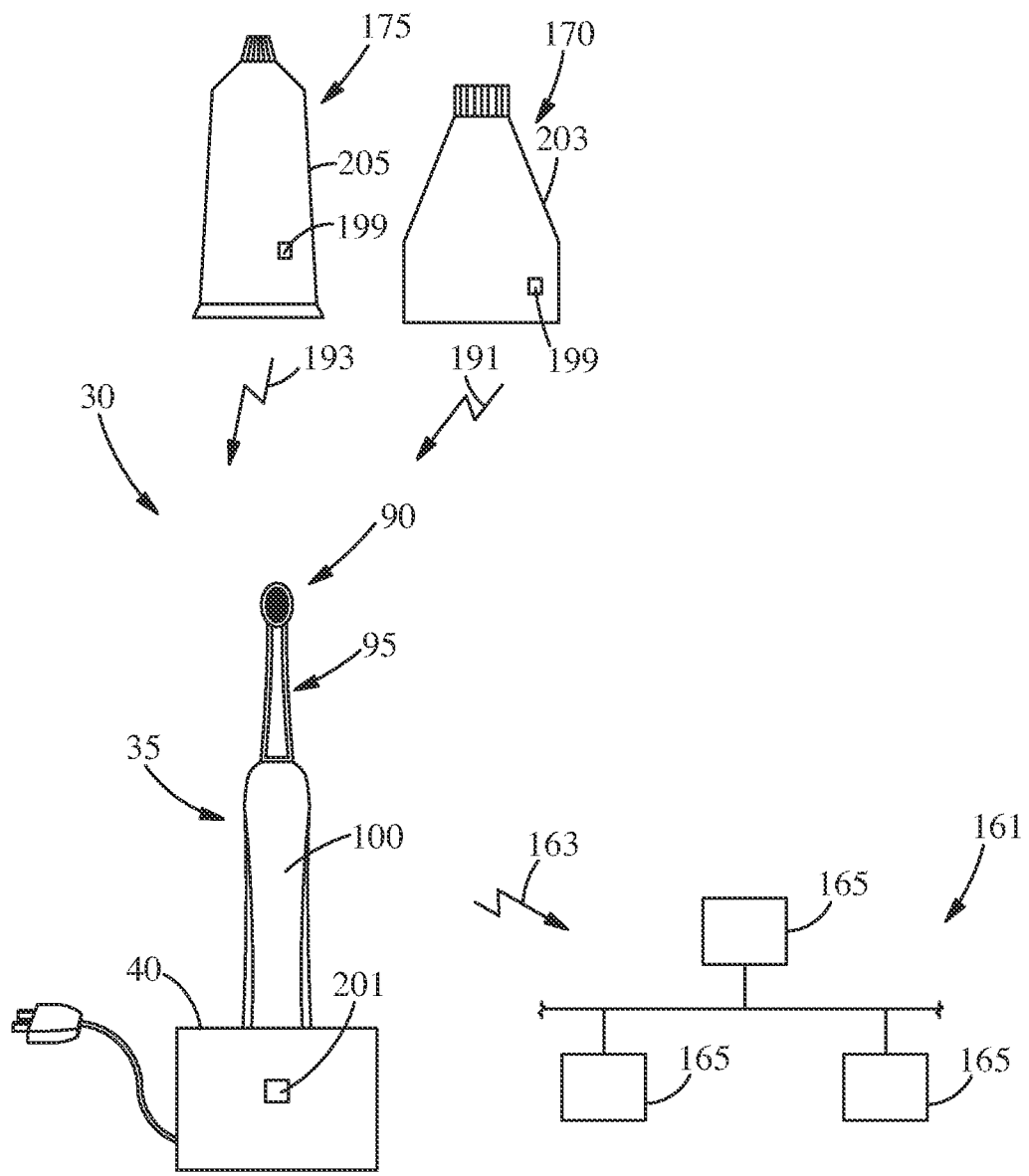
FIG. 14 is a schematic view of another embodiment of the present invention comprising a plurality of personal care products.

In another embodiment, one or more oral care products can communicate directly with the electric toothbrush and/or its base. Referring to FIG. 14, a system 30 comprising a plurality of oral care products 35, 170 and 175 is illustrated. The oral care product 170 is illustrated as a packaged oral care rinse product and the oral care product 175 is illustrated as a packaged dentifrice product. The oral care products 170 and 175 can communicate using data links 191 and 193 with the electric toothbrush 35 and/or its base 40. While certain products have been shown for ease of discussion, it will be understood that a variety of other products and personal care systems can be substituted. The data links can be wireless or via signal lines as previously discussed. The system 30 and products 35, 170, and 175 may also be connected to a network 161 via a data link 163, as previously described.

The system 30 can incorporate one or more of the electrical components previously described and illustrated in FIG. 4. In one embodiment, the electrical components are incorporated in the electric toothbrush 35 and/or the base 40. In another embodiment, the electrical components are incorporated in the handle 100 of the electric toothbrush 35. The oral care products 170 and 175 can each incorporate one or more data communicators 199. The data communicators can be provided in any form, including but not limited to an RFID tag, a bar code, a shot code (e.g., an arrangement of black and white blocks which can be detected), or a magnet as previously described. A reader 201 may be located on the base 40, as shown in FIG. 14, or may be associated with the electric toothbrush 35. The reader 201 is capable of data communication with the data communicators 170 and 175. The data that may be transmitted by the data communicators and/or detected or received by the reader is varied and can be any of the information previously described.

In one example, the data communication includes data concerning the type of dentifrice or rinse that is part of the packaged products 170 and 175. With regard to the packaged dentifrice product 175, the data can include a code or description of the dentifrice or its ingredients, such as a sensitivity dentifrice, polishing dentifrice, light activated dentifrice, whitening dentifrice, etc. The data may be processed by the one or more processors 62 to determine, modify, change, implement, control, activate, initiate, and/or set one or more characteristics of the electric toothbrush 35. The characteristics of the electric toothbrush 35 can be quite varied and may include any of the characteristics previously described.

Figure 15:
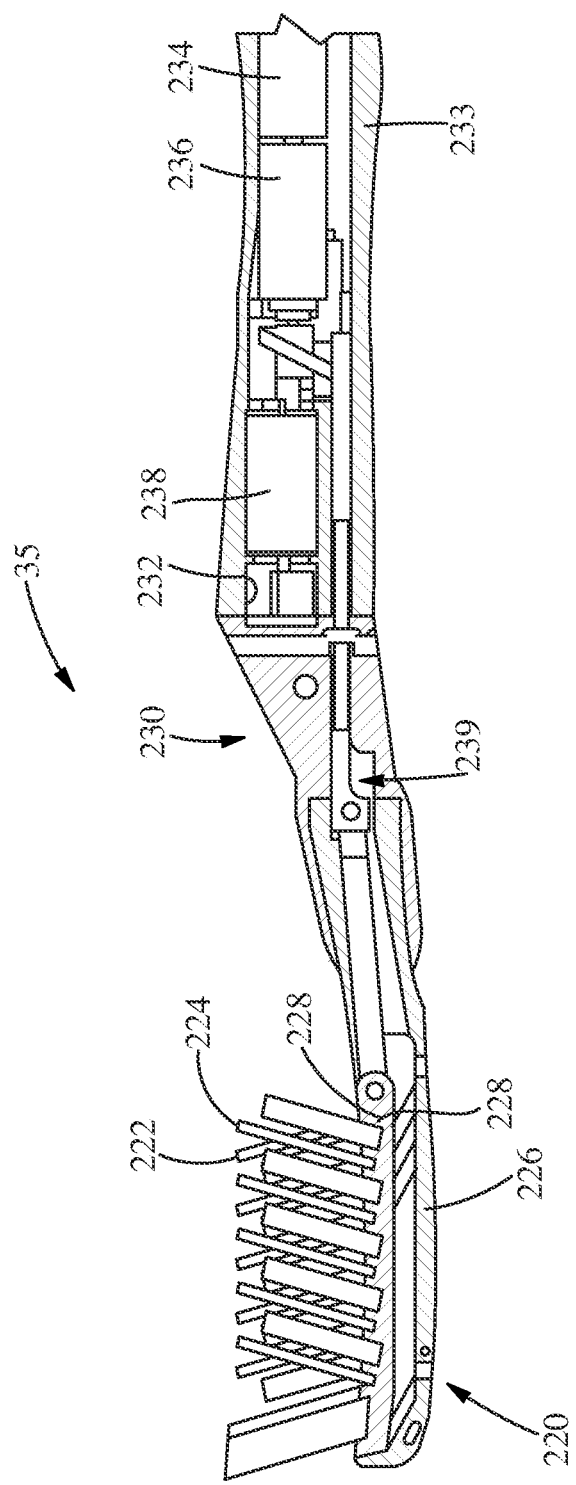
FIG. 15 is a cross-sectional side view of a toothbrush suitable for use with the present invention.
Figure 16:
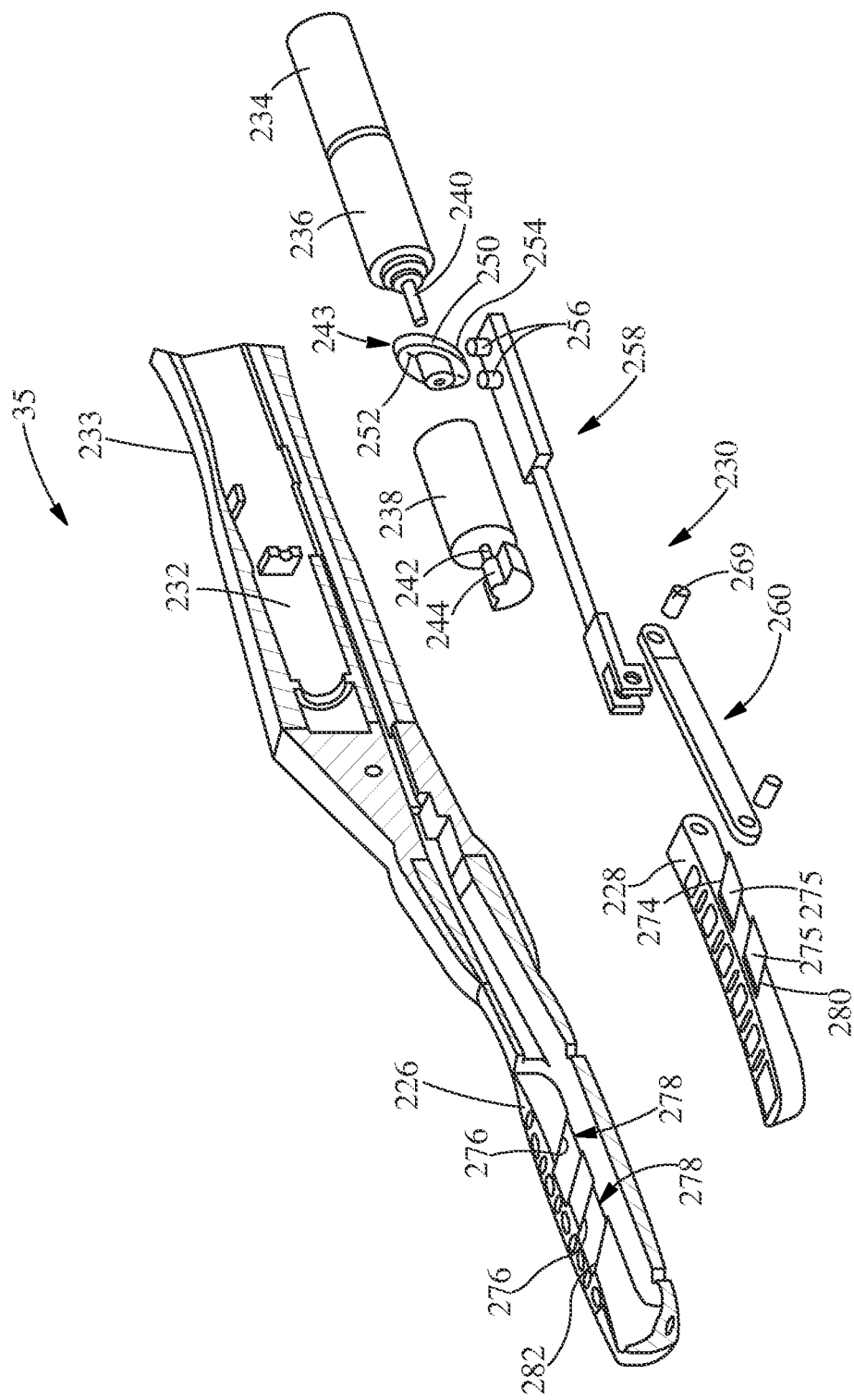
FIG. 16 is an exploded perspective view of the toothbrush of FIG. 15.

In one embodiment, the characteristic may include the bristle field configuration, which may be adapted or changed as a result of the processing of data communicated by the data transmitter to the reader, which is then communicated to the processor 62. Referring to FIGS. 15, 16, and 17, an electric toothbrush 35 is illustrated whose bristle field configuration may be changed as a result of processing data from a data transmitter or communicator. The toothbrush 35 comprises a head 220 and an outer bristle field 222 and an inner bristle field 224. Additional bristle fields may also be provided. The outer bristle field 222 may extend from a fixed component 226, and the inner bristle field 224 may extend from a movable component 228. In some embodiments, a portion of the outer bristle field 222 may extend from the fixed component 226 and/or the movable component 228. Additional embodiments are contemplated where a portion of the inner bristle field 224 extends from the fixed component 226 and another portion of the inner bristle field 224 extends from the movable component.

An actuator assembly 230 can be disposed within a cavity 232 of the handle 233 of the electric toothbrush 35. In some embodiments, the actuator assembly 230 includes a power source 234, a first motor 236, a second motor 238, and a drive system 239. The power source 234 is schematically depicted to include, for example, a battery such as a AA or AAA battery. The first motor 236 may include an electric motor powered by the battery and may include an output shaft 240 (shown in FIG. 16). The second motor 238 may include an electric motor, which may also be powered by the battery, having an output shaft 242 and an eccentric weight 244.

The drive system 230 may operably couple the first motor 236 to the movable component 228 of the head 220. The first motor 236 may operate as a conventional rotary motor to spin the output shaft 240 and drive the drive system 230. The second motor 238 may also include a conventional rotary motor; however, upon actuation, the eccentric weight 244, which is attached to the output shaft 242, may cause the toothbrush to vibrate similarly to the Oral-B Pulsar™ toothbrush that is commercially available from The Procter & Gamble Company and described in U.S. Pat. No. 6,564,416 and U.S. Pat. Application Publication No. 2005/0235439, both of which are hereby incorporated by reference herein in their entirety. Additionally, embodiments are contemplated where a user may select between actuation of either or both of the motors 236, 238. In some embodiments, the motors 236, 238 may work in conjunction with each other, and/or independently of one another.

With continued reference to FIG. 15, as well as FIG. 16, the handle 234, the fixed component 226, and the movable component 228 may be separate components. These components may be formed separately and subsequently assembled. As mentioned above, the handle 234 may include a cavity 232 containing the actuator assembly 230. In the depicted form of the handle 234, the cavity 232 is complexly shaped to securely accommodate each of the components of the actuator assembly 230, as well as a portion of the fixed component 226 of the head 220. However, in an alternate form, the cavity 232 may be uniformly shaped and the components of the actuator assembly 230 may be fixed therein with an adhesive or some other device. In still another form, the fixed component 226 of the head 220 and handle 234 may be formed of a single piece or separate pieces.

During operation, the power source 234, for example a battery, may provide electrical energy to the first motor 236. The output shaft 240 of the first motor 236 may then effect a rotation of a drive cam 248. As the drive cam 248 rotates, a flange 250 rotates and the inclined surfaces 252, 254 continuously slidably engage bosses 256 on linear follower link 258. This sliding engagement converts the rotational motion of the first motor 236 into linear displacement of the linear follower link 258. The linear follower link 258 thus drives the articulation link 260 and finally, the movable component 228.

Referring to FIG. 17, the movable component 228 is illustrated in a first position, which defines a first configuration for the bristle field(s) of the head 220 of the toothbrush 35. In this position, the axially forward portion 262 of the flange 250 of the drive cam engages the bosses 256 on the linear follower link. So configured, the linear follower link 258 is disposed in its left-most position relative to the orientation of FIG. 17. Consequently, the articulation link 260 is disposed in its left-most position. Additionally, the movable component 228 of the head 220 is disposed in its left-most and upward-most position relative to the fixed component 226. So positioned, the outer bristle field 222 and the inner bristle field 224 are generally aligned in height. Said another way, the outer bristle field 222 terminates at a first plane, which is identified by reference numeral 266 in FIG. 17, while the inner bristle field 224 terminates at a second plane, which is identified by reference numeral 268 in FIG. 17. In the first configuration, the first and second planes 266, 268 are generally the same plane. Thus, FIG. 18 depicts the bristles of the toothbrush 35 including the outer bristle field 222 and the inner bristle field 224 defining a first configuration of the head 220.

In this first configuration, the outer bristle field 222 is adapted to perform a first cleaning operation, while the inner bristle field 224 is adapted to perform a second cleaning operation. The first and second cleaning operations may generally identical, but direction dependent, or may not be generally identical. The first and second cleaning operations may include a surface cleaning operation, as well as an interproximal cleaning operation.

As the first motor 236 rotates the drive cam 248 to the second position indicated in FIG. 18, which defines a second configuration for the head 220 of the toothbrush 35, the axially rearward portion 284 of the flange 250 becomes disposed between the bosses 256 on the linear follower link 258. So configured, the linear follower link 258 is disposed in its right-most position, relative to the orientation of FIGS. 17. Consequently, the articulation link 260 is disposed in its right-most position. Finally, the movable component 228 of the head 220 is disposed in its right-most and downward-most position relative to the fixed component 226. In this second position, the outer bristle field 222 extends a predetermined distance beyond the inner bristle field 224. Said another way, while the outer bristle field 222 still terminates at the first plane 266, the inner bristle field 224 terminates at the plane 268. The plane 268 is generally parallel to and offset below the plane 266. In one form, the plane 268 is disposed approximately between about 0 to about 10 millimeters below the plane 266 or any individual number within the range. Thus, FIG. 18 depicts the bristles of the toothbrush 35 including the outer bristle field 222 and the inner bristle field 224 defining a second configuration of the head 220.

Therefore, it should be appreciated that as the first motor 236 rotates the drive cam 248, the drive cam 248 displaces the linear follower link 258, which in turn displaces the articulation link 260 and the movable component 228, in some embodiments. More specifically, as the drive cam 248 displaces the linear follower link 258 from the first position illustrated in FIG. 17 to the second position illustrated in FIG. 18, for example, the linear follower link 258 pulls the articulation link 260 and causes it to slightly rotate in the counterclockwise direction about pin 269. Additionally, in some embodiments, as the articulation link 260 pulls the movable component 228 from the first position illustrated in FIG. 17 to the second position illustrated in FIG. 18, the rearward surfaces 274 of the bosses 275 on the movable component 228 (see FIG. 16) slidably displace along the rearward surfaces 276 of the slots 278 in the fixed component 226. Accordingly, the opposite occurs when the drive cam 248 displaces the movable component 228 from the second position illustrated in FIG. 18 to the first position illustrated in FIG. 17. Specifically, as the drive cam 248 displaces the linear follower link 258 from the second position illustrated in FIG. 18 to the first position illustrated in FIG. 17, the linear follower link 258 may push the articulation link 260 and cause it to slightly rotate in the clockwise direction about pin 269. Additionally, as the articulation link 260 pushes the movable component 228 between the second position illustrated in FIG. 18 to the first position illustrated in FIG. 17, the forward surfaces 280 of the bosses 275 on the movable component 228 may slidably displace along the forward surfaces 282 of the slots 278 in the fixed component 226. Thus, during use, the actuator assembly 230 may displace the inner bristle field 224 between two heights and longitudinal positions relative to the outer bristle field 222 thereby defining the two configurations of the head 220 discussed above.

The actuation of the first motor 236 to move the movable component 228 between the first and second positions may be controlled by the processor 62 as a result of the analysis of the data communicated between the reader 201 and the data communicators 199. In other embodiments, the processor 62 may control, including variable control, the speed, frequency, and/or amplitude of one or more bristle carriers or bristle fields as a result of the analysis of data communicated between the reader 201 and the data communicators 199. For example, the processor 62 may control operation of the motor 234 to move the movable component 228 to the bristle configuration shown in FIG. 18 (a first configuration) when the data communicated to the processor 62 indicates, or has been analyzed to indicate that, the packaged dentifrice product 175 may provide a sensitivity benefit to a consumer. The bristle configuration shown in FIG. 18 may be configured to provide a sensitivity benefit, such as fewer bristles contacting the teeth resulting in a less aggressive tooth and gum feel, such that the first configuration provides the same, similar, and/or synergistic benefit with the dentifrice. The sensitivity benefit of the dentifrice may be provided by one or more ingredients or agents. An example of some ingredients which may be suitable is described in U.S. Pat. Application Publication No. 2002/0041852, hereby incorporated by reference herein in its entirety. The sensitivity benefit may be identified to the consumer by one or more images, phrases, or slogans associated with the packaged dentifrice product 175. The data that is communicated to the processor 62 may include an identifier that that the dentifrice has a sensitivity benefit or an identifier for one or more of the ingredients or agents of the dentifrice. In addition or alternatively, the processor 62 might control the operation of motor 238 so that the motor rotates at a speed that delivers a less aggressive movement or vibration (frequency and/or amplitude) to the head 220 and the bristles thereof. Other benefits that may be delivered by a dentifrice product, or other oral care product, and which may have data, such as an identifier, that is communicated to the processor 62 include, whitening, polishing, malodor, anti-gingivitis, anti-cavity, anti-tartar, anti-erosion, and anti-plaque benefits as well as combinations thereof. The data that is communicated to the processor 62 from the dentifrice product 175 may identify one or more ingredients, agents or actives of the dentifrice, including but not limited to any of those described in U.S. Pat. Nos. 6,846,478; 6,740,311; and 6,696,045; or U.S. Pat. Application Publication Nos. 2004/0126335; 2006/0171907; and 2003/0124065, which are hereby incorporated by reference herein in their entirety.

Referring to FIGS. 19-36, exemplary embodiments of a personal care system 300 is shown. The personal care system 300 may comprise any of the personal care systems, oral care systems, and/or displays shown and described heretofore. In the exemplary embodiment shown, the personal care system 300 comprises a display 350. In addition, the personal care system 300 may comprise a personal care product (e.g., one or more of the personal care products 15, 35, 170, 175, 180, 183, and/or 185 shown in FIGS. 1-14 and 19). The display 350 may be operable to run a variety of applications (e.g., software, programs, HTML, byte-sized and/or small applications (e.g., widgets as used in a CHUMBY®, Yahoo®, and/or Frame Channel®), etc.) that enable the display 350 to provide a variety of information, including but not limited to displaying visual information and/or transmitting (i.e., playing via speakers) audio information data relating to personal care information, personal care information related to one or more personal care products (or, for example, one or more personal care products 15, 35, 170, 175, 180, 183, and/or 185 as shown in FIGS. 1-14 and 19), entertainment, multimedia (e.g., music, videos, television programs, video clips, etc.), data, statistics, Internet content (e.g., web cams, social networks, auctions, media programs and information, etc.), alarms, time, date, calendar information, news, weather, market and/or stock data, and/or any other information or content. In one or more embodiments of the personal care system described below herein and shown in FIGS. 19-36, the display is configurable by a user to change the information that is displayed, how long it is displayed, what order it is displayed, and what format it is displayed in, thus providing a customized or personalized display of information by the display for one or more users.

It should be understood that the display 45 may also be operable to receive and/or transmit the information to and from other devices (e.g., handheld devices (e.g., IPODS), computers, networks (e.g., WLAN, LAN, WiFi, Bluetooth, WAN, cellular, etc.), and/or the Internet (e.g., Private Internet, Public Internet, etc.). These applications may be loaded and/or stored onto a separate computer (e.g., a desk top, laptop, etc.) and placed into a variety of categories that may include, but not be limited to, Animals, Animation, Calendars, Clocks, Comics, Communications, Community, Dating, Education, Employment, Entertainment, Finance, Games, Horoscopes, Humor, IT/Network, Lifestyle, News, Personal Hygiene (e.g., teeth, brushing, oral care, flossing, razors, shaving, etc.), Photos, Public Service, Shopping, Social Networks, Spirituality, Sports, Travel, Video, Weather, Webcams, and Weird. The display may comprise multiple channels that may be established (e.g., set up), wherein each channel may be operable to run one or more of the applications. This will be described in greater detail below herein by way of example.

In this exemplary embodiment, the display 350 comprises a housing 355 and a screen 360 disposed within the housing 355. In this embodiment, the housing 355 is configured to be placed on a surface such as a countertop or nightstand. In this exemplary embodiment, the display 350 may be configured to be portable. However, it is understood that the housing 355 may be configured to be mounted on a wall, mirror, or other surface as shown and described above herein, including but not limited to slidingly received within a second housing, adhesives, snap-fits, hook and loop fasteners like Velcro, etc.

Suitable displays include cathode ray tube displays, liquid crystal displays, light emitting diode displays, fixed segment displays, plasma displays, dot matrix displays, combinations thereof and the like. As such, in some exemplary embodiments, the screen 360 may comprise a liquid crystal (LC) screen, plasma screen, or any other conventional screens used in monitors and/or televisions. The screen 360 may comprise a touch screen, enabling a user to touch the screen to operate, execute commands, and/or interact with applications running on the display 350. As stated previously, in some embodiments, as described hereafter, the display 350 may be a projector and the screen thereof may be a wall, mirror, etc. Also, the display 350 may comprise other auxiliary input and output devices such as keyboard, mouse, infrared controllers, speakers, USB devices, memory, etc. Embodiments are contemplated where the display utilizes a personal communication device. For example, a Blackberry™, and I-Phone™, or the like may be utilized.

The display 350 may also comprise audio equipment, including one or more speakers (not shown) such that the display 350 may transmit or broadcast audio information alone or in conjunction with visual information. The speaker (s) may be internal to and integrated with the housing 355, or they may be separate from the housing 355, but in wireless or hard-wired communication with the display 350.

Specifically, the personal care system 300 may further be adapted to communicate data between itself and a network 361, including local area networks (LANs), wide area networks (WANs), the Internet, and/or portions of the Internet such as a private Internet, a secure Internet, a value-added network, or a virtual private network. The personal care system 300 may communicate with the network 361 by a data link 363 between the display 350, which can be a wireless or a signal line. Suitable network clients 365 may include personal computers, laptops, workstations, disconnectable mobile computers, mainframes, information appliances, personal digital assistants, and other handheld and/or embedded processing systems. The signal lines that support communications links to the network 361 and clients 365 may include twisted pair, coaxial, or optical fiber cables, telephone lines, satellites, microwave relays, modulated AC power lines, and other data transmission "wires" (hard wired) known to those of skill in the art. Further, signals may be transferred wirelessly through a wireless network or wireless LAN (WLAN) using any suitable wireless transmission protocol, such as the IEEE series of 802.11 standards, WiFi, Bluetooth, etc. For example, the network 361 may comprise a wireless access point (not shown) which enables the display 350 to access and communicate with the network 361 as known to one of ordinary skill in the art. Other suitable wireless data communication links may include radio frequency (RF) such as RFID tags and/or infrared (IR) as shown and described above herein. Although particular individual and network computer systems and components are shown, those of skill in the art will appreciate that the present invention also works with a variety of other networks and computers.

The network 361, a computer connected to the network (not shown), or the display 350 may contain one or more of the categories of applications set forth above. Additionally, in some embodiments, the toothbrush itself may comprise a display and may contain one or more of the categories of applications set forth above. In such embodiments, the display of the toothbrush may be positioned such that a user may visualize the display in a mirror. For example, the display may be positioned on the backside of the toothbrush. Additionally, in such embodiments, the information provided on configured on the display such that the user can read the reflection of the information in the mirror.

A user may browse through the variety of applications contained within each category, choose which applications the user would like to run on the display 350, and then, if not already on the display 350, down load the chosen applications onto the display 350. The display 350 may include, store, and display all the different categories with their corresponding multiple applications as well, or just the specific ones chosen by a user to be placed on the display. The display 350 may also comprise multiple channels that may be established (set up) to include and run one or more of the applications. For example, a user may set up a first channel to include an application that displays the time and date for a period of time, and then broadcast an alarm at a pre-set time such as in the morning. After a specified amount of elapsed time, the first channel may be set up to run a third application that displays the weather forecast for a period of time. Once again, after the period of time has elapsed, the first channel may include a fourth application that would run a market ticker and chosen stock information for another specified period of time. Finally, a reminder may be displayed and/or an alarm may be broadcast to remind the user to do some task (e.g., brush teeth for two minutes, floss teeth, feed dog, etc.). The user may establish a second channel on the display 350 that may include evening applications such as evening news highlights for a period of time (e.g., video clips of the news), music (e.g., streaming radio), and then display update information regarding auction items your monitoring on an online auction.

Figure 19:
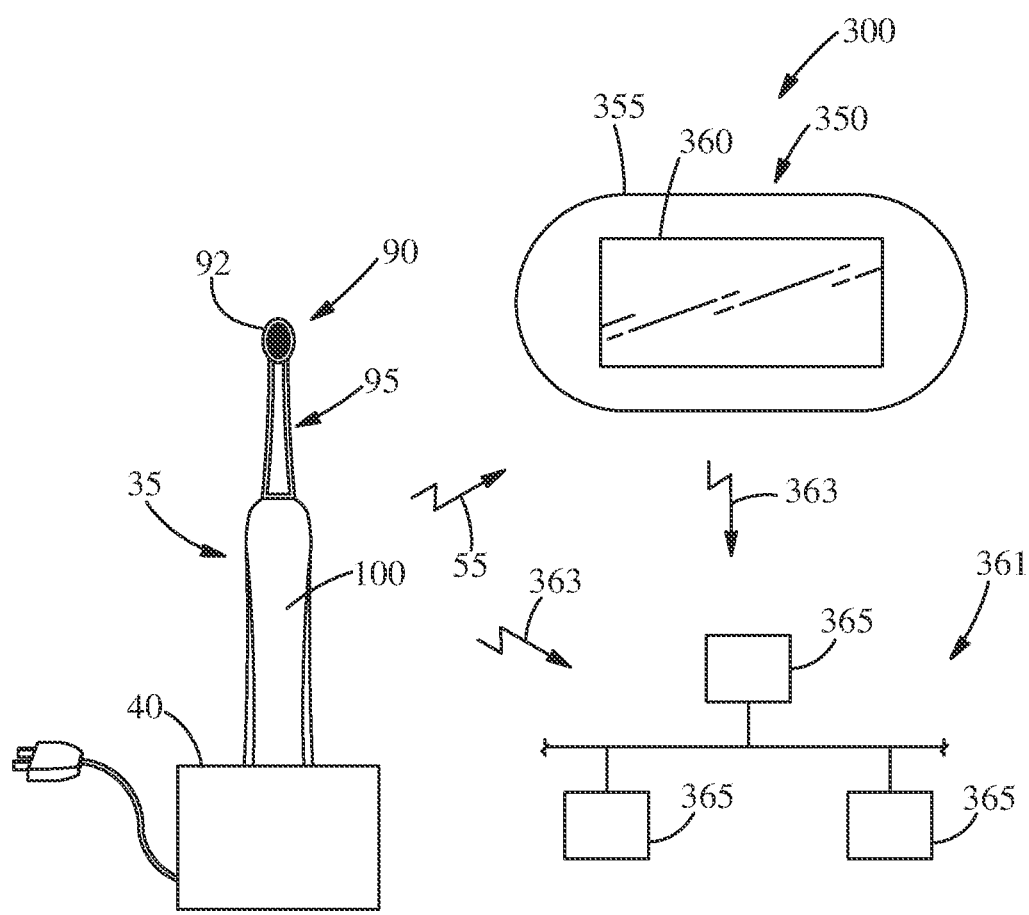
FIG. 19 is a schematic view of another embodiment of the present invention comprising a personal care system that is linked to a network.

The personal care system 300 may also comprise one or more personal care products (e.g., one or more of the personal care products 15, 35, 170, 175, 180, 183, and/or 185 shown in FIGS. 1-14 and 19) that may be adapted to communicate data between itself and the network 361 using a data link 363, between itself and the display 350 using data link 55, and/or between itself and any of the other one or more personal care devices using the same or similar data link. The data links (e.g., data links 55, 363) in this exemplary embodiment may be the same as or similar to the wireless and or signal lines shown and described above. As shown in FIG. 19, the personal care system 300 may comprise the electric toothbrush 35 and base 40 for receiving the electric toothbrush 35 as shown and described above herein.

The display 350 may be operable to be in continuous and/or intermittent data communication with the electric toothbrush 35 and/or the base 40 using the data link 55 before, during, and/or after use by a consumer of the electric toothbrush 35. In one exemplary embodiment, the display 350 may be operable to be in continuous and/or intermittent data communication with more than one of personal care product (e.g., personal care products 35, 170, 175, 180, 183, and/or 185) using data links 55, 191, 193, 195, 196, and/or 199, respectively). In another exemplary embodiment, the electric razor 187 illustrated in FIG. 13 may be in data communication with the personal care system 300 and/or the data network 361 of this exemplary embodiment using data link 197, instead of the electric toothbrush 35 or in combination with the electric toothbrush 35. As will be appreciated, the personal care system 300, including display 350, is suitable for use with products that comprise an internal power supply as well as products that do not, such as a packaged rinse product. The display 350 may be powered on by a manual push button or other manual device, motion sensor, upon activation of the one or more personal care products (e.g., electric toothbrush 35), and/or other conventional yet-to-be developed devices as known to one of ordinary skill in the art.

Figure 20A:
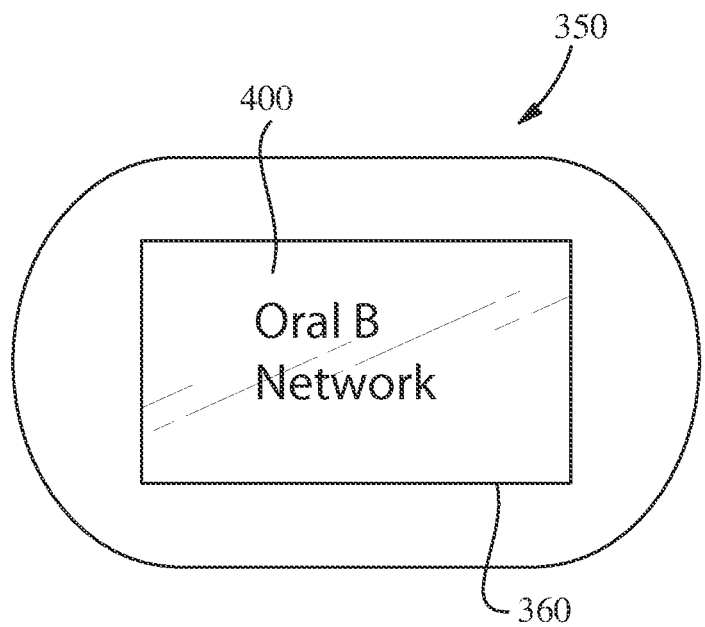
FIGS. 20A and 20B are representative views of exemplary screen shots on exemplary system of FIG. 19.
Figure 20B:
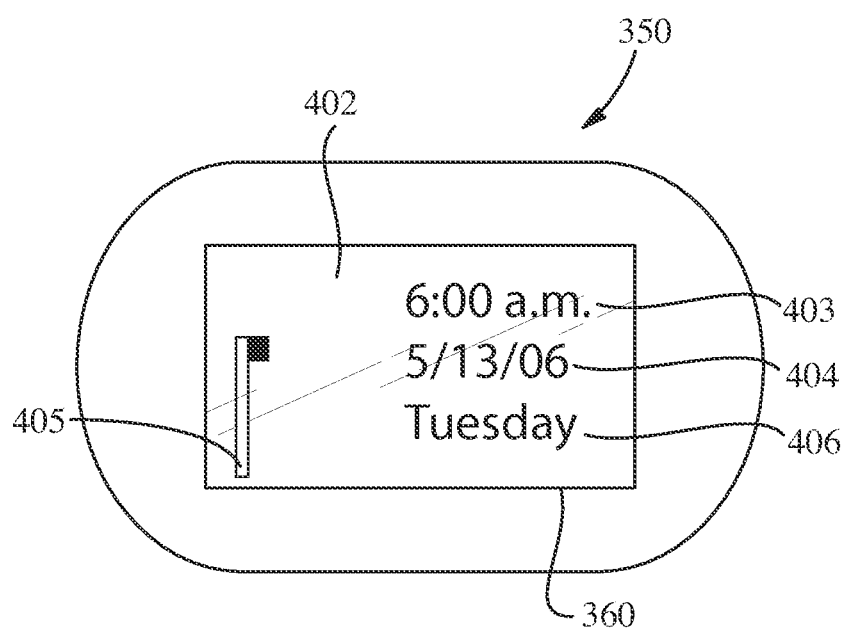

FIG. 20 shows exemplary screen shots that may be displayed on the screen 360 of one exemplary embodiment of the personal care system 300. Once the display 350 is powered on an introductory screen 400 may be displayed by the display 350. This is just one example of what the introductory screen may comprise and/or look like. The display 350 may be operable to display the introductory screen 400 for a predetermined period of time such as, for example, 5 seconds. However, it is understood that the predetermined amount of time may comprise any amount of time as desired, and may even, in one exemplary embodiment, be adjustable by the user.

Once the predetermined period of time has elapsed, the display 350 may display a home screen 402 on the screen 360. As shown, the home screen 402 may comprise the time 403, date 404, and day of the week 406, and a brushing tools icon 405. The home screen 402 may also display when the personal care product (e.g., the electric toothbrush 35) or the display 350 is on, but not in use.

Figure 21A:
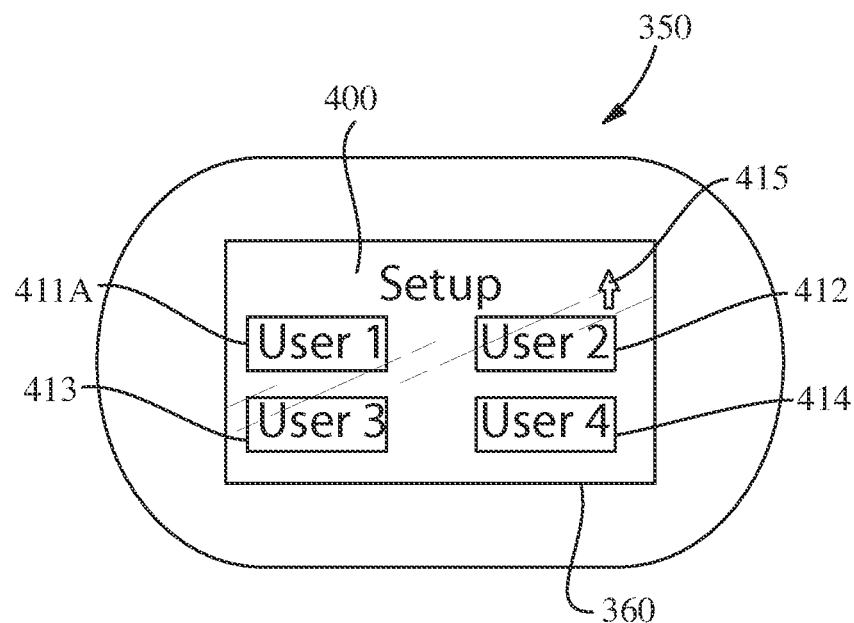
FIG. 21A is a representative view of a screen shot of an exemplary setup screen on the system of FIG. 19.
Figure 21B:
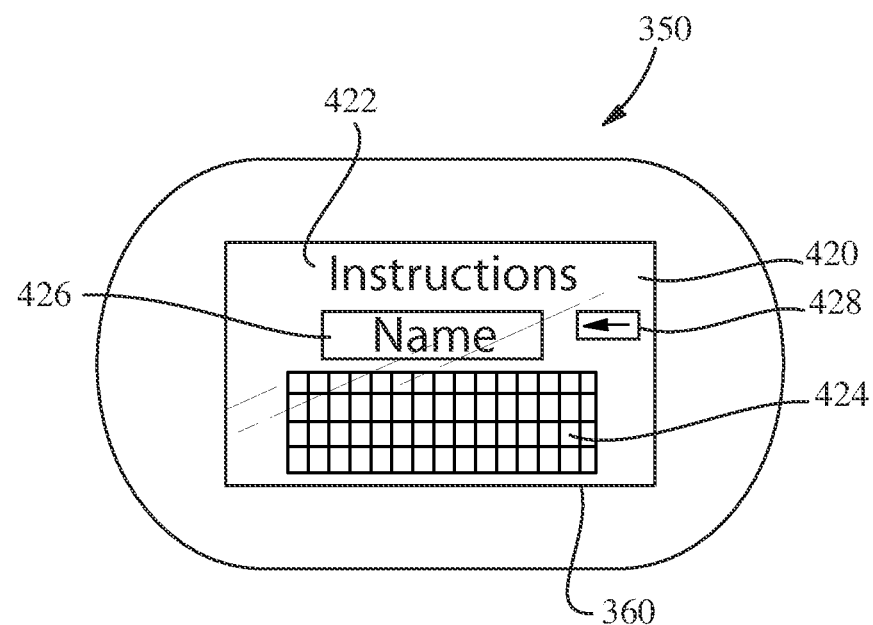
FIG. 21B is a representative view of a screen shot of an exemplary interactive keyboard screen on the system of FIG. 19.

Referring to FIG. 21, when the first time a user selects the brushing tool icon 405 (shown in FIG. 20), a username screen 410 may display on the screen 360 to allow the individual to set himself or herself up in the system. As shown, a first user icon 411A, a second user icon 412, a third user icon 413, and a fourth user icon 414 may be displayed on the username screen 410. It is understood that any number of user icons may be displayed on the username screen 410. The username screen 410 may also comprise a scroll bar to permit a user to scroll the screen up and down to display the different user icons. Additionally, the user set-up screen 410 may also comprise a home icon 415, which when selected, may take the user back to the home screen.

Referring to FIGS. 20 and 21, when the first time user clicks on one of the user icons such as, for example, the first user icon 411A to set himself or herself up in the system 300, a username entry screen 420 displays on the screen 360. The username screen 420 may comprise general instructions 422 on how to set up a username and tie it to a specific personal care product (e.g., the user's electric toothbrush 35), a keyboard 424, a display 426 of what is typed, and an enter icon 428. The user may type his or her name into the keyboard 424 using either the screen 360 (e.g., a touch screen), or a keyboard or mouse connected to the display 350 and then select the enter icon 428 as shown in FIG. 21. The enter icon 428 may be utilized to save the information from the first time user in the display 350 or system 300.

The instructions 422 provided can be specifically tailored to the type of products utilized within the system 300. For example in the case of a power toothbrush 35 (shown in FIG. 19), the instructions 422 may recite to power on the toothbrush 35 (shown in FIG. 19) in order to establish communication between the toothbrush and the display 350. However, other items may also be utilized. For example, a manual toothbrush 180 (shown in FIG. 13) may be brought in the near vicinity of the display 350 in order to establish communication. In this manner, the display 350 can associate various products with a particular user. For example, the display 350 can be configured to recognize oral care products or other personal hygiene products and associate those products with a particular user.

Additionally, in some embodiments, the display 350 may be configured to identify a user or a plurality of users via any suitable method. For example, the display 350 may be configured to recognize a user via voice recognition, facial recognition, halitosis recognition, designated features recognition. The recognition of a user via designated features, e.g. facial features, dental features, etc. is discussed in U.S. patent application Ser. No. 61/116,327, entitled, "Personal Hygiene Device, Systems and Methods", filed on Nov. 20, 2008. Additionally, facial features, dental features, and/or designated features are discussed hereafter.

Similarly, a variety of personal care products may be identified in any suitable manner. For example, an electric toothbrush may be identified by the sound produced by the electric toothbrush when the electric toothbrush is powered on. As another example, a dentifrice may be identified by the smell of the dentifrice.

In some embodiments, the display 350 may be configured such that when a first time user selects the brushing tool icon 405, the username entry screen 420 displays on the screen 360. In this manner, the display 350 may be configured to identify the first user of the display 350 as user number 1.

In exemplary embodiment, after the user enters his or her name, the display 350 may display one or more background choices on a background selection screen. The user has may have a choice of a plurality of background images which can be either fixed (e.g., photos) or animated images. Each background image may be a different and distinct image. If the background images are an animation or video clip, the display 350 is configured to permit a user to select a desired image to be previewed on the display. Embodiments are contemplated where the display 350 can change background images based upon a user's selections. For example, the user may prefer a first background image on a first day and a second background image on another. The display 350 can be configured to accommodate this preference. As another example, a user may also desire to have the background images change during a particular use. In such embodiments, the background image may be the first background image for a predetermined period of time, e.g. 5 minutes and then switch to a second background image. The above discussion is not limited to two background images. Any suitable number of background images may be utilized.

Once the user has selected one of the background images, that choice will be displayed on the screen 360, and the display 350 provides the user an opportunity to select a back button to return to the choices or to select the enter button and save the background image choice. This may complete the first-time user set-up function for this exemplary embodiment of personal care system 300. Thus, anytime the user's icon 411A is selected and/or anytime the user's identified personal care product (e.g., electric toothbrush 35) is powered on, the selected user background image or animation as well as the user's name may be displayed on the screen 360.

The background selected by the user may be shown throughout the entire use of the system 300 in the particular instance. For example, during a morning personal hygiene routine, the once activated, the display 350 may show the background for the user performing the personal hygiene routine for the entire time period of the personal hygiene routine. Alternatively, the background may be displayed for a predetermined period of time, e.g. 5 minutes. In some embodiments, the display 350 may display the background until a personal care device, oral care device or the like begins communication with the system 300. When communication with a personal care device and/or an oral care device commences, the display 350 may display change from the background to some useful information with regard to the particular routine, e.g. shaving, brushing, etc.

Once one or more users are set up in the system and the brush log icon 405 is selected, the username screen 410 may be displayed listing the newly labeled user icons. For example, where the user's name is "Jamie", icon 411A may show the name "Jamie" as the icon. When the user selects on the "Jamie" icon, the pre-selected image, described previously, will display and/or play, and then a personal brushing log screen 440 may be displayed on the display 350 as shown in FIG. 22.

The brush log screen 440 may display a variety of information. For example, the personal brushing log screen 440 may display the date, time, and/or day of the week, a daily brushing log of the user's brushing occurrences, and/or other information. As shown in FIGS. 22-24, the personal brushing log screen 440 may display on the display 350 a greeting with the user's name 447, a recommendation 448, a daily brushing log 449 of the user's brushing occurrences, and/or other information.

Figure 21C:
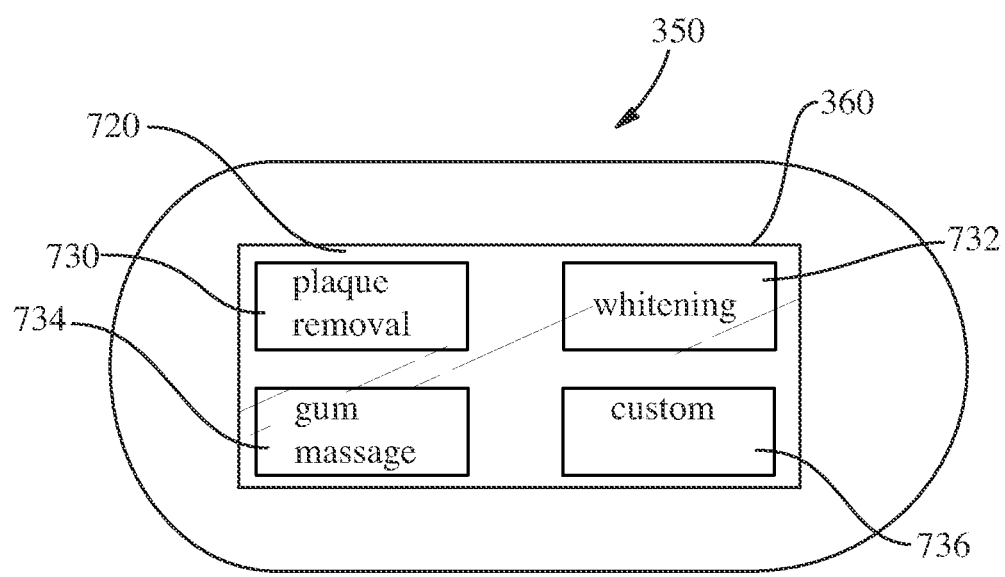
FIG. 21C is a representative view of a screen shot of an exemplary brush setup screen on the system of FIG. 19.

Referring to FIG. 21C, a brush setup screen 720 may be provided to the user via screen 360 on the display 350. The brush setup screen 720 can allow the user to choose a particular function that the user wishes their oral care routine to accomplish. For example, a user may choose a plaque removal icon 730 as their desired function for a first oral care routine. As stated previously, the personal care system 300 (shown in FIG. 19) may control various aspects of an oral care device, e.g. speed, frequency, movement, etc. In the case of power toothbrushes, the personal care system 300 (shown in FIG. 19) may automatically choose the appropriate refill and provide a notification to the user as to whether or not the refill is correct. Additionally, the personal care system 300 (shown in FIG. 19), may select the appropriate mode, speed, frequency, displacement, etc. and/or combinations thereof, of the power toothbrush handle in order to provide the selected function, e.g. plaque removal. In the case of manual toothbrushes, the personal care system 300 may recommend usage of a particular manual toothbrush, e.g. Cross Action®. As another example, the user may choose a whitening icon 732 as their desired function for the first oral care routine. Similarly, the personal care system 300 may select the appropriate mode, speed, frequency, displacement, etc. and/or combinations thereof, of the power toothbrush handle in order to provide the selected function, e.g. whitening. The personal care system 300 can be configured such that the person always performs a first function in the first oral care routine and a second function in a second oral care routine. The first function and the second function may be different from one another. In addition, the personal care system 300 may suggest to the user to utilize other whitening products, e.g. Crest White Strips™

Other possible function icons which may be provided to the user include a gum massage icon 734 and a CUSTOM icon 736. The CUSTOM icon 736 can allow a user to select a combination of several different functions. For example, under the custom setup, a user may setup the personal care system 300 such that plaque removal for one minute and whitening for one minute in the first oral care routine are performed. Any suitable number of functions may be combined within an oral care routine. For example, a user may setup the personal care system 300 such that plaque removal for thirty seconds, gum massage for thirty seconds, and/or whitening for thirty seconds are performed. The user may setup the personal care system 300 to include a custom setup for more than one oral care routine. For example, a first oral care routine in the morning can perform a first combination of particular functions while a second oral care routine can perform a second combination of particular functions. The personal care system 300 (shown in FIG. 19) can store this information and associate such custom setups for the particular individual to which those custom setups are assigned.

Note that the brush setup screen 720 may similarly be applicable to manual toothbrushes. For example, the user may select a particular function and the personal care system 300 (shown in FIG. 19) may provide feedback to the user as to whether the appropriate manual toothbrush was selected for the selected function. Similarly, for both manual and power toothbrushes, the personal care system 300 (shown in FIG. 19) may provide input as to the recommended dentifrice, rinse, floss, etc. in combination with the appropriate brush to perform the selected function. In some embodiments, the personal care system 300 may be configured to recommend a combination of both manual and power oral care products.

Embodiments are contemplated where the display 350 includes the brush setup screen 720 which includes a tongue cleaning icon (not shown). For those toothbrushes, either power or manual that have tongue cleaners, soft tissues cleansers, etc., the personal care system 300 (shown in FIG. 19) may provide recommendations for the appropriate mode, speed, frequency, displacement, etc. and/or combinations thereof, of the power toothbrush handle in order to provide the selected function, e.g. tongue cleaning. Some suitable examples of tongue cleaners are described in U.S. Patent Application Nos. 2006/0010628; 2005/0166344; 2005/0210612; 2006/0195995; 2008/0189888; 2006/0052806; 2004/0255416; 2005/0000049; 2005/0038461; 2004/0134007; 2006/0026784; 2007/0049956; 2008/0244849; 2005/0000043; 2007/140959; and U.S. Pat. Nos. 5,980,542; 6,402,768; and 6,102,923.

Figure 24B:
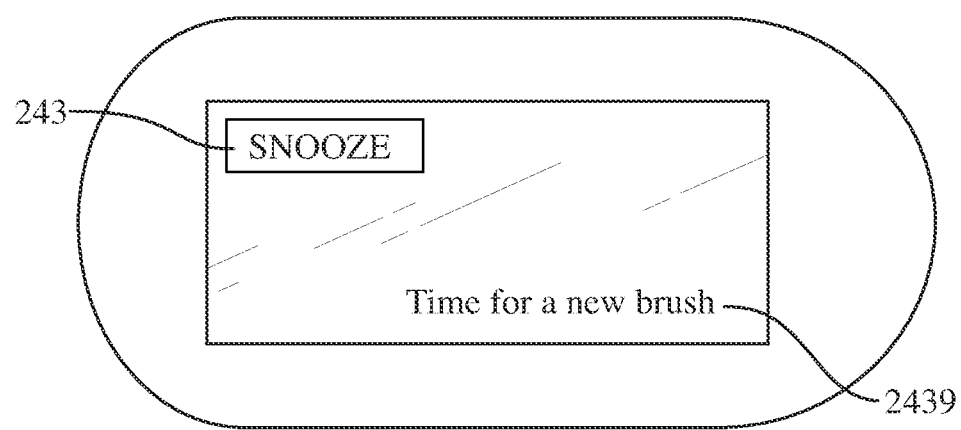
FIG. 24B is a representative view of a screen shot of an exemplary personal recommendation screen on the system of FIG. 19.

Referring to FIGS. 22-24B, the personal brushing log screen 440 may also comprise a daily brushing log 449 displaying any conceivable interval. As shown, a two week calendar is displayed comprising: week one 431; and week two 432. The personal brushing log screen 440 may track and display every time the user brushes his/her teeth (a brushing occurrence) on a daily basis, and how long each tool brushing activity lasted. For example, as shown in FIG. 22, the brushing log screen 440 shows that user had two brushing occurrences (i.e., she brushed her teeth twice) on Sunday for a time period of two (2) minutes per brushing occurrence during week one 431, while on Friday of that same week she only had one brushing occurrence that elapsed for a period of time of 1.36 minutes. A symbol 437 may signal a missed brushing occurrence such as, for example, a red X. As shown in FIGS. 22-24, a red X is marked twice on Monday, once on Wednesday, and once on Friday of week one 431 to exemplify that the user completely missed both her brushing occurrences on Monday, her first brushing occurrence on Wednesday, and her second brushing occurrence on Friday of week one 431. A recommendation 448 regarding brushing time may be provided to the user.

In addition, the personal brushing log screen 440 may track and display the cumulative number of brushing occurrences since the last time the tooth brush or toothbrush head had been replaced. For example, the personal brushing log screen 440 may display the cumulative number of brushing occurrences using visual indicia 441 (e.g., a toothbrush having a plurality of bars and changing colors) and/or numerical indicia 445 identifying the cumulative number of brushing occurrences out of a total number of brushing occurrences suggested per toothbrush or toothbrush head (e.g., 10 of 180 uses). As the each brushing occurrence transpires, the display 350 may display each consecutive cumulative brushing occurrence compared to the total number of brushing occurrences suggested per toothbrush or toothbrush head replacement (numerical indicia 445) such as, for example, 1 out of 180 uses, 2 out of 180 uses, 3 out of 180 uses, and so on.

In addition, the visual indicia 441 may comprise a partial or full image of a toothbrush that is divided into a plurality of colored segments 442. For example, the display 350 may be configured to display all the plurality of segments of the toothbrush image (visual indicia 441) in green when the number of cumulative brushing occurrences is between 0 uses up to the first preset threshold such as, for example, approximately 110 uses. As the cumulative number of brushing occurrences increase toward the first preset threshold, the display 350 may be configured to cause one or more of the plurality of segments 442 to change color from green to another color such as white to indicate the decreasing life of the toothbrush and/or toothbrush head. While in between 0 uses and the first preset threshold, the display 350 may also display a textual indicia such as, for example, "Optimal performance" 443 or any other desired textual message.

Once the first preset threshold (e.g., 110 uses out of 180 uses) is reached, the display 350 may be configured to cause the visual indicia 441 to change as in the color of a portion of the plurality of segments 442 may change from green to another color such as orange as shown in FIG. 24. Moreover, the display 350 may be configured to cause the textual indicia to change from "optimal performance" 443 to "inspect brush head" 444 as also shown in FIG. 23. Again, the display 350 may be configured to comprise a final preset threshold (e.g., 180 uses out of 180 uses) compared to the total number of brushing occurrences suggested per toothbrush. As the cumulative number of uses (brushing occurrences) occur between the first preset threshold and the final preset threshold, the display 350 may be configured to cause one or more of the plurality of segments 442 to change color from orange to another color such as white to indicate the further decreasing life of the toothbrush and/or toothbrush head.

Figure 25:
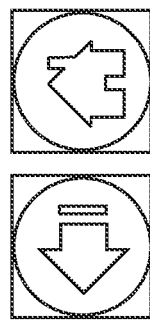
FIG. 25 is a representative view of a screen shot of an exemplary notice screen on the system of FIG. 19.

Once the total cumulative brushing occurrences equals the final preset threshold, the display 350 may be configured to cause the visual indicia 441 to change as in a remaining portion of the plurality of segments 442 may change from orange in color to red in color. In addition, the textual indicia may change from "inspect the brush head" 444 to "replace the brush head" 446. Referring to FIG. 25, once the final preset threshold is achieved for total number of suggested brushing occurrences for a toothbrush or toothbrush head, a notice screen 439 may be displayed by the display 350. In some embodiments, a reminder 2439 may be utilized to display a message indicating that the time for a new brush has arrived.

Referring to FIG. 24B, in some embodiments, the personal care system 300 (shown in FIG. 19) may be provided with a snooze button 243. The reminder 2439 may be configured to provide a first message to a user and a second message to the user after the snooze button 243 has been activated, e.g. depressed. For example, the reminder 2439 may be configured to display a message indicating that a new brush/refill should be utilized. The reminder 2439 may be associated with an audible sound, vibration, lights, etc. or combinations thereof. A user may activate, e.g. depress, the snooze button 243, in order to deactivate the audible sound, vibration, lights, etc. or combinations thereof. After a predetermined time period, e.g. hours, a day, a plurality of days, a week, a plurality of weeks, the reminder 2439 along with an audible sound, vibration, lights, etc. or combinations thereof, may again be provided to the user. The user may again activate, e.g. depress, the snooze button 243 to deactivate the reminder 2439 and/or the audible sounds, vibration, lights, etc. or combinations thereof. After a second predetermined time period, can be the same as the first predetermined time period; can be less than the first predetermined time period; or can be greater than the first predetermined time period, the reminder 2439 may be provided to the user again.

The reminder 2439, the audible sounds, vibration, lights, etc. or combinations thereof may be progressive. For example, the reminder 2439 may be provided to the user in a bigger font, a different font, flashing, etc. after the first and/or second predetermined time period. As another example, the reminder 2439 may provide a different message from that prior to the first and/or second predetermined time period. The different message may encourage compliance by the user. Additionally, the audible sound may increase in volume; the vibration may increase in intensity, and/or the light may increase in intensity after the first and/or second predetermined time period. In some embodiments, after the first and/or second time period, the user may be required to activate, e.g. depress, the snooze button 243 a plurality of times in order to deactivate the reminder 2439 and/or the audible sounds, vibration, lights, etc. or combinations thereof.

Referring to FIG. 25, the notice screen 439 may comprise a variety of items, including but not limited to reminders, recommendations, tips, offers, pricing, order information, order processing, etc. FIG. 25 specifically shows the notice screen 439 of this exemplary embodiment having a recommendation 436 that comprises ADA (American Dental Association) recommendation such as, for example, "The ADA recommends that consumers replace toothbrushes approximately every three months to maintain optimal brushing," and the reminder 439 such as, for example, "Its time for a new brush head, Jamie". Other recommendations may be provided which are associated with an oral care regimen, such as reminders to use floss, rinse, etc. Additionally, the tips may be provided regarding personal hygiene. For example, reminders regarding back waxing.

In one exemplary embodiment, when the user is in the process of brushing his or her teeth (i.e., a brushing occurrence), the display 350 may display a greeting, the running time of the current brushing occurrence, and the selected background image chosen during the user set-up process.

Figure 26:
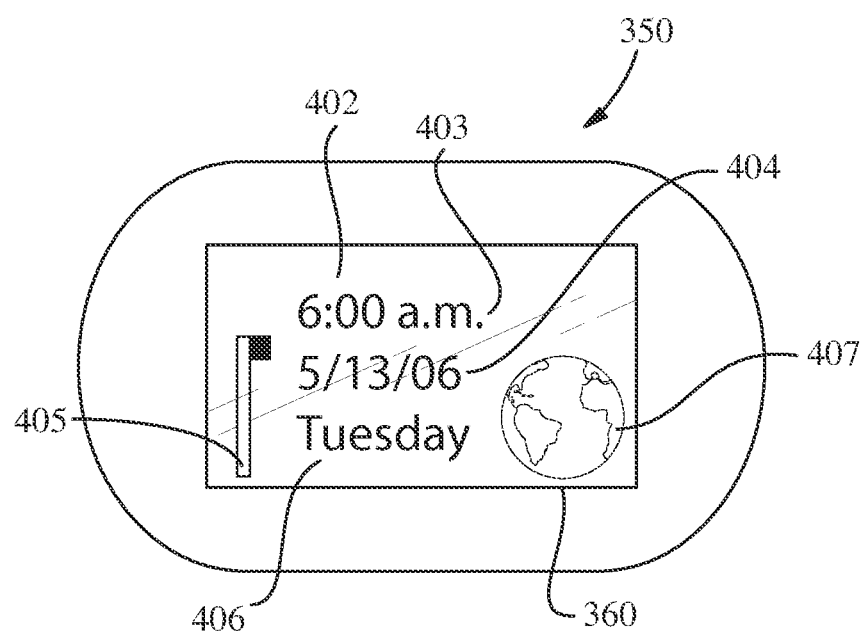
FIG. 26 is a representative view of a screen shot of an exemplary introductory screen on the system of FIG. 19.
Figure 27:
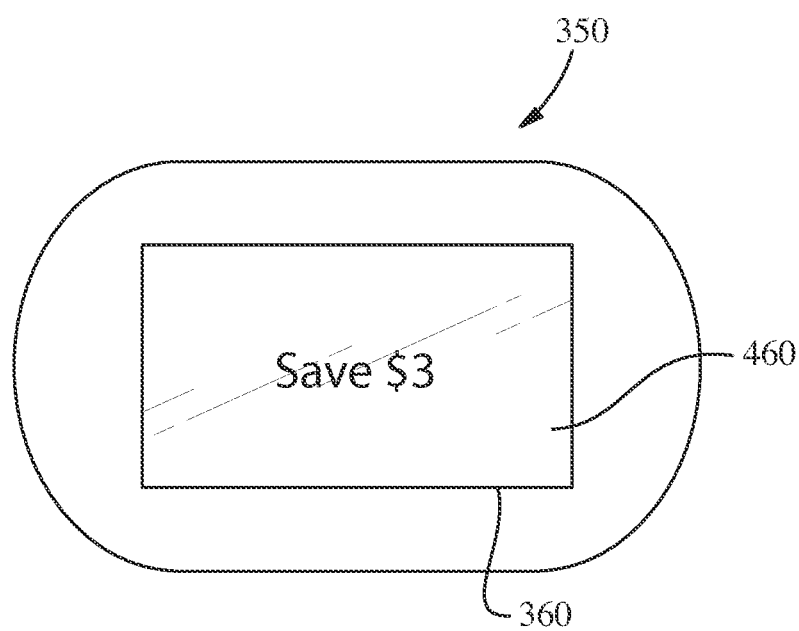
FIG. 27 is a representative view of a screen shot of an exemplary special offer screen on the system of FIG. 19.

Referring to FIGS. 26-27, the home screen 402 may comprise a network icon 407, e.g. a globe, in addition to the brush log icon 405. In this exemplary embodiment, when the display 350 displays the notice screen 439 after a toothbrush life expires, the notice screen 439 may also include a special offer icon 2537. When a user selects the special offer icon 2537, a special offer screen 460 may be displayed by the display 350, providing advertising, product, special offer, and/or discount information. The special offer screen 460 may also comprise a send to email icon (not shown) that when selected causes the display 350 to send the special offer to an email address provided by the user via the data link 363 and network 361 (shown in FIG. 19).

Also, the special offer screen 460 and/or the notice screen 439 may comprise an order the product icon (not shown), wherein when selected by the user, the display 350 may cause the system 300 to place an order to the product distributor or manufacturer over the network 361 (e.g., the Internet) using the data link 363. In one exemplary embodiment, the system 300 (shown in FIG. 19) and/or display 350 may include a user's account information, including credit card, debit card, checking account, and/or savings account information such that when the user selects the order the product icon the display 350 orders the product (e.g., electric toothbrush 35), bills the user, and/or processes the payment for the product. This greatly simplifies and reduces the effort and time required for a user to order new product. Also, the display 350 may also, via one or more of the screens set forth above, offer information and the ability to order companion and/or new personal care products.

In some embodiments, the special offer screen 460 may allow a user to lease a power brush for a predetermined price.

Additionally, the special offer screen 460 may allow a user to sign up for automatic shipping of refills, paste, etc. at predetermined time intervals. For example, brush head refills may be automatically shipped to the user every 3 months. As another example, dentifrice, paste, gel, or the like, may be shipped to the user once a month. Additionally, because of the capability of the personal care system 300 (shown in FIG. 19) to communicate with the internet, the display 350, the toothbrush 35, and/or any other suitable component capable of communicating with the internet may assist the user in tracking the shipments of brush refills, dentifrices, gels, etc. For example, the display 350 may provide a map showing the current location of the shipped product utilizing global positioning system technology. As yet another example, the display 350 may provide a message and/or a signal to the user that the shipment is being delivered within a specific time frame.

Figure 28:
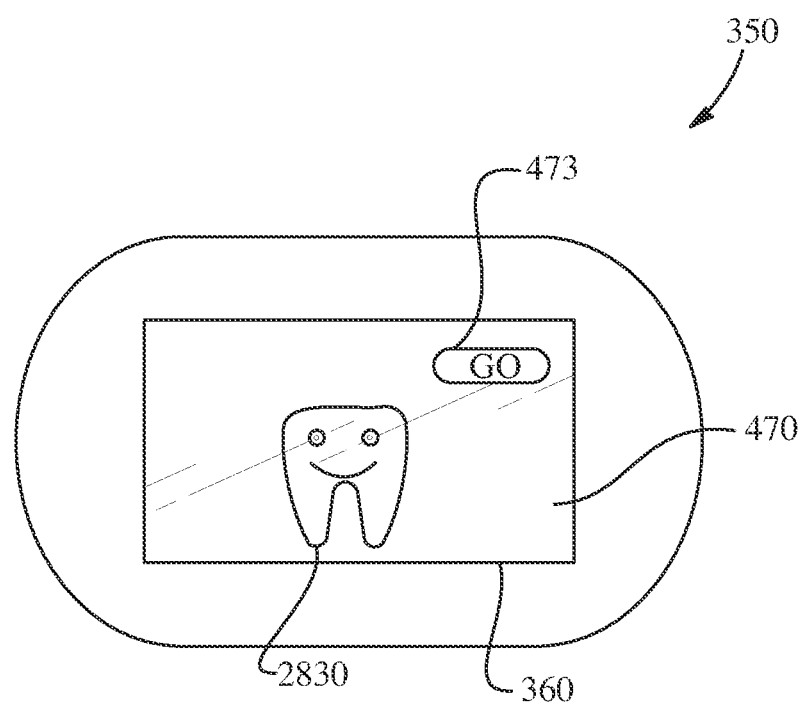
FIG. 28 is a representative view of a screen shot of an exemplary children's cover screen on the system of FIG. 19.

Referring back to FIG. 21A, as another example of content that may be displayed and/or accessible on the system 300, a user may set-up a user icon for a child with child-appropriate content. For example, third user icon 413 may be set-up to display a child's name. The display 350 may be configured to include a variety of content and/or applications within the child's account such that when the user icon 413 is selected the display 350 displays and runs the content and applications set-up or configured for the child. Referring to FIG. 28, when a user selects the user icon 413 (shown in FIG. 21A), a child introductory screen 470 may be displayed. The child introductory screen 470 may comprise an animation character 2830. Any suitable animation character may be utilized.

The display 350 may be configured to display the introductory screen 470 until the user selects a GO icon 473, clicks on any part of the screen 360, after a predetermined period of time has elapsed, turns on a power toothbrush 35 (shown in FIG. 19), moves a toothbrush in the vicinity of the display 350, or any combination thereof, at which point an animation may run on the display 350 oriented towards children. In one embodiment, the animation may be an educational animation teaching and/or encouraging kids the proper personal care and personal care techniques such as brushing two minutes, proper brushing motion, flossing, etc. In replace of or in addition to the animation, the display 350 may be configured to run games, including video games that the child user may play before, during, and/or after brushing his or her teeth. The games may or may not be oriented toward personal care. The display 350 may be configured to run the animation once the child user's personal care product (e.g., electric toothbrush 35) is powered on. It is understood that the user icon 413 may also comprise any and/or all the features as described herein, including those set forth with reference to the user icon 411A such as, for example, the brushing log features and applications.

In some embodiments, the display 350 may be configured to run one or more applications (e.g., small applications such as Widgets). The applications may be configured on the display 350 in one or more channels. A plurality of these applications may be stored directly on the display such that a user may access them, select one or more of these applications from the plurality of stored applications, and configure the display to run the selected one or more applications. In addition, as also set forth above, the display 350 may be in data communication with the network 361 (e.g., the Internet) via data link 363 (e.g., wireless and/or signal lines) as shown in FIG. 19 and described above herein. Since the system 300 and/or the display 350 may be connected to the network 361, the user may access a plurality of applications contained on the network 361, browse and select one or more of these applications to be sent to the display 350 via the data link 363, and then configure the one or more applications into one or more channels established on the display. The display 350 may also be configured to continually, periodically, or intermittently access the network 361, retrieve specific applications, and transfer these applications and content via the data link 363 to the display 350.

As discussed previously with regard to FIG. 26, the display 350 may comprise a network icon 407 displayed on the home screen 402. With regard to FIGS. 29A and 29B, the display 350 may be configured such that when a user selects the network icon 407 a user channel screen 490 may be displayed, wherein a listing of user icons are displayed, both established user icons (those icons to which a name has been assigned, e.g. user 1—411A and user 3—413, each shown in FIG. 21A) and available user icons (e.g., user 2 icon 412, user 4 icon 414). Each user may configure and/or customize the display to comprise one or more channels, wherein each of the one or more channels may run one or more applications that the user has selected to place in each channel. As an example, the display 350 and/or system may be configured such that when the "User 1" icon 491 is selected, the display 350 may display a channel selection screen 500 that displays six (6) channel icons: weather icon 502, comics icon 503, sports icon 504, traffic icon 505, games icon 506, and music icon 507, and a shuffle icon 508. It is understood that the display may be fixed to only include the six (6) channels shown, but allow each user to choose and/or customize how many and what applications and/or content may be within and/or run on each channel. Alternatively, it is understood that the display may be customizable such that each user may choose and/or customize how many channels may be established and/or set up on the display 350, and thus choose and/or customize how many and what applications and/or content may be within and run on each channel.

Each channel when selected may be configured such that the display 350 may display a cover screen, e.g. a sports cover screen, a weather cover screen, a traffic cover screen, and/or a comic cover screen and/or a respective content application (e.g., music content application, sports content application, weather content application, traffic content application, and/or comic content application). It is understood that one or more of the channels may not include a cover screen and just include a content application. Each of the cover screens and/or content applications may also include a user controls such as back icons, forward icons and/or GO! icons. It is understood that the channels, the content applications, and the interconnectivity with the network 361 may be the same as or similar to what is offered by CHUMBY™, Inc. Yahoo®, and/or Frame Channel®

Figure 29A:
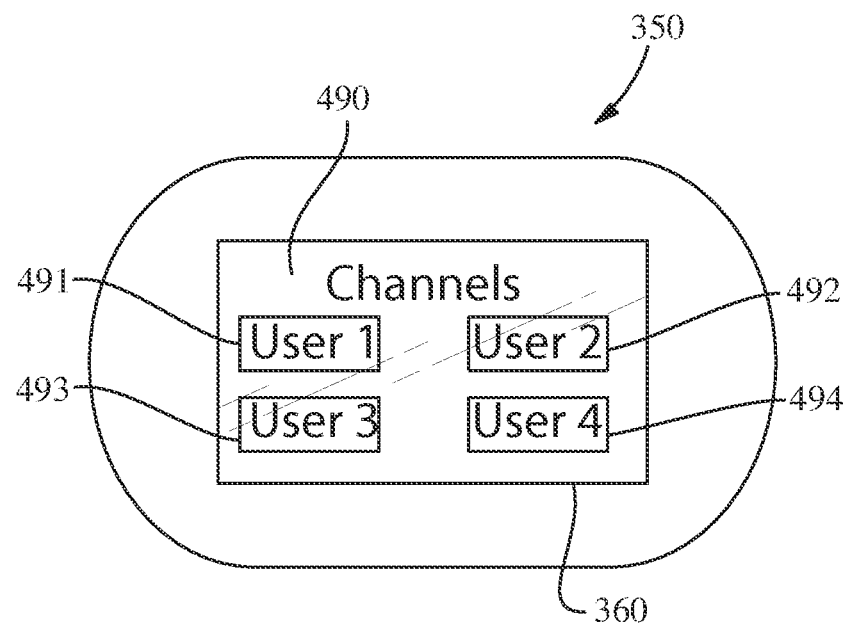
FIG. 29A is a representative view of a screen shot of an exemplary user preference for channel selection introductory screen on the system of FIG. 19.
Figure 29B:
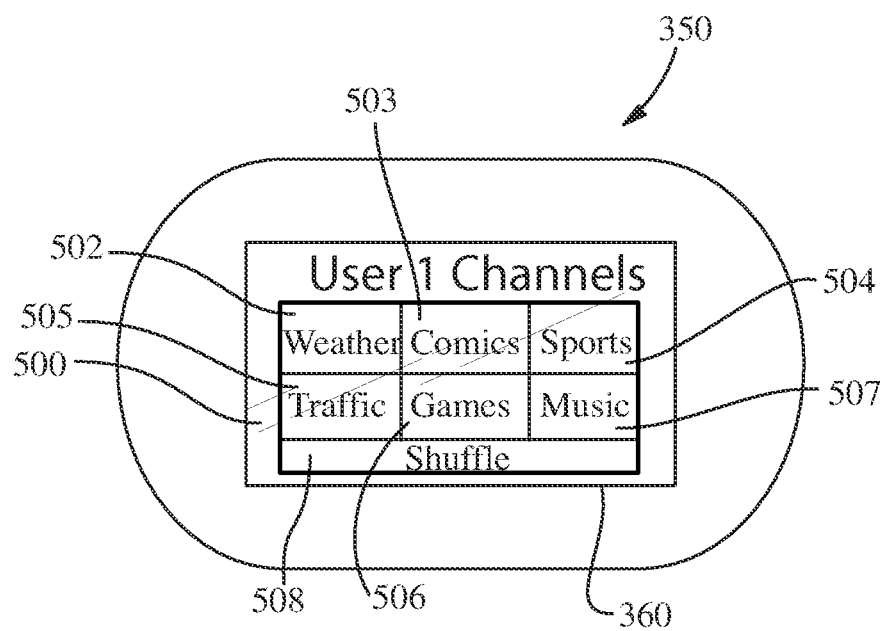
FIG. 29B is a representative view of a screen shot of an exemplary channel selection screen on the system of FIG. 19.
Figure 30A:
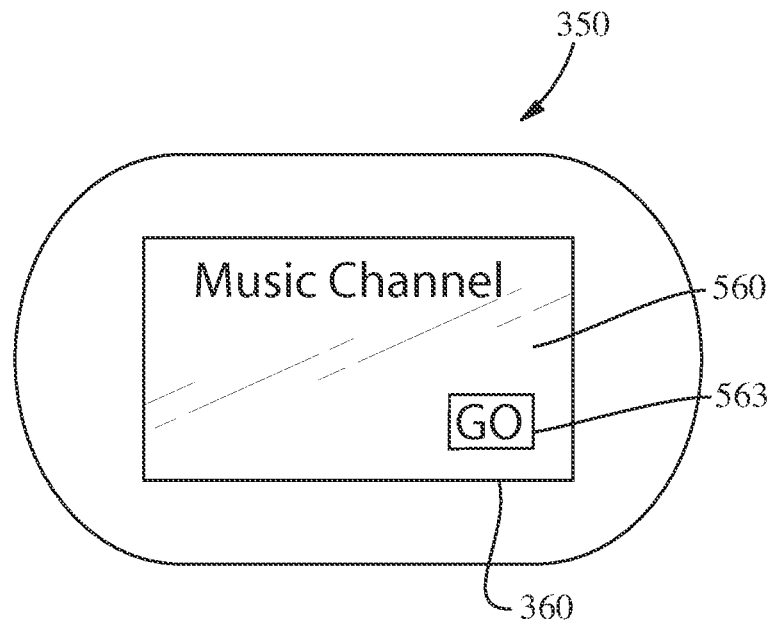
FIGS. 30A and 30B are representative views of screen shots of exemplary music cover screen and music content application screen, respectively, on the system of FIG. 19.
Figure 30B:
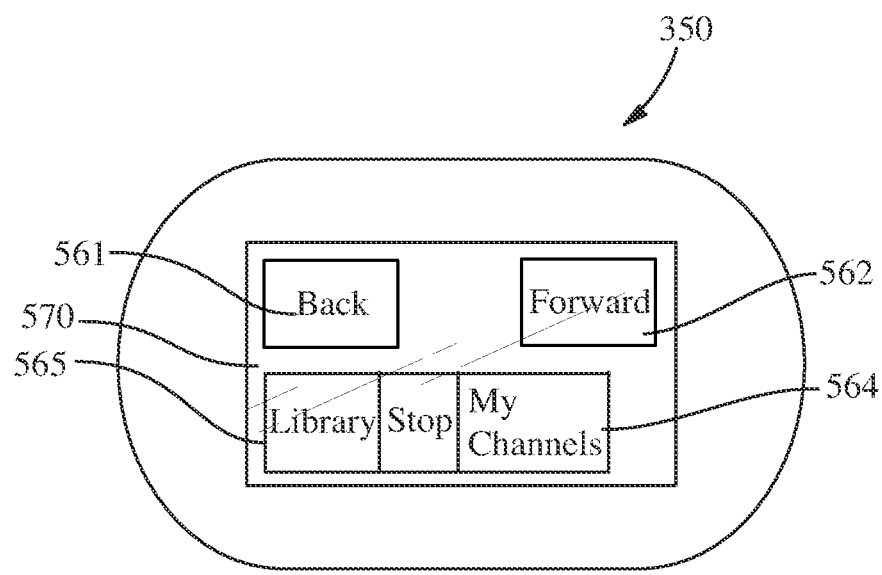

Referring to FIGS. 30A and 30B, if a user selects one of the user channel icons such as, for example, the music icon 507 (shown in FIG. 29B), a music cover screen 560 may display on the display 350. The display 350 may be configured to display the music cover screen 560 for a predetermined period of time, and then run the music content application 570 to display the information contained within that specific channel (e.g., video clips, information, music (e.g., MP3, sound bites, etc.). Alternatively, a user may select the GO icon 563 to immediately display and/or run the content application 570 without waiting the predetermined period of time to elapse. The music content application 570 may also include a music library icon 565 that when selected provides the user access to his/her music library stored on the display 350, the system 300, and/or the network 361 (shown in FIG. 19). Additionally, the user when selecting the music library icon 565 may also access other music content available on the network 361 (shown in FIG. 19) such as Internet radio (e.g., streaming radio), music web sites having downloaded music available, music videos, etc. Embodiments are contemplated wherein the display 350 is capable of receiving AM and or FM signals. For these embodiments, the display 350 may be programmable to store a plurality of stations. Additionally, in such embodiments, the display 350 may comprise controls which are utilized to tune the display 350 to the desired AM and/or FM signal.

As specifically shown in FIG. 30B, while the music content application 570 is running (i.e., the music is playing), the display 350 may also display music information, including but not limited to the name of the song, artist, album, picture of the album cover, etc. The user may also select either a return to my channels icon 564 or the back icon 561 to return to the user channel screen 500 in order to select another channel to display, view, and/or listen to on the display 350, or select the forward icon 562, which may cause the display 350 to display the next cover screen in the sequence (e.g., sports cover screen), and the underlying content application (e.g., sport content application). A user may cycle through all the user channels and their corresponding content applications just by selecting the forward icon after the content application has run to move to the next channel (i.e., cover screen and/or content application) in the sequence of channels. It is understood that the channel sequence may be customizable by the user.

Figure 31A:
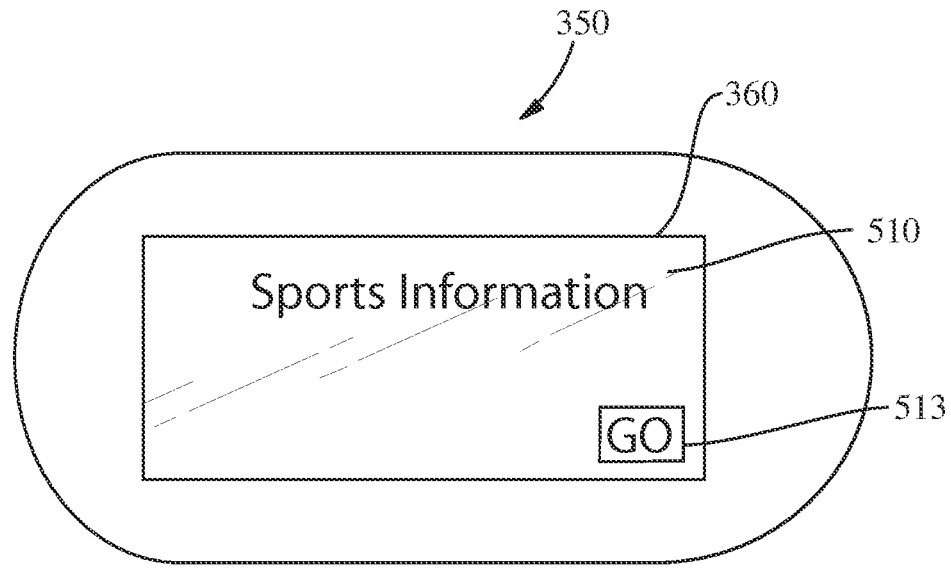
FIGS. 31A and 31B are representative views of screen shots of exemplary sports cover screen and sports content application screen, respectively, on the system of FIG. 19.
Figure 31B:
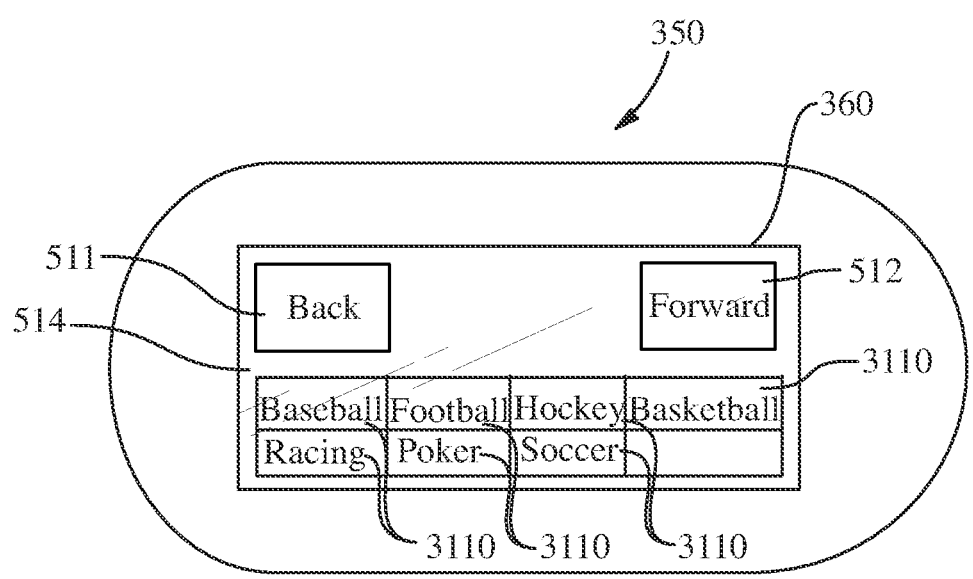

Referring to FIGS. 31A and 31B, if, from the user channel screen 500, a user selects the sports icon 504 (shown in FIG. 29B), the sports cover screen 510 may display on the display 350. The display 350 may be configured to display the sports cover screen 510 for a predetermined period of time, and then run the content application 514 to display the information contained within that specific channel (e.g., video clips, streaming media (e.g., streaming weather radio reports), data, text, music, sound bites, game schedules, etc.). For example, the content application 514 may access a web site of a media organization, e.g. ESPN®, Sports Illustrated®, or the like, via the Internet (i.e., network 361), download via the data link 361 the sports information accessible thereon, including but not limited to video clips of ESPN's Sportscenter®, video clips of sporting events or programs, sports data, streaming sports media (e.g., streaming radio broadcasts), data, text, music, sound bites, real-time and or periodical games scores, etc., and then run and/or display this sports information on the content application 514. The display 350 can be configured to access the network 361 (shown in FIG. 19) to retrieve this information and content at a variety of intervals such as continuously, intermittently, or periodically (e.g., daily).

The content application 514 screen may comprise a plurality of buttons 3110 which may allow a user to select a specific sport. For example, if the user were only interested in highlights, scores in the National Hockey League®, then the user could select the appropriate button 3110 such that the content application 514 accessed and displayed only results pertinent to hockey and/or the NHL®. Similarly, once the user has selected the desired sport, the user may then choose from professional level within the sport or collegiate level within the sport. The buttons 3110 may be displayed on the sports cover screen 510, such that the user has the option to choose the desired information from the sports cover screen 510.

Alternatively, a user may select the GO icon 513 to immediately display and/or run the content application 514 as set forth above without waiting the predetermined period of time to elapse. A user may select a back icon 511 at anytime while the display 350 is displaying the sports cover screen 510 or the content application 514 to move back to the prior screen, i.e., the user channel screen 500 or the sports cover screen 510, respectively. Also, a user may select a forward icon 512 at anytime while the display 350 is displaying the sports cover screen 510 or the content application 514 to move forward to the next cover screen, e.g., the weather cover screen 520 (shown in FIG. 32A), wherein the next cover screen and content application will provide the user the same or similar options, features, and applications as described above with reference to the sports cover sheet and content application.

Figure 32A:
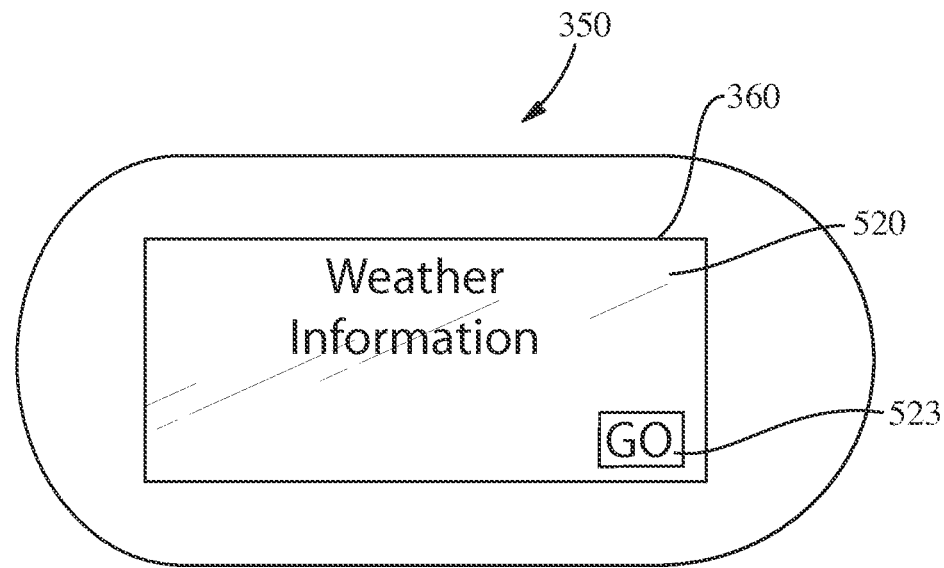
FIGS. 32A and 32B are representative views of screen shots of exemplary weather cover screen and weather content application screen, respectively, on the system of FIG. 19.
Figure 32B:
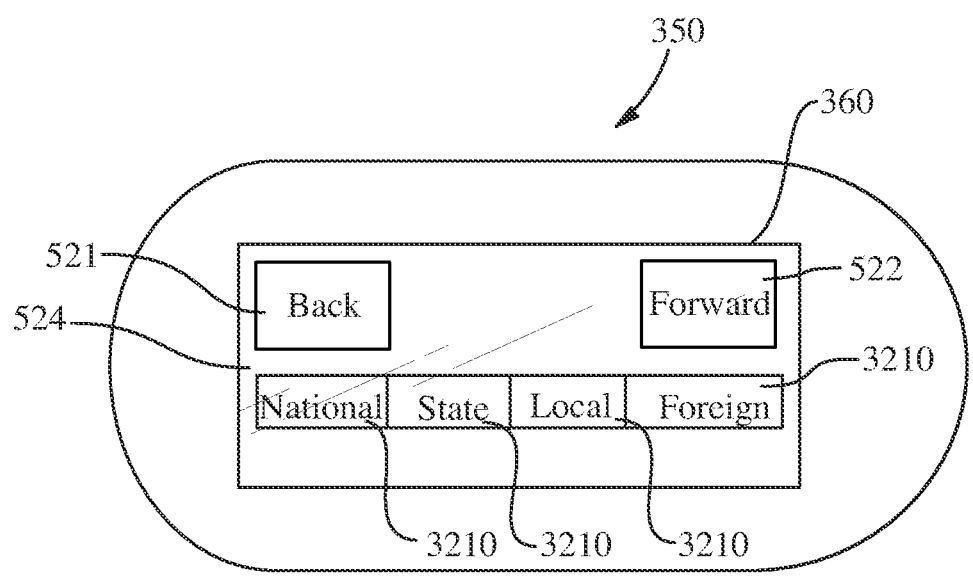

Referring to FIGS. 32A and 32B, if, for example, from the user channel screen 500 (shown in FIG. 29B) a user selects the weather icon 502 (shown in FIG. 29B) or from the prior cover screen/content application a user selects the forward icon (e.g., sports forward icon 512 (shown in FIG. 31B)), the weather cover screen 520 displays on the display 350. The display 350 may be configured to display the weather cover screen 520 for a predetermined period of time, and then run the content application 524 to display the weather information contained within that specific channel (e.g., video clips, streaming media (e.g., streaming weather radio reports), data, text, music, sound bites, etc.). For example, the content application 524 may access the web site of a media organization, e.g. The Weather Channel®, a local news media outlet, a regional news media outlet, a national news media outlet, or the like. The content application 524 may access the web site via the Internet (i.e., network 361), download via the data link 361 the weather information accessible thereon, including but not limited to temperature data, current and future weather forecasts, weather maps, radar images, satellite images, video clips, streaming media, etc., and then run and/or display this weather information on the content application 524 as shown in FIG. 32B. The weather content displayed on the display may be any information, data, and/or images as conventionally shown on a weather web site and/or channel. The display 350 can be configured to access the network 361 to retrieve this information and content at a variety of intervals such as continuously, intermittently, or periodically (e.g., daily).

Additionally, embodiments are contemplated wherein the display 350 displays a plurality of buttons 3210 which allow the user to select a desired set of information pertaining to the weather. For example, the buttons 3210 may allow the user to select from national, local, regional, and/or foreign weather information. Once the user selected the desired level of information, the display 350 can access the appropriate website in order to display the desired information. The buttons 3210 may be displayed on the weather cover screen 520. In this manner, the user can select the desired information for the content application 524 to access.

Alternatively, a user may select the GO icon 523 to immediately display and/or run the content application 524 as set forth above without waiting the predetermined period of time to elapse. A user may select a back icon 521 at anytime while the display 350 is displaying the sports cover screen 520 or the content application 524 to move back to the prior screen (e.g., sports cover screen 510) in the channel sequence or the weather cover screen 520, respectively. Also, a user may select a forward icon 522 at anytime while the display 350 is displaying the weather cover screen 520 or the content application 524 to move forward to the next cover screen, e.g., the traffic cover screen 530, wherein the next cover screen and content application will provide the user the same or similar options, features, and applications as described above with reference to the sports and/or weather cover sheets and content applications.

Figure 33A:
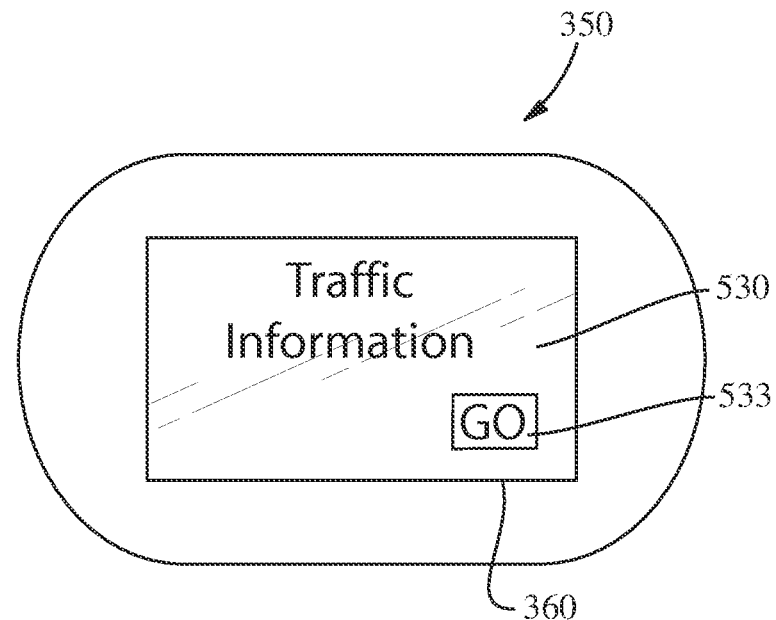
FIGS. 33A and 33B are representative views of screen shots of exemplary traffic cover screen and traffic content application screen, respectively, on the system of FIG. 19.
Figure 33B:
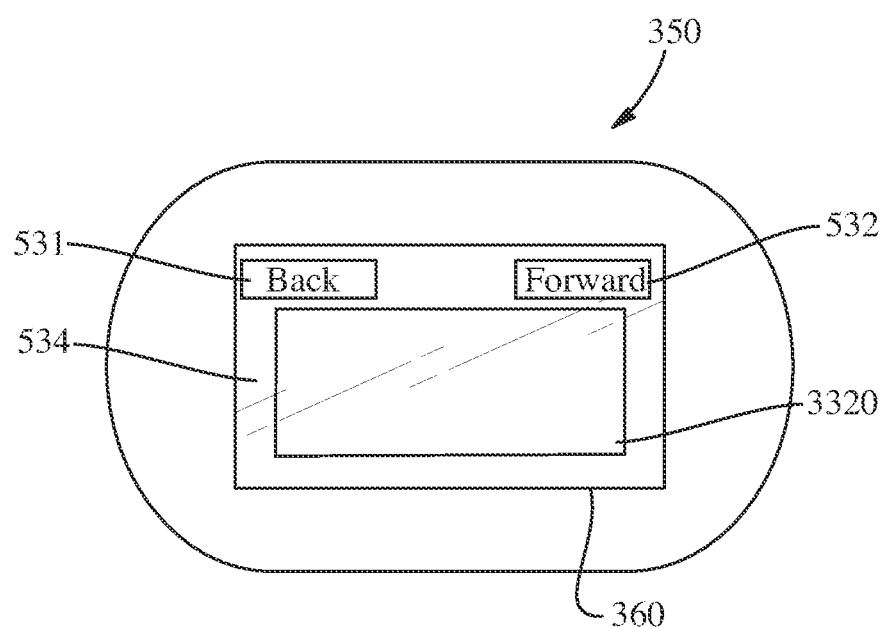
Figure 35:
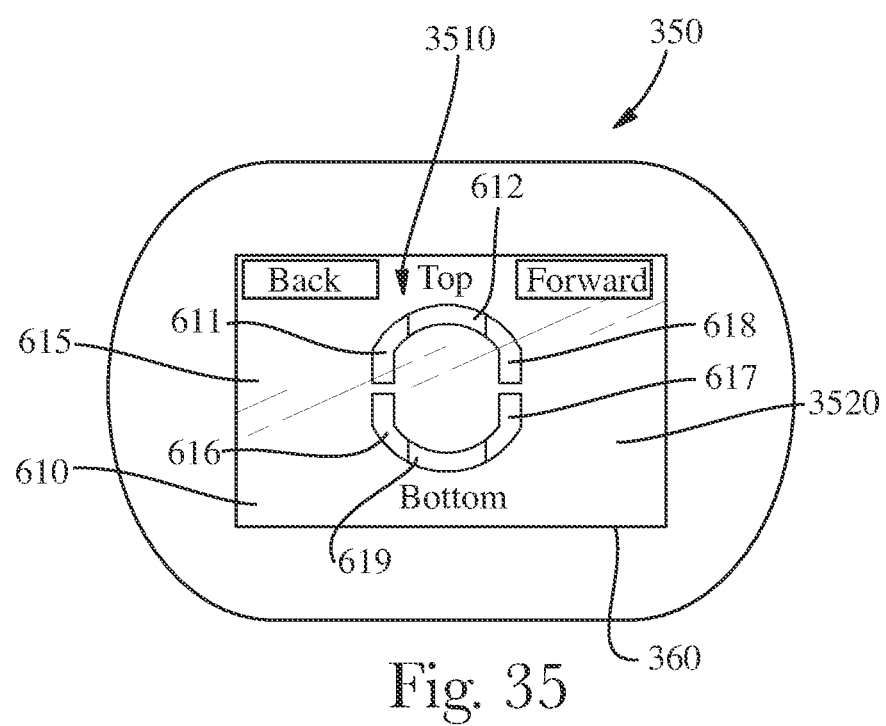
FIG. 35 is a representative view of a screen shot of an exemplary mouth mapping display on the system of FIG. 19.

Referring to FIGS. 33A and 33B, if, for example, from the user channel screen 500 (shown in FIG. 20B) a user selects the traffic icon 505 (shown in FIG. 20B) or from the prior cover screen/content application a user selects the forward icon (e.g., weather forward icon 522), the traffic cover screen 530 displays on the display 350. The display 350 is configured to display the traffic cover screen 530 for a predetermined period of time, and then run the content application 534 to display the traffic information contained within that specific channel (e.g., video clips, streaming media (e.g., streaming radio traffic reports), data, text, music, sound bites, maps, interactive maps, directions, satellite images, accident reports and updates, construction locations and updates, detour routes, etc.). For example, the content application 534 may access a web site of an appropriate media agency and/or a governmental organization. An example includes Traffic Pulse™, via the Internet (i.e., network 361), download via the data link 361 the traffic information accessible thereon, including but not limited to video clips, streaming media (e.g., streaming radio traffic reports), data, text, music, sound bites, maps, interactive maps, directions, satellite images, accident reports and updates, construction locations and updates, detour routes, etc., and then run and/or display this traffic information on the traffic content application 534 as shown in FIG. 33B. The traffic content displayed on the display may be any information, data, and/or images as conventionally shown on a traffic web site and/or channel. As an example, the display 350 may provide a map 3320 showing a particular area of interest. The display 350 can be configured to access the network 361 to retrieve this information and content at a variety of intervals such as continuously, intermittently, or periodically (e.g., daily).

Embodiments are contemplated wherein the display 350 is configured as a touch screen thereby allowing the user to select alternate paths between a starting point and a destination point. Alternatively, embodiments are contemplated wherein the display 350 is configured to suggest and display an alternate route if a primary route is slow or blocked. Still further embodiments may allow the user to scroll the map 3320 and/or expand/contract the focus area of the map. In such embodiments, the map 3320 may be contracted such that small thoroughfares are displayed in addition to portions of larger thoroughfares. Additionally, the map 3320 may be expanded such that the map 3320 displays major thoroughfares only, and does not include some of the smaller thoroughfares.

Alternatively, a user may select the GO icon 533 to immediately display and/or run the content application 534 as set forth above without waiting the predetermined period of time to elapse. A user may select a back icon 531 at anytime while the display 350 is displaying the traffic cover screen 530 or the traffic content application 534 to move back to the prior screen (e.g., weather cover screen 520) in the channel sequence or the traffic cover screen 530, respectively. Also, a user may select a forward icon 532 at anytime while the display 350 is displaying the traffic cover screen 530 or the content application 534 to move forward to the next cover screen, e.g., the comic cover screen 540, wherein the next cover screen and content application will provide the user the same or similar options, features, and applications as described above with reference to the sports and/or weather cover sheets and content applications.

Referring back again to FIG. 29B, from the user channel screen 500 a user may select the comics icon 503 or from the prior cover screen/content application a user selects the forward icon (e.g., traffic forward icon 532), the comics cover screen may display on the display 350. The display 350 may be configured to display the comics cover screen for a predetermined period of time, and then run the content application to display the comic information contained within that specific channel (e.g., comic strip(s), animation, cartoons, video clips, streaming media, data, text, music, sound bites, etc.). For example, the content application may access a web site containing comic information (e.g., an official DILBERT® site) via the Internet (i.e., network 361), download via the data link 361 the comic information accessible thereon, including but not limited to comic strip (s), animation, cartoons, video clips, streaming media, data, text, music, sound bites, etc., and then run and/or display this comic information on the comic content application. The comic content displayed on the display may be any information, data, and/or images as conventionally shown on a comic web site and/or channel. The display 350 can be configured to access the network 361 to retrieve this information and content at a variety of intervals such as continuously, intermittently, or periodically (e.g., daily).

Alternatively, a user may select a GO icon from the comics cover screen to immediately display and/or run the content application as set forth above without waiting the predetermined period of time to elapse. A user may select a back icon at anytime while the display 350 is displaying the comic cover screen or the comic content application to move back to the prior screen (e.g., traffic cover screen 530) in the channel sequence or the comic cover screen, respectively. Also, a user may select a forward icon at anytime while the display 350 is displaying the comic cover screen or the content application to move forward to the next cover screen, e.g., the music cover screen, wherein the next cover screen and content application will provide the user the same or similar options, features, and applications as described above with reference to the sports and/or weather cover sheets and content applications.

Still with regard to FIG. 29B, the user channel screen 500 also includes the shuffle icon 508, when selected the display 350 will run (display) the channels (e.g., music channel, sports channel, weather channel, traffic channel, and/or comics channel) automatically in a random or predetermined sequence without requiring the user to select the next channel when the previous channel's content application has completed displaying its information. In an alternative embodiment, the display 350 is configured to permit the user to customize what channels run their content application, how long they run their content application, and/or what sequence the channels run in.

Referring to FIGS. 34-38, yet another exemplary embodiment is shown of the personal care system 300 (shown in FIG. 19). This exemplary embodiment may include all the components, features, and/or screens as set forth in the above exemplary embodiments. In this exemplary embodiment and as discussed previously, the home screen 402 (shown in FIG. 26) may comprise a brush log icon 405 (shown in FIG. 26) and the network icon 407. When a user selects the brush log icon 405 of this embodiment, the display 350 can be configured to display a personal care selection screen 600. The personal care selection screen 600 may comprise a second brush log icon 602, a mouth mapping icon 604, and a plaque detection icon 606. It is understood that any number of user selectable-icons may be displayed and configured for any number of personal care topics, procedures, products, regimens, subject matters, and/ or applications.

When a user selects the second brush log icon 602, the display may display a username screen 410 (shown in FIG. 21A) or a username screen wherein all of the desired names, identifiers, and/or the like have been input by the user(s). As such, if it is the user's first time entering the system, the username screen 410 (shown in FIG. 21A) can display, and the user may select one of the available (unnamed) username icons (e.g., 411a). The user may then follow the steps to name his/her account by naming the username icon 411a and/or customizing or personalizing the screen images as described above herein. As also described above, once the user is established or set-up in the system and the user selects the brush log icon 405, then the username screen will display, showing the user's username icon (e.g., "JAMIE" user name icon).

If the user selects the "JAMIE" username icon, a personal brushing log screen may display. In this exemplary embodiment, the personal brushing log screen 440 displays as described above herein and shown in FIGS. 22-24, 28. The display 350 may also display a notice screen (e.g., notice screen 439) and/or a special offer screen (e.g., special offer screen 460) as described above herein and set forth in FIGS. 25, 27.

If the user selects the mouth mapping icon 604, the display may be configured to run a mouth mapping application such as, for example a position tracking system, and display the results of the mouth mapping application before, during, and/or after the running of such application. For example, the system 300 (shown in FIG. 19) and/or the personal care product (e.g., the electric toothbrush 35) may comprise a position tracking system that enables the system 300 (e.g., the display 350) to monitor, track, and/or record the multiple position of the toothbrush during a brushing occurrence and then display where the personal care product has traveled within an oral cavity and where the product has not traveled within the oral cavity.

An embodiment of the personal care system 300 may further comprise a position member (not shown). In some embodiments, the position member may comprise a camera (not shown) in data communication with the display 350 and the network 361, thus allowing the camera to transmit image data to the display and/or the camera, which in turn transmits the image data to the display 350. In an alternative embodiment, the position member may also comprise a receiving unit (not shown) in data communication with the camera, display 350, and/or network 361.

In some embodiments, the position member can measure the position and/or the orientation of at least a portion of a user's body, and/or at least a portion of the personal care product (e.g., toothbrush 35). The position member may perform this task by utilizing a number of different technologies. Non-limiting examples include technologies relating to visual markers, non-visual markers (e.g. audio, sonar, radar, Doppler), object recognition, magnetic, laser and/or, machine vision, etc. In one particular embodiment, the position member may utilize markerless technology and be capable of object recognition. In such an embodiment, the position member may utilize designated features on a user and/or the personal care product (e.g., toothbrush 35) in order to accomplish object recognition.

Designated features can be anatomical landmarks on the body of the user, the entire body of the user, and/or features of the personal care product (e.g., toothbrush 35). Non-limiting examples of anatomical landmarks on the body of the user may include facial landmarks, torso landmarks, limb landmarks, fingers, toes, a head and oral cavity landmarks. Non-limiting examples of facial landmarks include corners of the user's eyes, nostrils, mouth corners, combinations thereof and the like. Non-limiting examples of oral landmarks include individual teeth, tooth surfaces, previous dental work, gums, cheeks, lips and a tongue.

Non-limiting examples of designated features on the personal care product (e.g., toothbrush 35) are color and texture contrast and/or product logos. In embodiments of personal care system 300 that incorporate toothbrush 35, color and texture contrast between bristles on a head of the toothbrush, as well as color and texture contrast between a first material and a second material on a handle of the toothbrush, may be specific designated features. In embodiments of personal care system 300 that incorporate a razor as the personal care product, color and texture contrast on the razor cartridge and color and texture contrast between a first material and a second material on a handle of the razor, may be specific designated features.

Additionally, some embodiments of personal care product (e.g., toothbrush 35) have designated features that may include a material contrast. For example, by measuring the temperature gradients between materials of various components of the toothbrush 35, the position member may determine the position/orientation of the toothbrush 35. In certain embodiments, the temperature gradients between materials can be measured utilizing infrared optical analytical devices.

Through recognition of designated features, the position member may be capable of body recognition, facial recognition and/or personal hygiene implement recognition. Designated features may be selected such that the position member is capable of recognizing and distinguishing between two objects. Therefore, in certain embodiments of the personal care system 300, a first personal care product may be distinguished from a second personal care product through the position member recognition of specific designated features. Likewise, a first user face/body may also be distinguished from a second user face/body through the position member recognition of specific designated features. Utilizing the designated features described above can allow the position member to measure the orientation and/or location of at least a portion of the face/body of the user and/or the location of at least a portion of the personal care product (e.g., toothbrush 35).

Exemplary personal care systems and products comprising position tracking systems, position members, and/or personal care systems having object recognition that may be combined with or integrated with the personal care systems of the present invention, including the personal care system 300, are shown and described in commonly-owned, co-pending provisional patent application, titled "PERSONAL HYGIENE DEVICES, SYSTEMS AND METHODS", and filed on Nov. 20, 2008, and having an application Ser. No. 61/116,327. The system 300 may comprise object recognition software and/or dentistry scanning systems, as shown and described in PCT applications having International Publication Nos. WO 2007/084647; WO 2007/084768; and WO 2007/084727; and in U.S. Pat. Nos. 5,412,738; 6,128, 398; 6,301,370; 7,221,809; U.S. Patent Application Nos. 2001/0043717; 2003/0016869; 2004/0062442; 2006/0251292; 2007/0073439; and 2007/0258645 which are all hereby incorporated by reference herein in their entirety.

The display 350 may be configured to take such position data of the toothbrush 35, and then display, project, or simulate it on a photo, simulated, or representative image of an oral cavity in order to provide a user with visual information as to where the user has brushed and/or has not brushed during the brushing occurrence. Specifically, in FIG. 35, the display 350 shows an oral cavity screen 610 that visually represents an oral cavity 615 having the toothbrush's position data during a brushing occurrence visually represented on the oral cavity 615. The visual representation of the oral cavity 615 includes an upper jaw portion 3510 and a lower jaw portion 3520. Each of the upper and lower jaw portions 3510 and 3520, respectively, include multiple teeth sections. For example, the upper jaw portion 3510 may include a left side teeth section 618, a right side teeth section 611, and a front teeth portion 612. Similarly, the lower jaw portion 3520 may include a left side teeth section 616, a right side teeth section 617, and a front teeth section 619.

The display 350 may be configured to highlight a particular area which is being brushed by a user. For example, if the user is currently brushing the left side teeth section 618 of the upper jaw portion 3510, then section 618 may be highlighted by color, e.g. green, while the remainder of the teeth sections are a contrasting color, e.g. white, red, yellow, or the like. As the user continues to brush his/her teeth, the system 300 (shown in FIG. 19 may continue to track, record, and send this position data to the display 350 in order for the display to continue to illustrate which teeth have been brushed.

Additionally, the display 350 may be configured to identify/highlight any areas of the oral cavity 615 which were missed. For example, if the user were to brush only sections 618, 617, 619, and 616, the display 350 may highlight sections 611 and 612. The display 350 may highlight/identify the missed sections, e.g. 611 and 612, in any suitable manner. For example, sections 611 and 612 may appear red, orange, etc. or any other suitable color which is contrasted with those sections which have been brushed. It is understood that the display may also identify and visually display which teeth have been brushed, but have not brushed long enough, i.e., the toothbrush did not stay on that section of teeth for a predetermined period of time desired for brushing.

It is understood that any other suitable visual signals, images, indicia, etc., may be used separately or in combination with the coloring of the teeth sections to illustrate where teeth have not been brushed and where teeth have been brushed. It is also conceived that other personal care procedures and/or products may use the position tracking system and display the position tracking data on the display 350, including but not limited to flossing, shaving, trimming, razors, trimmers, probes, plaque detection, gingivitis detection, etc.

In yet another exemplary embodiment, the personal care system 300 (shown in FIG. 19) may further comprise a pressure sensor and/or a force sensor as shown and described above herein that may be connected to a personal care product (e.g., toothbrush 35) in combination with the position tracking system. In this embodiment, the sensor may detect the pressure and/or force a user is applying the toothbrush to his/her oral cavity and then display this pressure and/or force and location data to the display 350 and/or the network 361.

Figure 36:
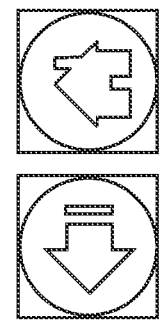
FIG. 36 is a representative view of a screen shot of an exemplary instruction display on the system of FIG. 19.

Referring FIGS. 34 and 36, if a user selects the plaque detection icon 606, the display may display a plaque detection instruction screen 630. The system 300 may further comprise a plaque detection device as shown and described above herein that is in data communication with the system, i.e., the display 350 and/or the network 361 in order to transmit plaque detection information and data to the display 350 in order to be displayed on the screen 360. In another embodiment, the system 300 may comprise a plaque detection device and a position tracking system as shown and described above herein such that the plaque detection device may send the plaque detection data and information to the display and/or the network 361, and the position tracking system may send the position tracking data of the plaque detection device to the display and/or the network 361. The system 300 may then combine this data and information such that the display may display this plaque and position data on a photo, simulated, or representative oral cavity of a user such that the user may see what sections of his/her oral cavity have plaque and/or what sections of his/her oral cavity do not contain plaque.

Other exemplary plaque detection devices, systems, and/or methods suitable for use or combination with the personal care systems of the present invention, particularly the personal care system 300 are shown and described in U.S. Patent Application Publication Nos. 2008/0060148; 2006/0222600; and U.S. application Ser. No. 61/049,904, filed on May 2, 2008. It is understood that any of the exemplary displays shown and described above herein may be configurable by a user to change the information that is displayed and/or the application(s) that are run, how long it is displayed or run, what order it is displayed or run, and what format it is displayed in or run on, thus providing a customized or personalized display of information by the display for one or more users.

Embodiments are contemplated where any of the personal care systems may communicate, via any suitable manner and/or any manner described herein, with the internet, health care providers; health services, e.g. insurance providers; members of the oral care profession, e.g. dentists and/or hygenists; retailers; internet content providers, e.g. google, WebMD®; and/or combinations thereof.

Embodiments are contemplated where the display can provide an image to the user of how many other people are utilizing a personal care system as herein described. For example, the display may show an image of the number of people brushing, rinsing, and/or flossing at a given time. As another example, the display may show an image of the people which are utilizing a personal care system as herein described, wherein the image may be a photo or animation of a person or multiple persons. As an example, a person may enroll in a personal hygiene network for personal care system users. Through this enrollment, the person may select other persons which they would like to add to their personal hygiene network or the person may search for other persons which they would like to add to their personal hygiene network of friends.

In some embodiments, the display 350 may be configured to identify when a person enters a bathroom or comes within a predetermined range of the display 350. For example, the display 350 may comprise a light sensor, a thermal sensor, a motion sensor, a humidity sensor, and/or a Doppler sensor. These sensors may allow the display 350 to determine when a person enters the bathroom and/or comes within range of the display 350. These sensors provide the display 350 with the ability to power down after a predetermined period of time thereby reducing the energy consumption of the display 350.

Figure 37:
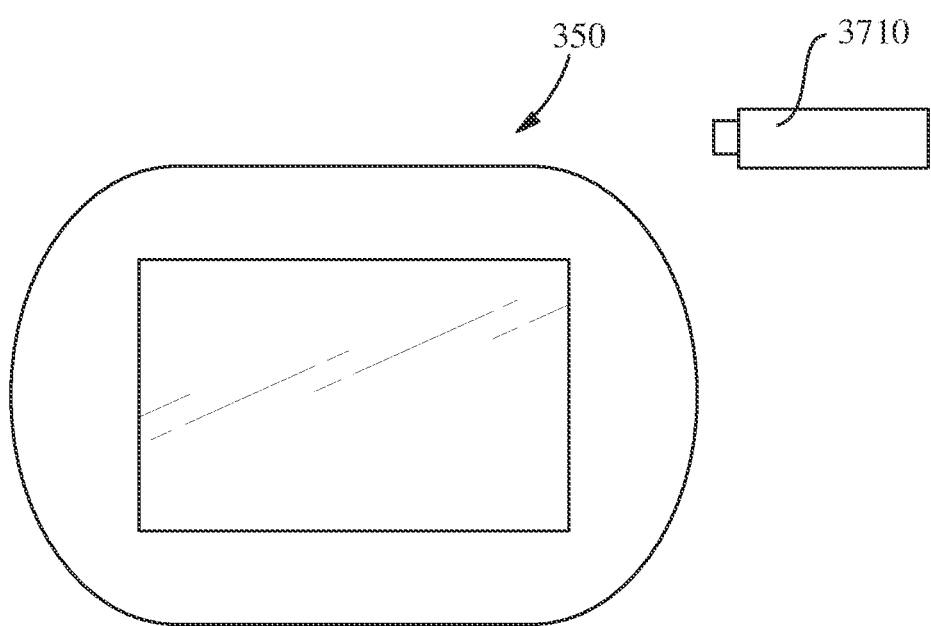
FIG. 37 is a representative view of another embodiment of the present invention comprising a personal care system that may have interconnectivity to an external memory device.

As stated previously the system may comprise a removable memory device. For example, as shown in FIG. 37, a removable memory device 3710 may interface with the display 350 via a USB connection or any other suitable communication mechanism described herein. Information from the display 350 may be uploaded onto the removable memory device 3710. As shown, the removable memory device may interface with the display 350; however, the removable memory device 3710 may interface with the toothbrush 35 of a personal hygiene system 300 (shown in FIG. 19). A benefit that the removable memory device 3710 provides is that a user may take the removable memory device 3710 directly to a dentist, for example, and provide information regarding the user's oral care habits to the dentist. Some suitable removable memory devices 3710 include flash drives, portable hard drives, and the like.

In some embodiments, the removable memory device 3710 may serve as an interface between a personal hygiene product and a display. For example, the removable memory device 3710 may act as an interface between an I-phone® and the toothbrush 35 which may not be able to communicate without the removable memory device 3710.

In some embodiments, a removable memory device 3710 may provide incentive to a user to utilize good oral hygiene practice and/or good personal hygiene practice. For example, the removable memory device 3710 may be configured as a game. The object of the game may be to assist a character in the game with the achievement of a goal, e.g. gain points, stay alive, etc. In order to assist the character to achieve the goal, the user may be required to utilize a particular personal hygiene routine and/or particular personal hygiene products. For example, the character may die if the user does not brush their teeth three times a day for two minutes at a time. Input of such an oral routine may be manual by the user. Alternatively, or in conjunction with manual input from the user, the removable memory device 3710 may configured to communicate, as described herein, with a plurality of personal hygiene products. In such embodiments, the user may simply have to pass a toothbrush, for example, in the vicinity of the removable memory device 3810 such that the removable memory device 3710 recognizes the toothbrush.

Points gained by the user may be stored on the removable memory device 3710. The points accumulated by the user may be redeemable on a particular website, for example, in order to get gifts. For example, the point accumulated may be redeemed for a coupon. As another example, the points accumulated may be redeemed for a toy. As the number of accumulated points increases, the gifts available may increase in value.

Alternatively, or in conjunction with the gifts, the accumulated points may be utilized to unlock web content. For example, a user having an accumulated first number of points may have access to a first web content, and a user having an accumulated second number of points may have access to the first web content plus additional web content. Increased amounts of accumulated points may correlate with increased unlocked/accessible web content.

As stated previously the display 350 may be a projector which projects information onto a surface. The projector may provide the same information as the display described herein. However, the projector may be configured to project the information onto a surface, e.g. a wall of a room, a mirror. The projector is configured to project the information in such a fashion that a user can read and/or understand the information being projected. For example, where information is projected onto a mirror or mirrored surface, the information should be projected onto the mirror such that the viewed reflection by the user is not backwards.

While some examples of embodiments of the present invention have been illustrated and described, it would be obvious to those skilled in the art that various other changes and modifications can be made without departing from the spirit and scope of the invention. Further features, application possibilities, and advantages, of the present invention may become apparent from the above description of embodiments of the invention and/or from the Figures of the accompanying drawings. It will be understood that any features described herein and/or represented by illustration, whether used singularly or in any other combination, form the subject-matter of the present invention. It is therefore intended to cover in the appended claims all such changes and modifications that are within the scope of this invention.

Additionally, any of the features, capabilities, elements, methods, etc. described with regard to one embodiment, may be utilized in any other embodiments mentioned herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. An oral care system for multiple users, the system comprising:
    an electric toothbrush; and
    a separate, standalone display in data communication with the toothbrush wherein the display is configured as a touch screen and wherein the display is configurable by each of the multiple users with respect to a kind of information to be displayed, how long said information is to be displayed, in what order said information is to be displayed, and in what format said information is to be displayed, wherein for each of the individual users that has configured the standalone display, said display provides a customized personalized information selected by said each of the multiple users via the touch screen of the standalone display;
    wherein the display is arranged to display information associated with a plurality of brushing routines and to provide information to a user associated with at least one of the plurality of brushing routines;
    wherein the display stores data and displays information corresponding to one or more characteristics of an oral care regimen for a first user;
    wherein the display stores data and displays information corresponding to one or more characteristics of an oral care regimen for a second user;
    wherein the display is configured to monitor the oral care habits of the multiple users over a predetermined period of time, the predetermined period of time including more than one oral care routine;
    wherein the display comprises at least one timer for monitoring time associated with the one or more characteristics of the oral care regimen for the first user and the one or more characteristics of the oral care regimen for the second user;
    wherein analyses of brushing times, oral care regimens, and/or habits can be performed, including information provided by the at least one timer with respect to the time associated with the one or more characteristics of the oral care regimen for the first user and the one or more characteristics of the oral care regimen for the second user; and
    wherein the display is configured to allow each of the first user and the second user to input a desired function into the display and the display communicates with the toothbrush so the toothbrush performs the desired function.

2. The oral care system of claim 1, wherein the data communication is continuous during a brushing cycle.

3. The oral care system of claim 1, wherein the data communication is intermittent during a brushing cycle.

4. The oral care system of claim 1, wherein the display is configured to display a reward to at least one of the first user and the second user.

5. The oral care system of claim 1, wherein the information corresponding to one or more characteristics of an oral care regimen for a user is displayed in the form of questions and answers on the display.

6. The oral care system of claim 1, wherein the display is configured to display information selected from the group consisting of coupon codes, weather, news, sports scores, stock quotes, and music.

7. The oral care system of claim 1, wherein the display includes a user interface comprising a touch screen.

8. The oral care system of claim 1, wherein the display includes a user interface in the form of buttons.

9. The oral care system of claim 1, wherein the oral care system comprises a malodor sensor included in at least one of the toothbrush and the display.

10. The oral care system of claim 1, wherein the display is arranged for connection with the internet.

11. An oral care system for multiple users, the system comprising:
- an electric toothbrush; and
- a separate, standalone display in data communication with the toothbrush wherein the display is configured as a touch screen and wherein the display is configurable by each of the multiple users with respect to a kind of information to be displayed, how long said information is to be displayed, in what order said information is to be displayed, and in what format said information is to be displayed, wherein for each of the multiple users that has configured the standalone display, said display provides a customized personalized information selected by said each of the multiple users via the touch screen;
- wherein the display is arranged to display information associated with a plurality of brushing routines and to provide information to a user associated with at least one of the plurality of brushing routines;
- wherein the display stores data and displays information corresponding to one or more characteristics of an oral care regimen for a first user;
- wherein the display stores data and displays information corresponding to one or more characteristics of an oral care regimen for a second user;
- wherein the display is configured to monitor the oral care habits of the multiple users over a predetermined period of time, the predetermined period of time including more than one oral care routine;
- wherein the display comprises at least one timer for monitoring time associated with the one or more characteristics of the oral care regimen for the first user and the one or more characteristics of the oral care regimen for the second user, to display information on brushing times, oral care regimens, and/or habits of the first user and the second user, including information provided by the at least one timer with respect to the time associated with the one or more characteristics of the oral care regimen for the first user and the one or more characteristics of the oral care regimen for the second user; and
- wherein the display is configured to allow each of the first user and the second user to input a desired function into the display and the display communicates with the toothbrush so the toothbrush performs the desired function.

\* \* \* \* \*